United States Patent
Ross et al.

(10) Patent No.: US 12,265,459 B1
(45) Date of Patent: Apr. 1, 2025

(54) AUTOMATED DETERMINATION OF TUNED PARAMETERS FOR ANALYZING OBSERVABLE METRICS

(71) Applicant: SPLUNK INC., San Francisco, CA (US)

(72) Inventors: Joseph Ari Ross, Redwood City, CA (US); Abraham Starosta, Boston, MA (US)

(73) Assignee: Splunk LLC, San Jose, CA (US)

( * ) Notice: Subject to any disclaimer, the term of this patent is extended or adjusted under 35 U.S.C. 154(b) by 123 days.

(21) Appl. No.: 18/103,966

(22) Filed: Jan. 31, 2023

(51) Int. Cl.
*G06F 11/30* (2006.01)
*G06F 11/07* (2006.01)

(52) U.S. Cl.
CPC ........ *G06F 11/3075* (2013.01); *G06F 11/076* (2013.01)

(58) Field of Classification Search
CPC .......................... G06F 11/076; G06F 11/3075
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 * | 12/2015 | Merza | H04L 63/1416 |
| 9,286,413 B1 | 3/2016 | Coates et al. | |
| 10,127,258 B2 | 11/2018 | Lamas et al. | |
| 10,872,031 B2 * | 12/2020 | Ross | G06F 11/3644 |
| 2018/0077189 A1 * | 3/2018 | Doppke | H04L 63/20 |
| 2019/0098106 A1 | 3/2019 | Mungel et al. | |
| 2019/0370610 A1 * | 12/2019 | Batoukov | G06F 11/0709 |
| 2020/0379744 A1 * | 12/2020 | Bhupati | H04L 67/61 |
| 2021/0174662 A1 * | 6/2021 | Ise | A61B 5/746 |
| 2022/0138499 A1 * | 5/2022 | Wang | G06F 11/3075 382/159 |
| 2024/0160554 A1 * | 5/2024 | Batoukov | G06F 11/0709 |

OTHER PUBLICATIONS

Carraso, David, "Exploring Splunk," published by CITO Research, New York, NY, Apr. 2012. (Year: 2012).*

(Continued)

*Primary Examiner* — Joseph O Schell
(74) *Attorney, Agent, or Firm* — Rutan & Tucker, LLP; Kyle M. St. James

(57) ABSTRACT

Implementations of this disclosure provide an anomaly detection system that automatically tunes parameters of a forecasting detector that detects anomalies in a metric time series. The anomaly detection system may implement a three-stage process where a first stage tunes a historical window parameter, a second stage tunes a current window parameter, and a third stage tunes the number of standard deviation different from historical mean required to trigger an alert. The tuned historical window length determined by the first stage may be provided to the second stage as input. Both the tuned historical window length and the tuned current window length may be provided to the third stage as input as use in determining the tuned number of standard deviations.

20 Claims, 33 Drawing Sheets

(56) References Cited

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Bretz, P. et al., "Notes on Bayesian Changepoint Detection" pp. 1-12, Nov. 19, 2020.

Carraso, David, "Exploring Splunk," published by CITO Research, New York, NY, Apr. 2012.

K. Curtis, et al. "Hyperparameter Tuning for Anomaly Detection Service Implementing Machine Learning Forecasting," filed Oct. 31, 2022, U.S. Appl. No. 17/978,153 including its prosecution history.

K. Curtis, et al. "System and Method for Automated Determination of Search Query Parameters for Anomaly Detection," filed Jun. 10, 2022, U.S. Appl. No. 17/837,931 including its prosecution history.

Ruggieri, E. et al., "Short Communication—A Bayesian approach to detecting change points in climatic records" DOI: 10.1002/joc.3447. Int. J. Climatol. (2012).

Splunk Cloud 8.0.2004 User Manual, available online, retrieved May 20, 2020 from docs.splunk.com.

Splunk Enterprise 8.0.0 Overview, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Splunk, Inc., "Setup Detectors and Alerts for Actionable Insights." https://www.youtube.com/watch?v=2Gvw_DACcWc, dated Sep. 16, 2021.

Z. Wang et. al. "System and Method for Categorical Drift Detection," filed Feb. 2, 2022, U.S. Appl. No. 17/591,528 including its prosecution history.

Z. Wang et. al. "System and Method for Changepoint Detection in Streaming Data," filed Feb. 2, 2022, U.S. Appl. No. 17/591,511 including its prosecution history.

Z. Wang et. al. "System and Method for Format Drift and Format Anomaly Detection," filed Feb. 2, 2022, U.S. Appl. No. 17/591,535 including its prosecution history.

\* cited by examiner

| from service name | to service name | from span.kind | to span.kind | from region | to region | Request count |
|---|---|---|---|---|---|---|
| Service A | Service B | client | server | us-west | us-east | 2 |
| Service A | Service B | client | server | us-west | us-west | 1 |

1490 — (row 1)
1492 — (row 2)

FIG. 14

| Service | Operation 1540 | 0ms | 93ms | 186ms | 297ms | 373ms |
|---|---|---|---|---|---|---|
| ⌄ frontend | /product | 373ms | | | | |

1539

```
              OPERATION
              /product
              TAGS
              client              "ios"       1550
              environment         "prod"
              http.method         "GET"       1551
              http.status_code    200
              http.url            "htp://frontend/product"
              incident            "pubsub_errors"
              ios.version         "v1.1.0"
              k8s.io/cluster/name      "us-east-1-cluster"
              k8s.io/container/name    "front-end"
              k8s.io/namespace/name    "us-east-1-namespace-2"   1552
              k8s.io/pod/name          "frontend-daliuytgq-dd58f"
              region              "us-east-1"
              sampler.param       true
              sampler.type        "const"
              status.code         0
              tenant-level        "bronze"
              version             "76c81d"
              PROCESS
              hostname        "util-svc-synthetic-load-generator-7c88bbf4fb-fts96"
              ip              "100.96.12.172"
              opencensus.exporterversion  "Jaeger-Java-0.33.1"
```

1546  
|frontend  1547 — parse-request         15ms  
⌄ |frontend       — request/GetProducts   30ms  
productcatalogservice/GetProducts          29ms  
1545

1538

```
              OPERATION
              /GetProducts
              TAGS
              environment         "prod"      1560
              http.method         "GET"       1561
              http.status_code    200
              http.url            "http://productcatalogservice/GetProducts"
              k8s.io/cluster/name      "us-east-1-cluster"
              k8s.io/container/name    "productcatalogservice"
              k8s.io/namespace/name    "us-east-1-namespace-2"    1562
              k8s.io/pod/name          "productcatalogservice-18iodsfh27-r234t"
              products_returned   115
              region              "us-east-1"
              status.code         0
              tenant-level        "bronze"
              version             "deb52c"
              PROCESS
              hostname        "util-svc-synthetic-load-generator-7c88bbf4fb-fts96"
              ip              "100.96.12.172"
              opencensus.exporterversion  "Jeager-Java-0.33.1"
```

FIG. 15A

Edge_Health:

| from service name | to service name | from pod | to pod | from operation | to operation | request | request error | Latency Bucket N | ts |
|---|---|---|---|---|---|---|---|---|---|
| frontend | product-catalog service | frontend-dailuytgq-dd58f | productcatalog service-18iodsfh27-r234t | /product | /GetProduct | 1 | 0 | 1 | 1576695520 |

Node_Health:

| svc_name | env | pod | code | operation | request | request error | Root cause | Latency Bucket N | ts |
|---|---|---|---|---|---|---|---|---|---|
| frontend | prod | frontend-dailuytgq-dd58f | 200 | /product | 1 | 0 | 0 | 1 | 1576695520 |
| product catalog service | prod | productcatalogservice-18iodsfh27-r234t | 200 | /GetProduct | 1 | 1 | 0 | 1 | 1576695520 |

FIG. 15B

Node_Health Exemplars:

| svc_name | env | pod | code | operation | trace_ids | Exemplar type |
|---|---|---|---|---|---|---|
| frontend | prod | frontend-daliuytgq-dd58f | 200 | /product | "ff0558ae875a250e" | request |
| product catalog service | prod | productcatalongservice-18iodsfh27-r234t | 200 | /GetProduct | "ff0558ae875a250e" | request |

Edge_Health Exemplars:

| from service name | to service name | from pod | to pod | from operation | to operation | trace_ids | Exemplar type |
|---|---|---|---|---|---|---|---|
| frontend | product catalog service | frontend-daliuytgq-dd58f | product catalog service-18iodsfh27-r234t | /Product | /GetProduct | "ff0558ae875a250e" | request |

FIG. 15C

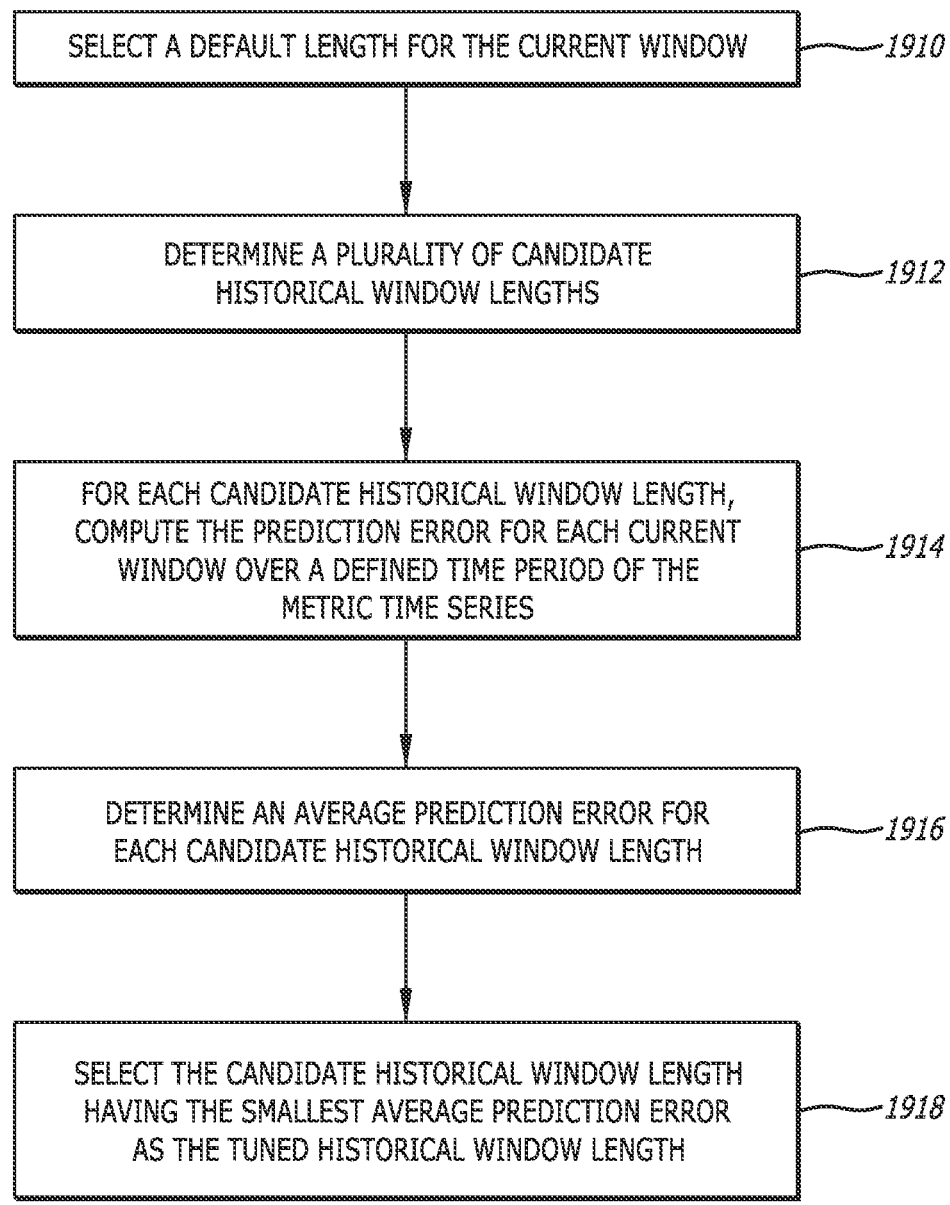

1946 — MODIFIED STAGE 1: USING A DEFAULT CURRENT WINDOW LENGTH, DETERMINE A TUNED HISTORICAL WINDOW LENGTH FOR A PLURALITY OF CANDIDATE WINDOW LENGTHS ($CH_1...CH_j$) THAT MINIMIZES THE PREDICTION ERROR ($CH_j ... CH_1$) + LAMBDA*NON-SMOOTH ($CH_j ... CH_1$)

1948 — STAGE 2: USING THE TUNED HISTORICAL WINDOW LENGTH FROM STAGE 1, DETERMINE A TUNED CURRENT WINDOW LENGTH BEING THE SMALLEST LENGTH THAT DOES NOT RESULT IN AN INCREASE IN THE NUMBER OF ALERTS TRIGGERED AS COMPARED TO THE IMMEDIATELY PRECEDING LENGTH

1950 — STAGE 3: USING THE TUNED CURRENT AND HISTORICAL WINDOW LENGTHS, DETERMINE THE NUMBER OF STANDARD DEVIATIONS DIFFERENT THAT A STATISTICAL VALVE OF THE CURRENT WINDOW IS FROM THE MEAN OF THE TUNED HISTORICAL WINDOW THAT ARE REQUIRED TO TRIGGER AN ALERT

1952 — STAGE 4: USING THE TUNED CURRENT AND HISTORICAL WINDOW LENGTHS AND THE NUMBER OF STANDARD DEVIATIONS, DETERMINE AN ALERT CLEARING THRESHOLD

FIG. 20
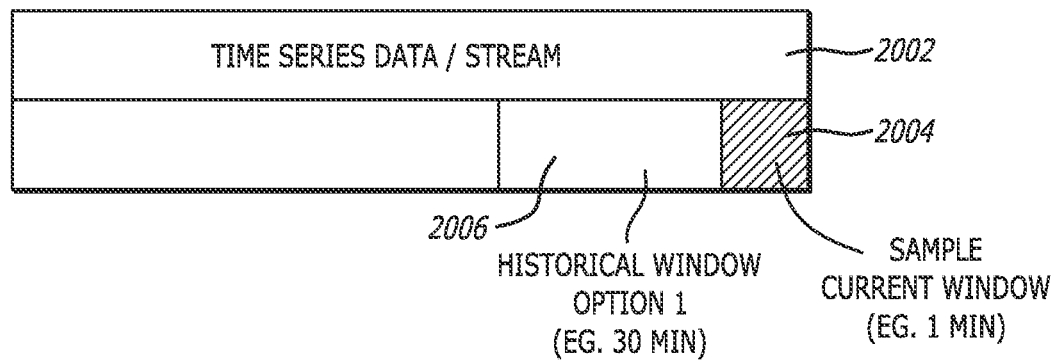
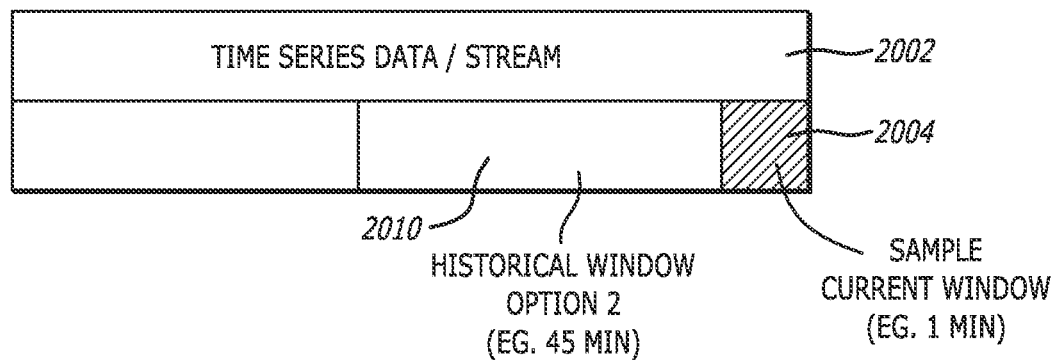
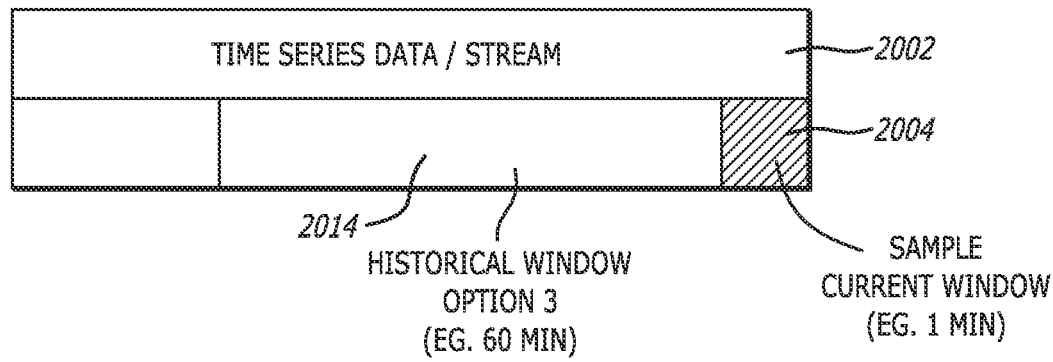

FIG. 21
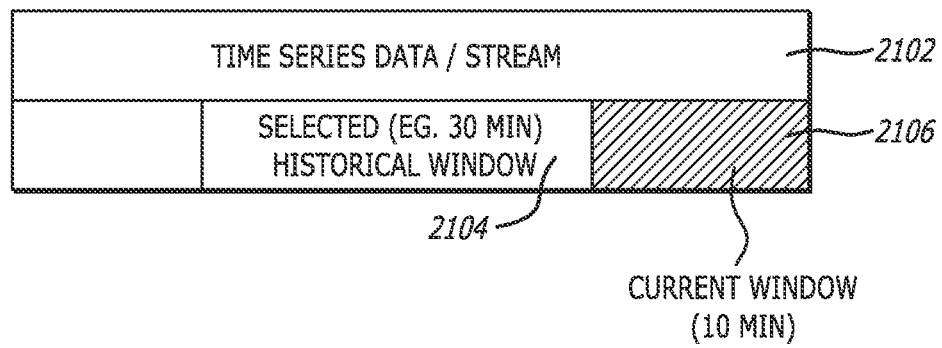
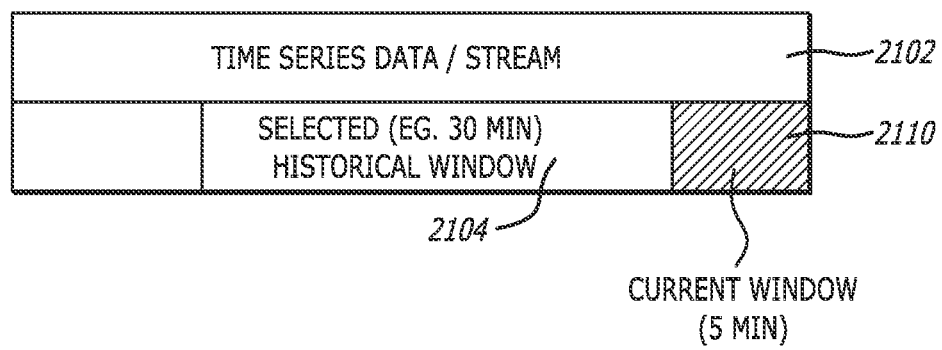
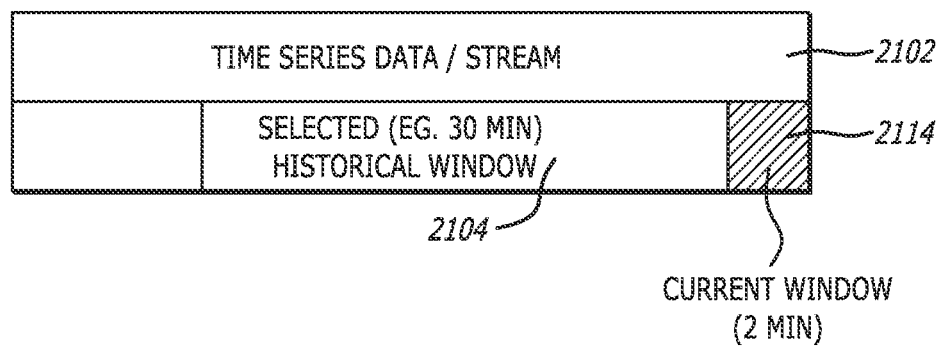

AUTOMATED DETERMINATION OF TUNED PARAMETERS FOR ANALYZING OBSERVABLE METRICS

RELATED APPLICATIONS

Any and all applications for which a foreign or domestic priority claim is identified in the Application Data Sheet as filed with the present application are incorporated by reference under 37 CFR 1.57 and made a part of this specification

BACKGROUND

Many companies deploy full-stack environments that constantly generate raw metrics, traces and logs. With the vast number of computing devices, software applications, and infrastructure components (on-premises and cloud infrastructure) that are commonly deployed by a company today, the amount of raw metrics, traces and logs is difficult to monitor. However, a movement has started with many technology companies that is geared towards measuring the internal states of a system by examining its outputs. This movement is often referred to as "observability" and a system may be considered observable if the system's state may be assessed using information from its outputs.

BRIEF DESCRIPTION OF THE DRAWINGS

Illustrative examples are described in detail below with reference to the following figures:

FIG. 14 is a table illustrating an exemplary manner in which selected tags for each service in a cross-service span pair may be mapped to tag attributes and stored as part of a memory-resident data object associated with an edge in the service graph, in accordance with implementations of the monitoring service disclosed herein.

FIG. 15A illustrates an exemplary on-screen GUI showing a visual representation of a portion of an exemplary trace illustrating a cross-service call, in accordance with implementations of the monitoring service disclosed herein.

FIG. 15B illustrates the manner in which data in the metric events modality is persisted using an edge data object comprising a memory-resident table of tag attributes with associated counts and using a node data object comprising a memory-resident table of tags with associated counts, in accordance with an implementation of the monitoring service disclosed herein.

FIG. 15C illustrates the manner in which data in the metric events modality is persisted using an edge data object comprising a memory-resident table of extracted indexed tag attributes with associated Trace IDs and using a node data object comprising a memory-resident table of extracted tags with associated Trace IDs, in accordance with an implementation of the monitoring service disclosed herein.

FIG. 19B is a flowchart illustrating an example operations included in performance of stage 1 set forth in FIG. 19A, in accordance with implementations of the monitoring service disclosed herein.

FIG. 19E is a flowchart illustrating a second example multi-stage procedure for tuning parameters of a forecasting detection algorithm utilized by a detector operating on a metric time series, in accordance with implementations of the monitoring service disclosed herein.

FIG. 20 illustrates a series of sample of historical windows and current windows in view of a metric time series data stream that may be utilized in determining a size of a historical window for use in an anomaly detection procedure, in accordance with implementations of the monitoring service disclosed herein.

FIG. 21 illustrates a series of sample of historical windows and current windows in view of a metric time series data stream that may be utilized in determining a size of a current window for use in an anomaly detection procedure, in accordance with implementations of the monitoring service disclosed herein.

DETAILED DESCRIPTION

Figure 1A:
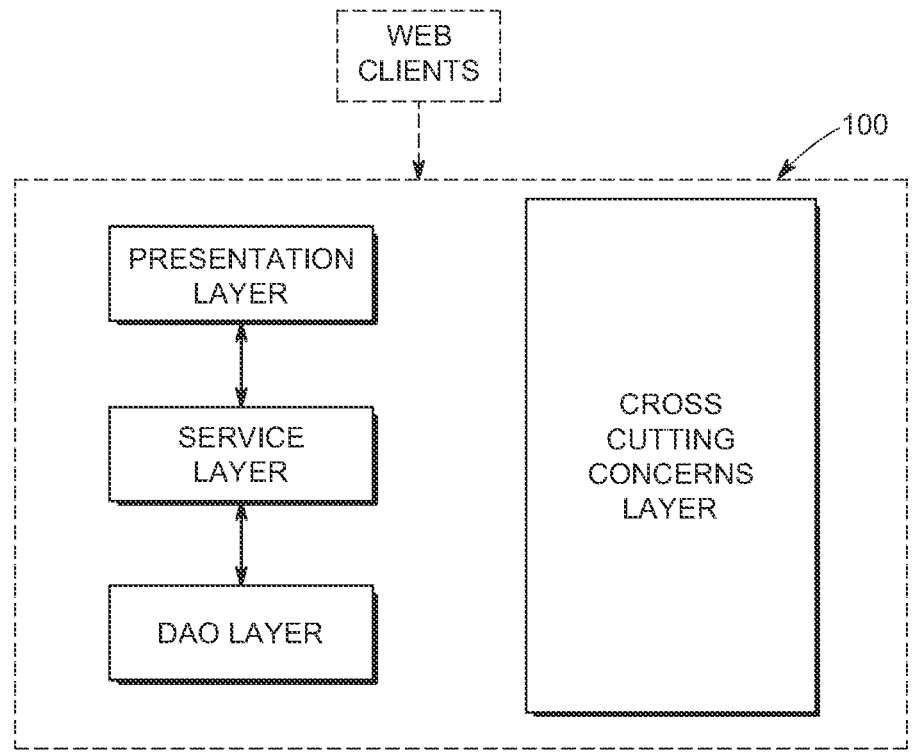
FIG. 1A illustrates an exemplary monolithic multi-layer architecture.

As noted above, observability refers to the ability to determine a system's internal state through its outputs. However, as today's systems generate such large amounts of raw metrics, traces and logs, sifting through a system's outputs is complicated, time-consuming, and often times too much of a burden for a system administrator. Thus, a computerized method that monitors the outputs of a system and automatically generates alerts based on detected anomalies in the outputs may allow for a system administrator to be alerted to a potential issue with the internal state of a system. For example, an alert may indicate that a current output of a system has deviated a significant amount from the historical data produced by the system.

However, these methods that monitor the outputs of a system need precise configuring in order to provide alerts that are accurate and not overbearing. For instance, several parameters may collectively be responsible for determining when an alert is to be triggered and provided to a system administrator. If the parameters aren't properly configured, the system administrator may receive too many alerts, e.g., the threshold at which to alert based on deviation of current outputs from historical outputs may be too low, or vice versa where the system administrator does not receive alerts even when the current outputs have deviated substantially from historical data. Typically, trial-and-error may be used to configure these parameters, where one parameter is tweaked and the system administrator determines at a later date whether the tweak was sufficient. If not, another tweak may be made and the process repeated.

Thus, to solve the problem of poorly configured observability systems, and specifically, poorly configured systems that detect anomalies in raw metrics, traces and logs, an automated system for configuring the parameters of an anomaly detection system is disclosed herein. In some implementations, the anomaly detection system receives a request indicating a forecasting detector to be tuned (or optimized) and a metric time series.

Upon receipt of such a request, the anomaly detection system then performs operations of a three-stage procedure to tune (or optimize) three parameters of a forecasting detector including a first stage that determines a tuned historical window length, a second stage that determines a tuned current window length, and a third stage that determines a tuned standard deviation multiplier. The anomaly detection system may output a detector incorporating the tuned parameters, or may output a set of instructions defining such a detector. In some implementations, the set of instructions comprises a SignalFlow program. The detector may then run on future metrics of the metric time series to detect anomalies using the tuned parameters. In particular, the parameters are tuned such that the historical window length provides the smallest prediction error for the particular metric time series, the current window length is the shortest window length that does not increase the number of alerts provided compared to larger window lengths, and the standard deviation multiplier is configured to trigger alerts for only a defined percentage of the metric data points (e.g., 1%).

The term "trace" as used herein generally refers to a record of the manner in which a single user request, also referred to as a transaction, propagates from one microservice (hereinafter interchangeably referred to as "service") to the next in a distributed application. A transaction is generally described as an end-to-end request-response flow, from the making of the user's initial request to receiving the final response. A transaction often involves the interaction of multiple services. A trace is a record of a transaction and each trace may be identified using a unique trace identifier ("Trace ID"). The trace follows the course of a request or transaction from its source to its ultimate destination in a distributed system. In one implementation, a trace may be conceptualized as a highly dimensional structured log that captures the full graph of user-generated and background request execution within an application, and includes valuable information about interactions as well as causality.

The term "span" as used herein generally refers to the primary building block of a trace, representing an individual unit of work done in a distributed system. A trace is composed of one or more spans where a span represents a call within the request. It is appreciated that a call may be to a separate microservice or a function within a microservice. The trace represents the work done by each microservice which is captured as a collection of linked spans sharing the same unique Trace ID. Each component of the distributed system may contribute a span—a named, timed operation representing a piece of the workflow. A span may also include a unique span ID, a service name (e.g., "analytics"), an operation name (e.g., "start"), duration (latency), start and end timestamps and additional annotations and attributes (e.g., tags such as key:value pairs). The annotations and attributes can describe and contextualize the work being done under a span. For example, each span may be annotated with one or more tags that provide context about the execution, such as the client instrumenting the software, a document involved in the request, an infrastructure element used in servicing a request, etc.

The term "tags" as used herein generally refers to key: value pairs that provide further context regarding the execution environment and enable user-defined annotation of spans in order to query, filter and comprehend trace data. Tag information is typically included with each span and there may be different levels of tag information included in a span. Tag information (including the 'key' and corresponding 'value') is typically included with each span and there may be different levels of tag information included in a span.

"Global tags" generally represent properties of a user-request (e.g., tenant name, tenant level, client location, environment type, etc.) and may be extracted from any span of the trace based on configured rules. A global tag for a particular span in a trace may be attributed to the other spans in a trace, because each span within a single trace may comprise the same global attributes. For example, if one span within a trace comprises a tag relating it to a request from a "gold" level "tenant," it may be inferred that other spans in the same trace are associated with the same request and, accordingly, from the same "gold" level "tenant." Consequently, the "tenant:gold" key-value pair or tag may be attributed to the other spans in the same trace.

"Span-level tags" comprise attributes that are specific to a particular span.

The term "root span" as used herein generally refers to the first span in a trace. A span without a parent is called a root span.

The term "child span" as used herein generally refers to a span that follows a root span, including a child of a child.

The term "parent span" as used herein generally refers to a span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user-request into a trace.

A "leaf span" is a childless span. As noted above, each span typically comprises information identifying its parent span. If a span in a trace that is not identified or referenced by an other span as a parent span, the span is considered a leaf span.

A "leaf error span" is a span that is the last span of a chain of error spans and does not have a child span that is also an error span. A leaf error span may be a childless span, in which case it would also be a "leaf span." A leaf error span may, however, have a child span, but that child span is not an error span.

A "metric" as used herein generally refers to a single quantifiable measurement at a specific point in time. Combining the measurement with a timestamp and one or more dimensions results in a metric data point. A single metric data point may include multiple measurements and multiple dimensions. Metrics are used to track and assess the status of one or more processes. A metric typically comprises a numeric value that is stored as a timeseries. A timeseries is a series of numeric data points of some particular metric over time. Each time series comprises a metric plus one or more tags associated with the metric. A metric is any particular piece of data that a client wishes to track over time.

A "client" as used herein generally refers to a user of a monitoring service (e.g., the monitoring service 306 shown in FIG. 3) for monitoring and diagnosing problems associated with a distributed application.

Figure 3:
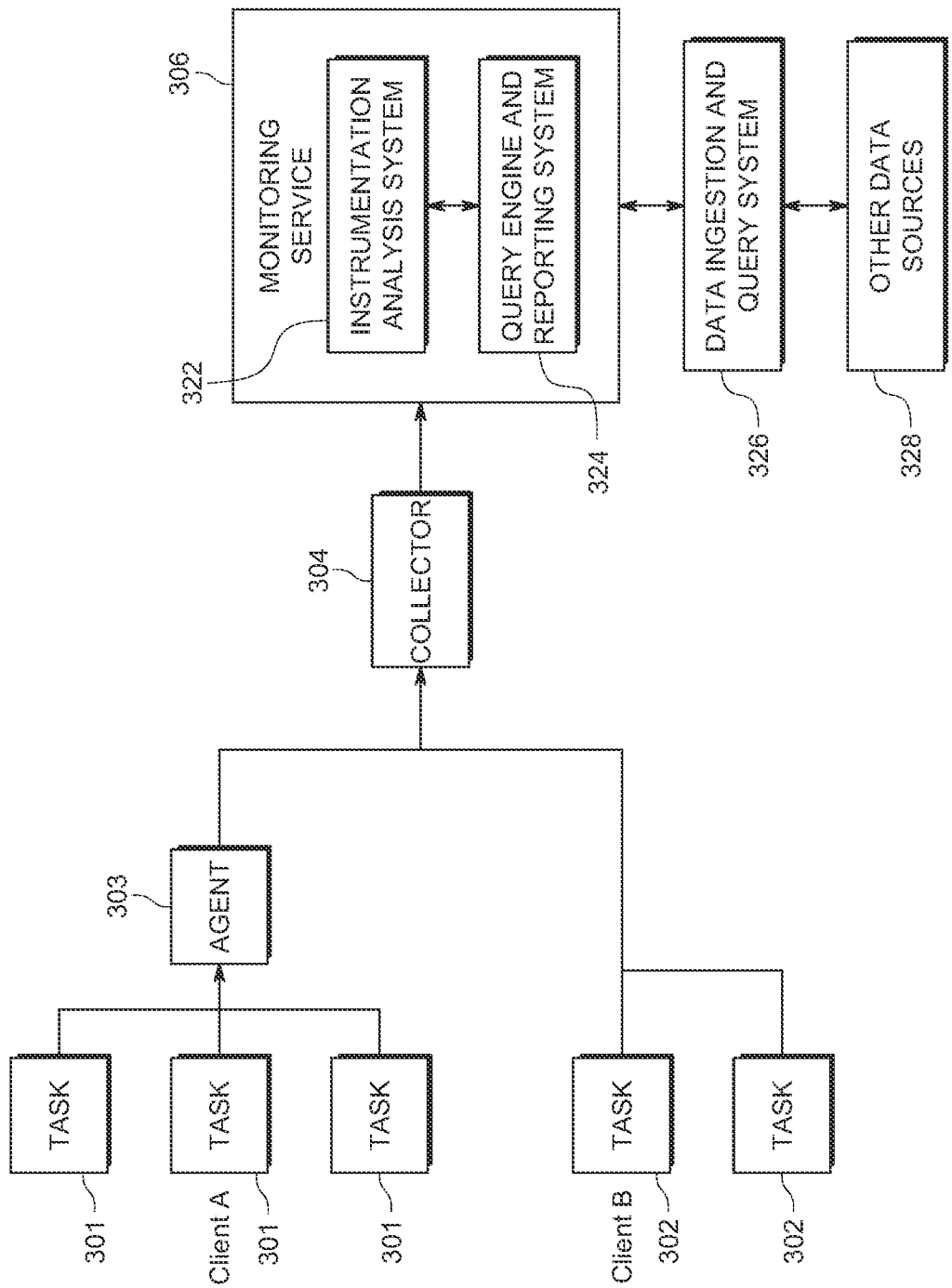
FIG. 3 is a flow diagram that illustrates the manner in which trace data may be collected and ingested for further analysis within a computer system, in accordance with implementations of the monitoring service disclosed herein.

A "user" as used herein generally refers to a user of the distributed application being monitored using the monitoring service (e.g., the monitoring service 306 shown in FIG. 3).

One of the fundamental shifts in modern day computing has been the shift from monolithic applications to microservices-based architectures. As previously mentioned, this is the shift from an application being hosted together (e.g., on a single system) to each piece of an application being hosted separately (e.g., distributed). FIG. 1A illustrates an exemplary monolithic multi-layer architecture. A monolithic application is traditionally built as a single unit. The monolithic application consists of a single self-contained unit in which code exists in a single codebase 100 and in which modules are interconnected. At deployment time, the entire codebase is deployed and scaling is achieved by adding additional nodes.

Figure 1B:
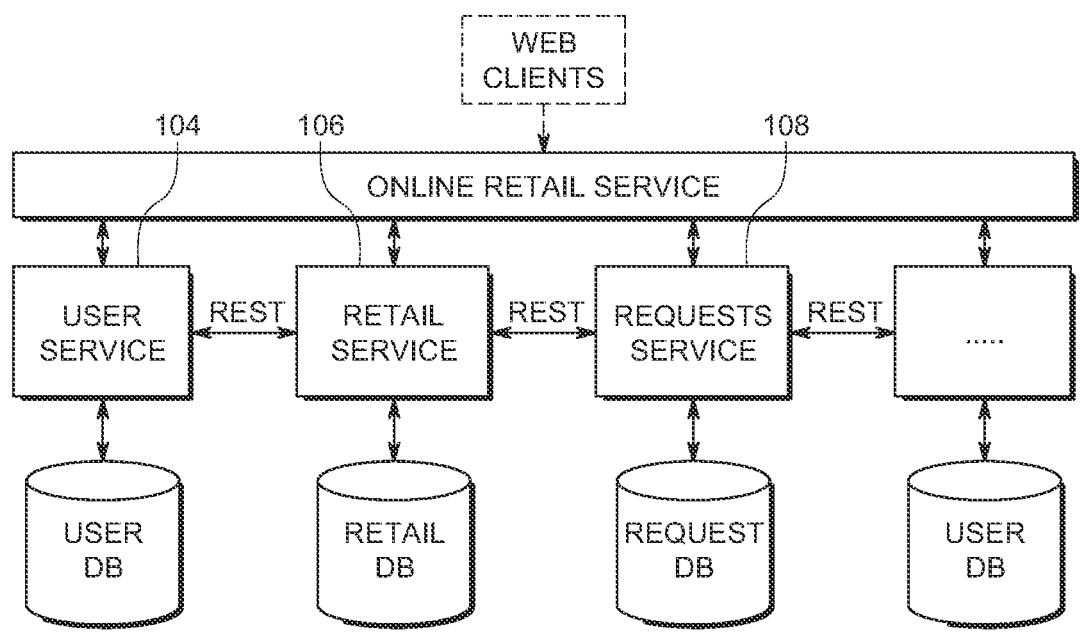
FIG. 1B illustrates an exemplary microservices architecture.

FIG. 1B illustrates an exemplary microservices architecture. A microservices architecture involves the building of modules (e.g., modules 104, 106 and 108) that address a specific task or business objective. As a result, these modules tend to exhibit low coupling and high cohesion. A microservices architecture is often achieved by decoupling a monolithic application into independent modules that each include the components necessary to execute a single business function. These services typically communicate with each other using language agnostic Application Programming Interfaces ("APIs") such as Representational State Transfer (REST).

Microservices were created in order to overcome the issues and constraints of monolithic applications. Monolithic applications have a tendency to grow in size over time. As applications become larger and larger, the tight coupling between components results in slower and more challenging deployments. Because of the tight coupling, the potential for a failure of the entire application due to a recently deployed feature is high. In some cases, deployments may take several months to a year, greatly reducing the number of features that may be rolled out to users. This tight coupling also makes it difficult to reuse and replace components because of the effect they may have on other components throughout the application.

Microservices address these issues by being small in scope and modular in design. Modular design results in components being loosely coupled, which offers enormous benefits from the standpoint of being both fault tolerant and independently deployable. This results in functionality that may be frequently deployed and continuously delivered. The attribute of loosely coupled modules without a central orchestrator in a microservices architecture, however, leads to considerable challenges in terms of monitoring, troubleshooting and tracking errors.

These challenges have led to the rise of observability, a new generation of monitoring, the foundation for which is built, in part, on distributed tracing. Distributed tracing, also called distributed request tracing, is an application performance monitoring (APM) method used to profile and monitor applications, especially those built using a microservices architecture. Distributed tracing helps pinpoint where failures occur and what causes poor performance. Distributed tracing, as the name implies, involves tracing user requests through applications that are distributed. A trace represents a single user request, also referred to as a transaction, and represents the entire lifecycle of a request as it traverses across the various services or components of a distributed system.

APM-based methods such as distributed tracing monitor the speed at which transactions are performed both by end-users and by the systems and network infrastructure that support a software application, providing an end-to-end overview of potential bottlenecks and service interruptions. This typically involves the use of a suite of software tools—or a single integrated SaaS or on-premises tool—to view and diagnose an application's speed, reliability, and other performance metrics in order to maintain an optimal level of service.

Figure 2A:
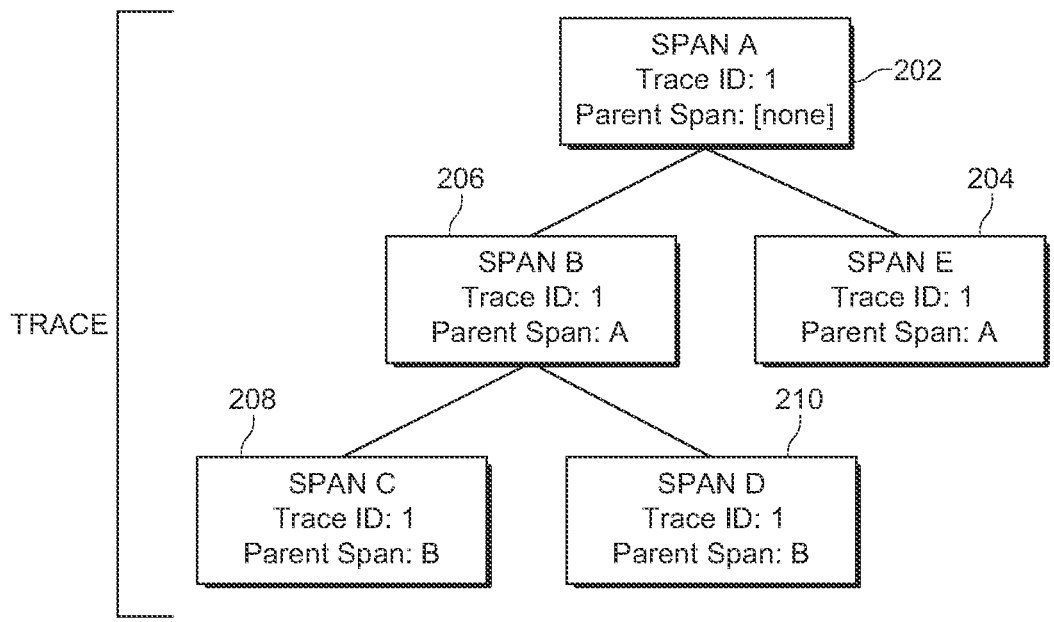
FIG. 2A illustrates an exemplary trace tree.

FIG. 2A illustrates an exemplary trace tree. The first span in the trace tree, Span A 202, is known as the root span. A trace tree typically comprises a root span, which is a span that does not have a parent. It may be followed by one or more child spans. Child spans may also be nested as deep as the call stack goes. Span B 206 and Span E 204 are child spans of the parent span, Span A. Further, Span C 208 and Span D 210 are child spans of the parent Span B 208.

Figure 2B:
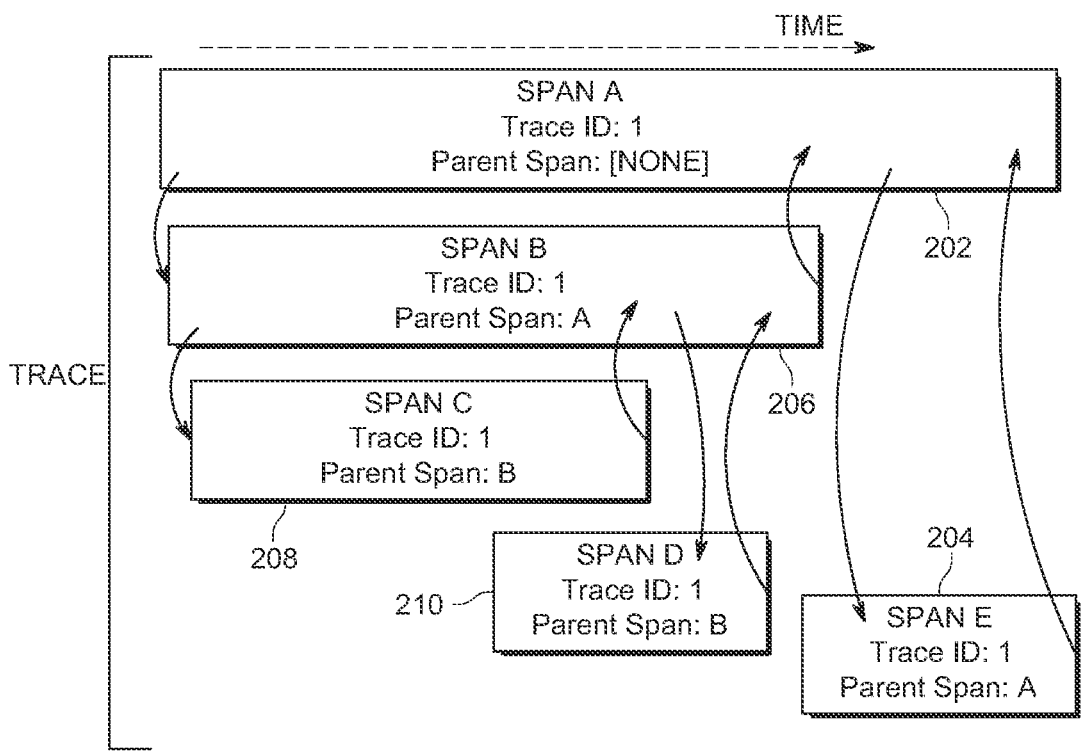
FIG. 2B illustrates an alternate view of the trace from FIG. 2A adjusted for timeline.

FIG. 2B illustrates an alternate view of the trace from FIG. 2A adjusted for timeline. The trace starts with the Span A 202, the root span, where the request starts. When the trace starts, a Trace ID is generated (e.g., Trace ID: 1 as shown in FIG. 2B), which follows the request as it propagates through the distributed system. A new span is generated for each logical chunk of work in the request, where the new span includes the same Trace ID, a new Span ID and a Parent Span ID, which points to the span ID of the new span's logical parent. The Parent Span ID creates a parent-child relationship between spans.

A given request typically comprises one span (e.g., the root Span A 202) for the overall request and a child span for each outbound call made to another service, database, or a function within the same microservice etc. as part of that request. For example, in the example of FIG. 2B, the Span A 202 is the root span for the overall request and generates several child spans to service the request. The Span A 202 makes a call to the Span B 206, which in turn makes a call to the Span C 208, which is a child span of the Span B 206. The Span B 206 also makes a call to the Span D 210, which is also a child span of the Span B 206. The Span A 202 subsequently calls the Span E 204, which is a child span of the Span A 202. Note, that the spans in a given trace comprise the same Trace ID. The Trace ID along with the Parent Span ID may be used to consolidate the spans together into a trace.

More specifically, when a user first interacts with an application that is instrumented for application performance monitoring, for example by clicking the checkout button on an application to generate a backend application programming interface (API) call, that request is assigned a unique trace ID. As the request moves sequentially through the system, every operation performed on it, called a "span" or a "child span," is tagged with the initial trace ID, as well as its own unique ID, plus the ID of the operation that originally generated the current request. In other words, every span associated with a particular trace is encoded with data about the microservice process performing that span, and a trace is a collection of related spans.

Data Collection

Distributed tracing data is generated through the instrumentation of microservices-based applications, libraries and frameworks. Software may be instrumented to emit spans and traces. The spans and traces may be generated according to an industry standard, such as the OpenTracing standard. Other common open source instrumentation specifications include OPENTELEMETRY and OpenCensus. Each span may be annotated with one or more tags that provide context about the execution, such as the client instrumenting the software, a document involved in the request, an infrastructure element used in servicing a request, etc.

The instrumentation handles the creating of unique trace and span IDs, tracking duration, adding metadata and handling context data. Handling context data, also known as context propagation is critical and is responsible for passing context such as the trace ID between function/microservice calls, thereby, enabling an observer to view the entire transaction at each step along the way. Context propagation may, for example, be based on REST. REST is header-based and requires a transaction to pass headers between service-to-service calls. In order to work properly, services within a request use the same context propagation format. Once the code has been instrumented and context propagation has been implemented using a standard format, the trace data generated by the services may be collected and analyzed to monitor and troubleshoot the microservices-based applications generating the trace data.

FIG. 3 is a flow diagram that illustrates the manner in which trace data may be collected and ingested for further analysis within a computer system, in accordance with an implementation of the monitoring service disclosed herein. Tasks 301 represent client applications that execute within a client data center for Client A. Similarly, tasks 302 represents client applications that execute within a client data center for Client B. The tasks 301 or 302 may comprise services or applications within a client's on-premises ("on-prem") software. Alternatively, they may comprise services or applications running in the cloud computing environment, e.g., in an AMAZON WEB SERVICES (AWS) Virtual Private Cloud (VPC).

The tasks 301 and 302 may be instrumented using open source or common commercial tracing libraries, from tracing applications (e.g., Jaeger or Zipkin), in-house formats, or auto-instrumentation. Each task may be configured to generate spans that describe the processing of a portion of a request as the request traverses through the various tasks (or services) on the client-side.

It should be noted that while the tasks 301 and 302 may comprise instrumented application software, the techniques disclosed herein are not limited to application software but are applicable to other kinds of software, for example, server software, software executing on customer devices, websites and so on. Furthermore, a client device (e.g., a device at a data center for Client A or Client B) may include any computing system that is configured to execute instrumented software, whether or not it is used for development of improved software. For example, the client device may be a computing system used for testing purposes, staging purposes, or any production system executing in an enterprise.

An agent 303 is typically configured at the client-side host or service for receiving spans collected from the various tasks on the client-side and transmitting the spans to a collector 304. An agent may receive generated spans locally using, for example, User Datagram Protocol (UDP). The tasks 302 may comprise instrumented tasks that are not using an agent and may be configured to span directly to the collector 304. While spans may be collected from the client-side tasks without configuring an agent (e.g., in the case of Client B), using an agent may provide benefits including batching, buffering and updating trace libraries.

Batches of span data collected by the agent 303 are periodically received at the collector 304. The collector may be implemented within a client's on-prem software or in the cloud computing environment (e.g., in an AWS VPC). Traces often generate duplicative data that is not relevant for monitoring or troubleshooting. The collector 304 may avoid redundancies by sampling the data before processing and storing it. The collector 304 runs the span data through a processing pipeline and may store it in a specified storage or analytics backend such a monitoring service 306. It should be noted that the collector 304 may interact with the monitoring service 306 through a network (not shown).

In an implementation, the collector 304 may consolidate data from several client devices and combine the data to send to the monitoring service 306. For example, the collector 304 may comprise a server that receives data streams internally from different client devices and, periodically, sends the combined data in batch form to the monitoring service 306. This allows efficiency of external communication from the enterprise.

In an implementation, the monitoring service 306 receives and analyzes the span data for monitoring and troubleshooting purposes. It should be noted that, in addition to monitoring service 306, tracing data might also be simultaneously transmitted to other types of storage and monitoring backend services, e.g., a data ingestion and query system 326.

In one implementation, the monitoring service 306 may be a Software as a Service (SaaS) based service offering. Alternatively, in another implementation, it may also be implemented as an on-prem application. The monitoring service 306 receives the observability data collected by the collector 304 and provides critical insights into the collected trace data to a client, who may be an application owner or developer. In an implementation, the monitoring service 306 may be hosted on a computing system that includes one or more processors, memory, secondary storage and input/output controller. The computing system used for hosting the monitoring service 306 is typically a server class system that uses powerful processors, large memory resources and fast input/output systems.

The monitoring service 306 may comprise an instrumentation analysis system 322 (also referred to herein as an "analytics engine") and a query engine and reporting system 324. The instrumentation analysis system 322 receives data comprising, for example, trace information, span information and/or values of metrics sent by different clients. As noted previously, task or software program may be instrumented to generate spans with a common field in their data structures to designate spans that are part of a common trace. For example, the spans may include a trace identifier such that spans with the same trace identifier are a part of the same trace.

The tasks (or software) executing on the client device are configured to send information generated as a result of instrumenting the software to the instrumentation analysis system 322 of the monitoring service 306. For example, the tasks may send span information collected from the various services at the client end to the instrumentation analysis system 322. Alternatively, traces may be sampled to generate metric values, and the tasks may send values corresponding to various metrics as they are generated to the instrumentation analysis system 322. The tasks may send group values of metrics periodically to the instrumentation analysis system 322. Different tasks may send the same metric or different metrics at different rates. The same task may send different metrics at different rates.

In an implementation, the tasks (e.g., tasks 301 and 302) and the collector 304 may send data to the monitoring service 306 by invoking an API supported by the monitoring service 306 and the instrumentation analysis system 322. In one implementation, a customer name may be specified for the instrumented software. The instrumented software includes the customer name when it identifies a data stream associated with that particular customer. The ability to associate a data stream with a customer allows the instrumentation analysis system 322 to perform customer specific analysis, for example, report on usages of systems for each customer, identify customers reporting more than a threshold number of errors and so on.

In one implementation, an application owner or developer may submit queries to the query engine and reporting system 324 to gain further insight into the spans and traces (or metrics) received and analyzed by the instrumentation analysis system 322. For example, the query engine and reporting system 324 within the monitoring service 306 may be configured to generate reports, render graphical user interfaces (GUIs) and/or other graphical visualizations to represent the trace and span information received from the various clients. The query engine and reporting system 324 may, for example, interact with the instrumentation analysis system 322 to generate a visualization, e.g., a histogram or an application topology graph (referred to interchangeably as a "service graph" or a "service map" herein) to represent information regarding the traces and spans received from a client. Alternatively, the query engine and reporting system 324 may be configured to respond to specific statistical queries submitted by a developer regarding one or more services within a client's application.

Logs, Traces and Metrics

As mentioned above, the shift from monolithic applications to microservices-based architectures has increased the usefulness of analyzing traces in a distributed system. In one or more implementations, the tracing data may be coupled with log data and/or metrics data, in order to provide clients with a more complete picture of the system. For example, the trace data may be coupled with log or other data from the data ingestion and query system 326. In one implementation the data ingestion and query system 326 may be comprised within the monitoring service 306.

One example of a data ingestion and query system 326 is the event-based data intake and query SPLUNK® ENTERPRISE system developed by Splunk Inc. of San Francisco, California. The SPLUNK® ENTERPRISE system is the leading platform for providing real-time operational intelligence that enables organizations to collect, index and search machine-generated data from various data sources 328, for example, websites, applications, servers, networks and mobile devices that power their businesses. In one implementation the other data sources 328 may be associated with the same clients (e.g., Client A and Client B) that generate the trace data received by the monitoring service 306.

The SPLUNK® ENTERPRISE system is particularly useful for analyzing data which is commonly found in system log files, network data and other data input sources. In another example, the data ingestion and query system 326 may be an on-premises application or based on a distributed or cloud-based service.

In one implementation, the trace data may be ingested into the data ingestion and query system 326, or may be coupled with outputs from the data ingestion and query system 326 e.g., from searches that may be based on trace data and run on the data ingestion and query system 326. In some implementations, the data ingestion and query system 326 described above may be integrated with or into the monitoring service 306 that analyzes trace data, e.g., the monitoring service 306. The monitoring service 306 may, accordingly, comprise a full suite of services including, for example, analyzing trace data, generating metrics data from the trace data, ingesting and analyzing log data, ingesting metrics data and providing insights generated from the metrics data, including aggregating and/or correlating trace data, log data and metrics data, in order to gain insights into a computing platform.

As described above, the trace data received from the collector 304 may be sent to systems configured to ingest and search data, such as the data ingestion and query systems 326 described above. In some implementations data ingestion and query system 326 may be configured to generate metrics data from the trace data received from the collector 304. Additionally, other implementations may use a stream processor that may perform transformations and other operations on incoming data prior to, concurrently with, and/or as an alternative to, ingestion of the data. In some implementations, the system may also be configured to ingest metrics data and may be optimized to ingest, query and generate insights from metrics data.

In other implementations, metrics may be generated by instrumentation (e.g., from instrumenting client software and tasks, e.g., tasks 301, 302 etc. as described above) and sent to a SaaS-based processing system, e.g., the monitoring service 306. For example, software may be instrumented to send metrics to a gateway or to a instrumentation analysis engine, where metrics may be aggregated, queried and alerted.

As above, the trace data may be paired with data from the data ingestion and query system 326, metrics generated by instrumentation, and other data sources, and correlated in various ways to provide insights. For example, as a broad-based correlation example, the metrics data may be used in a thresholding comparison to determine that there is an issue that needs attention, the trace data may be used to determine which component or microservice requires attention, and log data from the data ingestion and query system 326 may be used to determine exactly why the component or microservice needs attention. Other correlations and uses for the combination of metrics data, log data and event data are also contemplated herein. As noted above, the various features and services may be provided within an integrated monitoring platform (e.g., the monitoring service 306), wherein the platform comprises, among other things, an instrumentation analysis system (e.g., the instrumentation analysis system 322), a query engine and reporting system (e.g., the query engine and reporting system 324) and a data ingestion and query system (e.g., the data ingestion and query system 326).

Multiple Modalities for Storing and Analyzing Application Performance Monitoring (APM) Data APM methods such as distributed tracing are used to profile and monitor applications, especially those built using a microservices architecture, at the backend of a website or application. Historically, there have been several challenges associated with implementing an analytics tool such as the monitoring service 306 within a heterogeneous distributed system.

One of the challenges associated with microservices architectures, for example, is efficiently ingesting and aggregating significant amounts of span and trace data generated by various services in an architecture. Conventional tracing and monitoring systems are typically unable to ingest the vast amounts of span and tracing data generated by clients' application and have to resort to sampling the data intelligently to reduce the volume of stored trace data. Using sampling exclusively, however, results in loss of data and, as a result, conventional monitoring tools do not allow clients access to all the traces generated by their application. Furthermore, conventional monitoring tools may calculate metrics (e.g., requests, errors, latency, etc.) based on the sampled set of data and, accordingly, the calculations may be approximate at best and inaccurate at worst.

Advantageously, implementations of the monitoring service (e.g. monitoring service 306) disclosed herein allow clients of the monitoring service the ability to ingest up to 100% of the spans and create streams of metric data using the ingested spans prior to consolidating the spans into traces (through a sessionization process). The metric time series provide valuable real-time information pertaining to services or endpoints within an application and also allow alerts to be configured to manage anomalous behavior on the endpoints.

Implementations of the monitoring service disclosed herein also sessionize and store up to 100% of the spans received from the client in real time. Implementations of the monitoring service disclosed herein comprise an ingestion streaming pipeline that is able to ingest and consolidate the incoming spans into traces, and is further able to use advanced compression methods to store the traces. Additionally, because incoming trace and span information may be efficiently ingested and aggregated in real time, a monitoring platform is able to advantageously convey meaningful and accurate information regarding throughput, latency and error rate (without the need for sampling) for the services in the microservices-based application. High-cardinality metrics pertaining to throughput, latency and error rate may be calculated with a high degree of accuracy because all incoming data is accounted for and there is no data loss as a result of sampling.

Implementations of the monitoring service disclosed herein further allow a client to store and analyze the trace data using multiple modalities of analysis. In one implementation, a first modality comprise converting incoming spans from one or more clients into a plurality of metric data streams (also referred to as metric time series) prior to sessionizing the spans. Each metric time series is associated with a single span identity, where a base span identity comprises a tuple of information corresponding to an associated type of span. Each metric time series in this modality (referred to herein as "metric time series modality") represents a plurality of tuples, each tuple representing a data point. Key performance metrics (KPIs) can be extracted directly from the metric time series in real-time and reported to a client. Because the metric time series are created without paying a time penalty associated with sessionization, they can be used to perform real-time monitoring with sub-second resolution and generate alerts within two to three seconds if a condition is violated. Further, the real-time metrics associated with the metric time series modality may also be referred to as "monitoring metric sets."

In one or more implementations, a second modality of analysis sessionizes the incoming spans and supports deriving higher-cardinality metrics (as compared with metric time series data) for a selected set of indexed tags, e.g., client-selected tags, global tags of the trace, etc. over selected time durations (referred to herein as the "metric events modality"). This modality is particularly useful for clients that need accurate SLI information for a larger set of high-value indexed tags. The metric events modality enables developers to aggregate metrics that have been pre-generated using the sessionized trace data to efficiently respond to queries submitted by a client. The aggregated metrics provide a client visibility into the performance of services within a microservices-based application. The metric events modality may deprioritize speed as compared to the metric time series to provide a client resolution into a larger set of indexed tags. As such, responses provided by the metric events modality are typically slightly slower (e.g., 45 seconds to 1 minute) as compared with the sub-second response rates of the metric time series. Further, the higher-cardinality metrics associated with the metric events modality may also be referred to as "troubleshooting metric sets."

In one or more implementations, the metric events modality may also keep track of exemplary traces associated with a pre-configured set of indexed tags. The tags to be indexed may be pre-selected by the client or the monitoring platform. The Trace IDs may be used to retrieve the associated traces and analysis on the actual traces may be performed to generate more particularized information, e.g., span duration, span count, span workload percentage, etc. for each span in a given trace. In one implementation, once the traces are retrieved, an analysis may be run on an arbitrary set of tags (in addition to the pre-configured indexed tags).

Additionally, in one or more implementations, a third modality of analysis may comprise a "full-fidelity" modality where a full-fidelity analysis may be conducted on any dimension or attribute of data to gauge the performance of services in the microservices-based application. The full-fidelity modality allows clients to search most or all of the incoming trace data that was ingested by the monitoring platform without relying on sampling. The full-fidelity mode may sacrifice speed for accuracy, and may be used by clients that need a more thorough analysis of the services across every dimension or attribute.

In an implementation, the three modalities may be supported by the monitoring platform simultaneously by storing ingested trace data using three different formats, wherein each format corresponds to one of the three available modalities of analysis. Note that implementations of the monitoring service disclosed herein are not restricted to three discrete data sets. The data sets for the different modalities may overlap or may be saved as part of a single data set. When a client submits a query, the monitoring platform may determine which of the data sets is most suitable for addressing the query. Thereafter, the monitoring platform executes the query against the selected data set to deliver results to the client. By comparison, conventional monitoring systems typically focus on a single modality and do not provide clients the ability to seamlessly navigate between different modalities. Conventional monitoring systems also do not provide the ability to automatically select the most appropriate modality based on the content, structure, syntax or other specifics pertaining to an incoming query.

Figure 4:
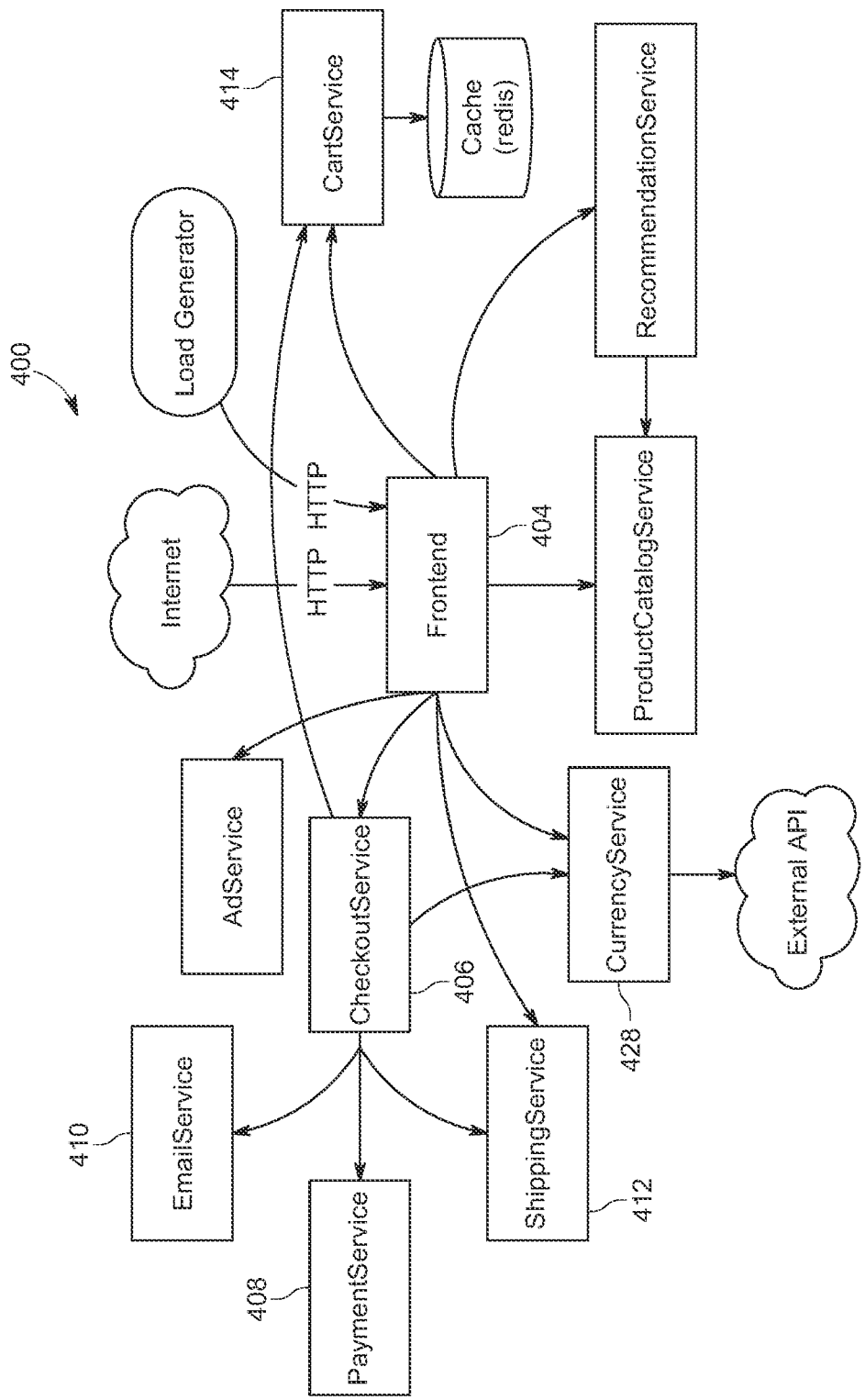
FIG. 4 illustrates components of an exemplary microservice application for an online retailer.

FIG. 4 illustrates components of an exemplary microservice application for an online retailer. A user needing to conduct a transaction may visit the website of the online retailer which would initiate a call to the retailer's Front-end service 404 on a server. The call to the the Front-end service 404 may subsequently trigger a chain of calls on the retailer's back-end that would not be transparent to the user. For example, if the user proceeds to complete the transaction by checking out, several calls may be made to the back-end to services such as a CheckOutService 406, a PaymentService 408, an EmailService 410, a ShippingService 412, a CurrencyService 428 and a CartService 414 that may be involved in processing and completing the user's transactions. Note, that a given request submitted by a user to the website would involve a subset of the services available and, typically, a single request would not result in a call to each of the services illustrated in FIG. 4.

As mentioned above, a request that the user initiates would generate an associated trace. It is appreciated that each user request will be assigned its own Trace ID, which will then propagate to the various spans that are generated during the servicing of that request. Each service may process a portion of the request and generate one or more spans depending on the manner in which instrumentation is configured for a respective service. The Trace ID may then be used by the server to group the spans together into a trace with that Trace ID. So, for example, the user's checkout transaction may generate a call at the Front-end service 404, which may in turn generate calls to various microservices including the CheckoutService 406. The CheckoutService 406 may, in turn, generate calls to other services such as the PaymentService 408, the EmailService 410 and the ShippingService 412. Each of these calls passes the Trace ID to the respective service being called, wherein each service in the call path could potentially generate several child spans.

It should be noted that a service does not necessarily need to make calls to other services—for instance, a service may also generate calls to itself (or, more specifically, to different operations and sub-functions within the same service), which would also generate spans with the same Trace ID. Through context propagation then, each of the spans generated (either by a service making a call to another service or a service making a call to various operations and sub-functions within itself) is passed the Trace ID associated with the request. Eventually, the spans generated from a single user request would be consolidated (e.g., by the collector 304 or the monitoring service 306 of FIG. 3) together using the Trace ID (and the Parent Span IDs) to form a single trace associated with the request.

As noted above, conventional distributed tracing tools are not equipped to ingest the significant amounts of span and tracing data generated by clients' application and have to resort to sampling the data intelligently to reduce the volume of stored trace data. Further, conventional distributed tracing tools do not provide application owners multiple modalities of storing and querying trace data with the flexibility of switching between the different modalities depending on the level of detail required to respond to a client's query.

Referencing FIG. 4 again, an owner of the application 400 may, for example, need varying degrees of detail regarding the services in the application. For example, the application owner may need to monitor certain metrics (e.g., RED metrics associated with Request, Errors, Durations) in real-time associated with a particular service, e.g., CheckoutService 406. Assuming there are errors generated by a call made from the Frontend service 404 to the CheckoutService 406, the owner may require further information pertaining to additional tags (indexed or non-indexed) associated with CheckoutService 406. The application owner may also need to access the full trace(s) associated with the request from the Frontend service 404 to the CheckoutService 406 to perform a more detailed analysis. Each of the requests requires a different degree of detail extracted from the span and trace information.

In one implementation, the metric time series modality allows the client to monitor RED metrics associated with a given service, e.g., CheckoutService 406 in the online retailer's application in real-time. In one implementation, the metric time series modality can also be configured to deliver real-time alerts to a client based on each of the RED metrics, e.g., anomalies related to the request rate, error rate, or latency (duration).

If the client needs Service Level Indicators (SLIs) pertaining to certain indexed tags related to the call between Frontend service 404 and CheckoutService 406 for a given time duration, the metric event modality may enable the client to perform aggregations of metrics data computed from the indexed tags associated with the spans generated by the call between the Frontend service 404 and the CheckoutService 406. The metrics aggregation may be a numeric summation, for example, and may be performed relatively quickly.

The metric event modality, in accordance with implementations of the monitoring service disclosed herein, associates the selected tags indexed from the incoming span data (e.g., the same indexed tags used for performing metrics extraction) with Trace IDs for exemplary traces. The Trace IDs may be used to retrieve the exemplary traces associated with indexed tags. Thereafter, the monitoring platform may analyze the exemplary traces to generate more particularized information, e.g., span duration, span count, span workload percentage, etc. for each span in a given trace. For the example of FIG. 4, if the client requires a performance summary for the spans generated by the call made from the Frontend service 404 to the CheckoutService 406, the associated query submitted by the client may access the data set associated with the metric event modality. Using the Trace IDs corresponding to the indexed tags, the monitoring platform may then perform the computations necessary on the corresponding exemplary traces to provide the client further information regarding the span performances. In an implementation, the client may also be able to extract meaningful information from the unindexed tags associated with the spans generated by the call using the exemplary traces.

If the client wants to search all the incoming trace data associated with the call between Frontend service 404 to the CheckoutService 406, implementations of the monitoring service disclosed herein provide a third modality of analysis. In the full-fidelity modality, a full-fidelity analysis may be conducted on any dimension or attribute of the trace data. For example, the client may be able to search previously indexed or unindexed tags across each of the traces associated with the call the between the Frontend service 404 and the CheckoutService 406. The full-fidelity modality allows an analysis to be performed across any relevant trace. Conventional tracing systems are unable to provide that level of flexibility and detail for developers or application owners needing to investigate performance issues with their applications. Note that this modality of analysis may be more time-consuming because trace data may be detailed and require significant storage space.

Implementations of the monitoring service disclosed herein ingest and aggregate the span information from the online retailer's application. Further, implementations of the monitoring service disclosed herein extract information from the incoming span data and store the information using multiple formats to support multiple modalities of data analysis for a client. Each modality is configured to allow the clients access to a different format in which incoming trace information may be represented and stored, where each format conveys a different degree of resolution regarding the ingested traces to a client and, accordingly, may occupy a different amount of storage space.

Figure 5:
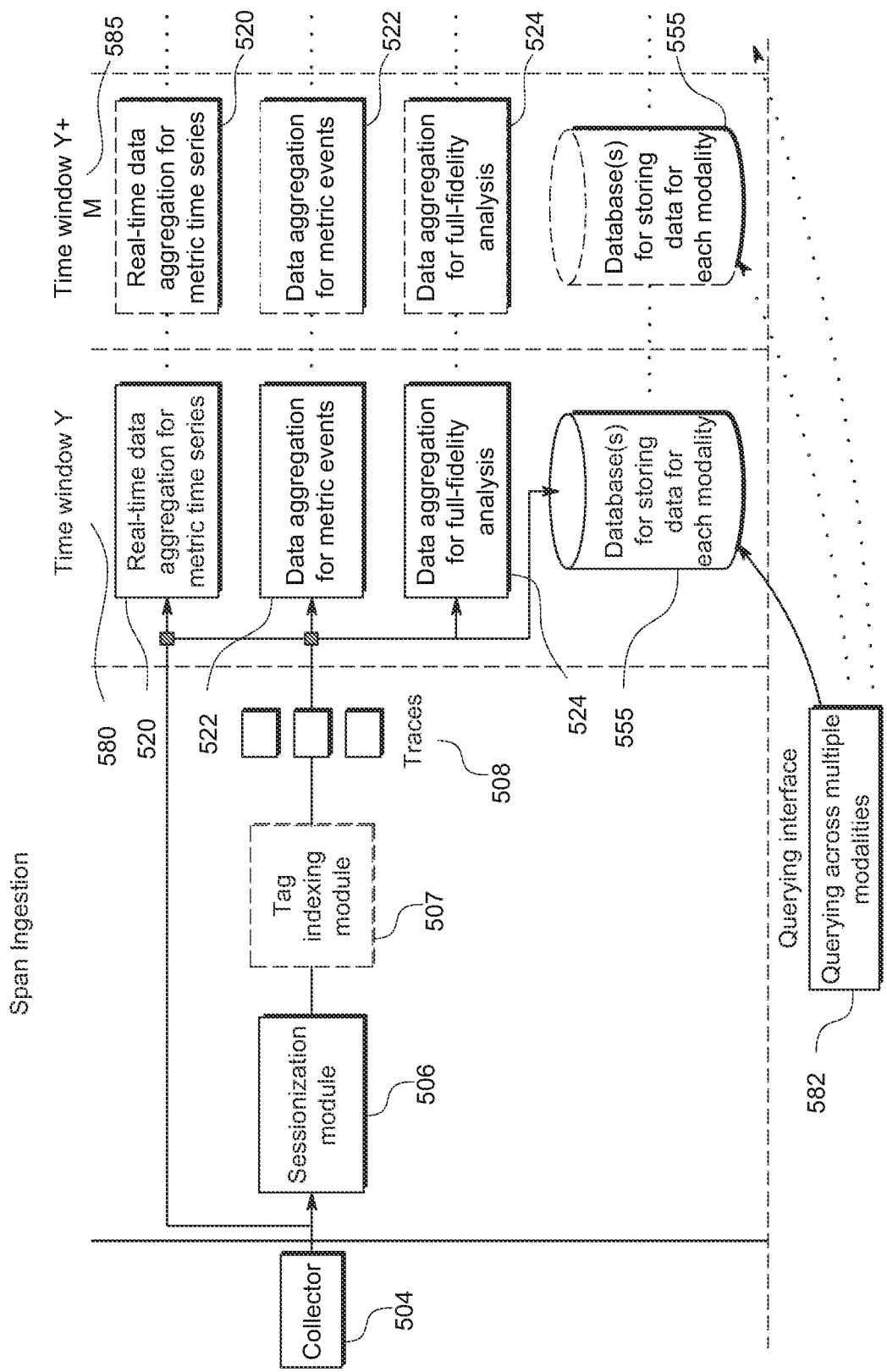
FIG. 5 is a flow diagram that illustrates an exemplary method of ingesting and aggregating span information to support multiple modalities of analysis, in accordance with implementations of the monitoring service disclosed herein.

FIG. 5 is a flow diagram that illustrates an exemplary method of ingesting and aggregating span information to support multiple modalities of analysis, in accordance with implementations of the monitoring service disclosed herein. As mentioned in connection with FIG. 3, span information is received at the monitoring service 306 from the collector (e.g., the collector 504 in FIG. 5).

As noted previously, in one implementation, incoming spans from one or more clients are converted into a plurality of metric data streams prior to consolidating the spans into traces through a sessionization process. The incoming spans are received and the metric data streams are generated by module 520 prior to the spans being sessionized. Because the metric time series are created without paying a time penalty associated with sessionization, they can be used to perform real-time monitoring and alerting.

The incoming spans are also sessionized where the span information is combined into traces in a process called sessionization. The sessionization module 506 is responsible for stitching together or combining the traces 508 using, among other things, the Trace IDs associated with each user-request (and typically also the Parent Span IDs of each span). Note that, in one implementation, the sessionized traces may also be inputted to the module 520 to create metric time series to track traces (separately from the time series created to track spans).

In addition to a Trace ID, each trace also comprises a time-stamp; using the time-stamps and the Trace IDs, the sessionization module 506 creates traces 508 from the incoming spans in real time and sessionizes them into discrete time windows. For example, the sessionization process may consolidate traces (from spans) within a first time window (associated with time window Y 580) before transmitting the traces to modules 520, 522, or 524. Thereafter, the sessionization process may consolidate traces within the subsequent time window (associated with time window "Y+M" 585) before transmitting those traces to the modules 520, 522, or 524. It should be noted that the time windows associated with each of the modules 520, 522, and 524 may be different. In other words, the metric time series data may be collected over short time windows of 10 seconds each. By comparison, traces for the metric events modality (associated with the module 522) may be collected over 10 minute time windows.

In some implementations of the monitoring service disclosed herein, the sessionization module is able to ingest, process and store all or most of the spans received from the collector 504 in real time. By comparison, conventional monitoring systems do not accept all of the incoming spans or traces; instead, they sample incoming spans (or traces) to calculate SLIs at the root level of a trace before discarding the spans. Implementations of the monitoring service disclosed herein, by comparison, comprise an ingestion streaming pipeline that is able to ingest and consolidate all the incoming spans into traces in real time, and is further able to use advanced compression methods to store the traces. Further, implementations of the monitoring service disclosed herein are able to generate metric time series from the span data (prior to sessionizing the spans) to provide real-time monitoring and alerting of certain KPIs.

As noted above, the sessionization module 506 has the ability to collect all the traces within a first time window Y 580 using the time-stamps for the traces. Subsequently, the sessionized traces are fed to the modules 522 and 524, for the respective modes (metric events and full-fidelity) for extraction and persistence.

In one implementation, subsequent to consolidation, the trace data is indexed by an optional tag indexing module 507, which indexes one or more tags in the trace data. The tags may be client-selected tags or tags that the monitoring platform is configured to index by default. In a different implementation, tag indexing may be performed as part of data aggregation, e.g., by module 522 associated with metric events.

In an implementation, data sets associated with each of the modalities may be persisted in one or more databases 555. As noted previously, the data sets for the respective modalities may be separate data sets, overlapping data sets or a single data set that supports all the modalities. Note that the databases 555 may be a single database that stores data sets corresponding to all three modalities. Alternatively, the databases 555 may represent different respective databases for each of the three modalities. Furthermore, the databases 555 may also represent distributed databases across which relevant information for each of the three modalities is stored.

In one implementation, data associated with each of the three modalities is generated at the time of ingestion and stored separately from each other. The structure, content, type or syntax of query submitted by a client will typically dictate which of the three modalities and corresponding data set will be selected. In one implementation, an interface through which the query is submitted may also determine which of the three modalities and corresponding data set is selected. In an implementation, there may be some commonality in the data for the three modalities in which case the storage for the data may overlap. An alternative implementation may also comprise one or two of the three modalities (instead of all three) described above.

A client may send in a request to retrieve information pertaining to an application through query interface 582. The underlying querying engine (e.g., the query engine and reporting system 324 from FIG. 3) will analyze the structure, content, type and/or syntax of the query, and also the interface through which the query is submitted, to determine which of the three modalities and respective data set to access to service the query. In an implementation, the three data sets corresponding to the three modalities are structured in a way that allows the querying engine to navigate between them fluidly. For example, a client may submit a query through the query interface 582, which may potentially result in the query engine accessing and returning data associated with the metric events modality. Thereafter, if the client requires more in-depth information, the querying engine may seamlessly navigate to data associated with a different modality (e.g., full-fidelity) to provide the client with further details. Conventional monitoring systems, by comparison, do not provide more than a single modality or the ability to navigate between multiple modalities of data analysis.

Metric Time Series

Implementations of the monitoring service disclosed herein allow trace data to be stored and analyzed using multiple modalities of analysis. In one implementation, incoming spans from one or more clients are converted into a plurality of metric data streams (also referred to as metric time series) and transmitted to the analytics engine (e.g., the instrumentation analysis system 322) for further analysis. Most of the metric data streams are created directly from the incoming spans prior to the sessionization process to generate metric time series related to spans. Each metric time series is associated with a single "span identity," where a base span identity comprises a tuple of information corresponding to an associated type of span. Each metric time series in the metric time series modality represents a plurality of tuples with each tuple representing a data point. KPIs can be extracted in real-time directly from the metric time series and reported to a client. Because the metric time series are created without paying a time penalty associated with sessionization, they can be used to perform real-time monitoring with sub-second resolution and generate alerts within two to three seconds if some condition is violated.

Generating Metric Data Streams Using Span Identities

A client application associated with, for example, an online retailer's website may potentially generate millions of spans from which a monitoring platform may need to extract meaningful and structured information. To organize the significant amounts of incoming span data, in an implementation, incoming spans may be automatically grouped by mapping each span to a base "span identity," wherein a base span identity comprises some key attributes that summarize a type of span. An exemplary span identity may be represented as the following exemplary tuple: {operation, service, kind, isError, httpMethod, isServiceMesh}, where the operation field represents the name of the specific operation within a service that made the call, the service field represents the logical name of the service on which the operation took place, the kind field details relationships between spans and may either be a "server" or "client," the isError field is a "TRUE/FALSE" flag that indicates whether a span is an error span, the httpMethod field relates to the HTTP method of the request for the associated span and the isServiceMesh field is a flag that indicates whether the span is part of a service mesh. A service mesh is a dedicated infrastructure layer that controls service-to-service communication over a network. Typically, if software has been instrumented to send data from a service mesh, the trace data transmitted therefrom may generate duplicative spans that may need to be filtered out during monitoring. Accordingly, the 'isServiceMesh' flag allows the analytics engine to filter out any duplicative spans to ensure the accuracy of the metrics computations.

In some implementations, the tuple used to represent the span identity may include other identifying dimensions as well. For example, if a client needs visibility into metadata tags from the spans in addition to the dimensions extracted for a base span identity by default (e.g., service, operation, kind, etc.), an extended identity may be created. An extended identity supports custom dimensionalization by a client, where dimensionalization refers to the ability to extract information pertaining to additional tags or metadata in a span. An extended identity provides a customer the ability to dimensionalize the span using pre-selected dimensions. Conventional methods of monitoring by comparison did not offer customers the flexibility to add custom dimensions to streams of metric data. An extended identity comprises the span's base identity and additionally a map of the span's tag key:value pairs that matched a client's configuration settings. An exemplary extended identity may be represented as the following exemplary tuple: {operation, service, kind, isError, httpMethod, isServiceMesh, keyValueMap . . . }, where the keyValueMap field represents one or more additional tags or dimensions configured by the client to be extracted as part of the span's identity, e.g., customer name, member ID, etc.

By extracting information related to additional tags, higher cardinality metrics may be computed using the metric time series modality. Further, a client is able to configure alerts on the custom dimensions as well, wherein the alerts inform a client if a particular dimension has crossed some critical threshold. In alternate implementations of the monitoring service disclosed herein, the tuple used to represent a span's base or extended identity may contain fewer elements.

If the tuple of information of an incoming span happens to be the same as another span, both spans relate to the same identity. In an implementation, spans with the same base identity may be grouped together. A fixed size bin histogram is generated for each span identity to track metrics associated with the span identity. In this way the same type of spans are organized together and the client can track one or more metrics associated with each group of spans sharing a common identity. In an implementation, a fixed size bin histogram is generated for each unique span identity. The fixed size bin histogram may be a data structure, for example, that is preserved in memory.

As noted above, each span identity may be tracked with a respective histogram. The histograms associated with the corresponding span identities, in one implementation, are generated and updated in fixed time duration windows. For example, histogram data may be generated for the incoming spans in memory every 10 seconds. At the end of each fixed duration, metrics associated with the histograms are emitted and the histogram is reset for the next time window. By emitting metrics for each time duration, data streams of metrics may be generated from the histogram data. The streams of metric data associated with each span identity, in one implementation, may be aggregated by a monitoring platform to provide a client meaningful information regarding the application being monitored.

Figure 6:
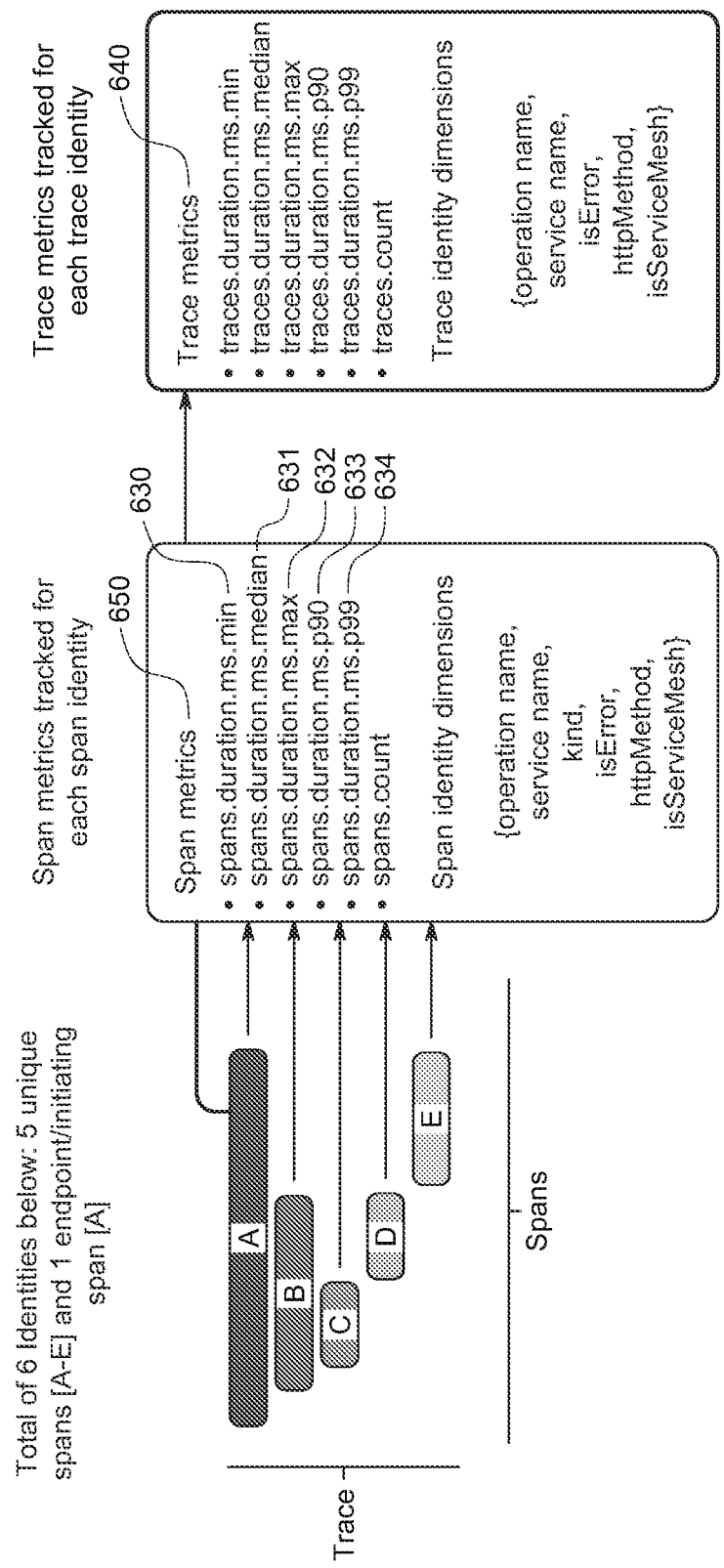
FIG. 6 illustrates the manner in which span metrics and trace metrics are generated, in accordance with implementations of the monitoring service disclosed herein.

FIG. 6 illustrates the manner in which span metrics and trace metrics are automatically generated, in accordance with implementations of the monitoring service disclosed herein. FIG. 6 illustrates 5 unique spans (A-E) including a root span (an initiating span) A. In an implementation, each group of spans identified by the same span identity is associated with one or more span metrics 650. For example, a minimum span duration 630, a median span duration 631, a maximum span duration 632, a p90 latency value 633, a p99 latency value 634 and a span count (how many times a particular identity was counted) may be tracked for each span identity. A histogram corresponding to the span identity may track these metrics over fixed sized durations, e.g., 10 seconds. For example, over a 10 second window, the histogram may comprise fixed size bins that track a minimum span duration, a median span duration, a maximum span duration, a p90 value, a p99 value and a count of all spans received corresponding to a given identity. At the end of each duration, the metrics are emitted and the histogram is reset. The emitted metrics are used to generate streams of metrics data corresponding to each span identity. Each data point on a metric data stream comprises the span identity dimensions or the extended identity dimensions if the client has configured additional metadata to be extracted from the spans.

As shown in FIG. 6, in an implementation, the initiating span A comprises a trace identity that is used to emit trace metrics 640. The initiating span A helps define an identity for a trace which allows the monitoring platform to logically group together all traces that represent the same flow through an endpoint of the application. The duration of the identity for a trace is calculated as the end time of the latest span in the trace minus the start time of its initiating span. An exemplary trace identity may be represented as the following exemplary tuple: {operation, service, isError, httpMethod, isServiceMesh}, where the operation field represents the name of the specific operation within a service that made the call, the service field represents the logical name of the service on which the operation took place, the isError field is a "TRUE/FALSE" flag that indicates whether the trace is associated with an error, the httpMethod field relates to the HTTP method of the request for the associated trace and the isServiceMesh field is a flag that indicates whether the trace is part of a service mesh. The trace metrics 640 are computed after the spans have been consolidated into a trace following a sessionization process. The trace metrics are also turned into streams of metric data similar to the metric time series associated with the spans.

Figure 7:
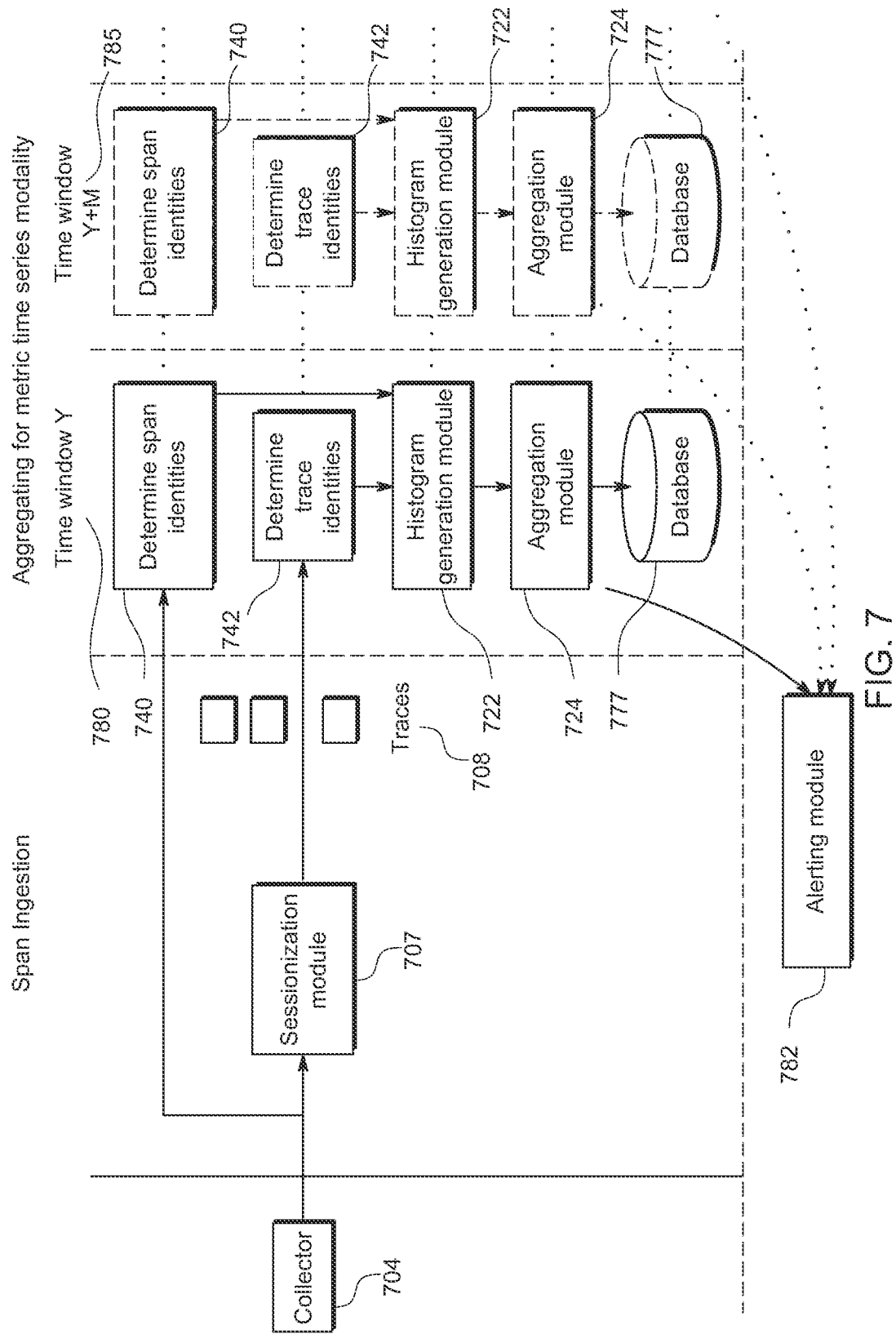
FIG. 7 is a flow diagram that illustrates an exemplary method of generating metric time series from ingested spans, in accordance with implementations of the monitoring service disclosed herein.

FIG. 7 is a flow diagram that illustrates an exemplary computer implemented method of generating metric time series from ingested spans, in accordance with implementations of the monitoring service disclosed herein. As mentioned previously, incoming spans are received at a monitoring service from a collector 704. Prior to being sessionized, span identities are generated for the spans and the spans with identical base identities are grouped together by module 740.

In one implementation, a histogram generation module 722 generates a histogram respective to each span identity. The histogram may represent a distribution of durations for a set of spans. Information from each incoming span (e.g., span duration information) corresponding to a given span identity is added to the fixed size bins of the respective histogram for the identity. The histogram is maintained for a fixed sized time window Y 780 (e.g., 10 seconds) after which the histogram generation module 722 emits the aggregated metrics and resets all the counters in the histogram for the next segment. Subsequently, the histogram generation module 722 generates metrics for the next duration of time Y+M 785, and emits metrics corresponding to that time window. In this way, histogram generation module periodically emits one or more metrics (e.g., six span metrics as seen in FIG. 6), including client-configured custom metrics, corresponding to each type of span to the analytics engine.

In one implementation, the span information is also combined into traces 708 using a sessionization module 707 as discussed in connection with FIG. 5. The sessionization process may consolidate traces (from spans) within a first minute window (associated with time window Y 1480). Thereafter, the sessionization process may consolidate traces within the subsequent window (associated with time window "Y+M" 1485). Trace identities are determined for the sessionized traces 708 using module 742 after which the trace metrics (as discussed in connection with FIG. 6) are determined using the histogram generation module 722 in a process similar to the manner in which span metrics are generated.

In an implementation, an aggregation module 724 may aggregate the periodic metric data from the histogram generation module 722 and create metric time series from the data for each span identity. In some implementations, the aggregation module 724 may generate quantized data streams from the metric data received from the histogram generation module 722. The quantized data stream has data values occurring periodically at fixed time intervals.

In one implementation, the aggregation module 724 may identify a function for aggregating the metric for which values are provided by one or more input data streams. The aggregation module 724 generates the quantized data streams by determining an aggregate value for each input data stream for each fixed time interval by applying the identified function over data values of the input data stream received within the fixed time interval. The aggregation module 724 may further receive a request to evaluate an expression based on the data values from the input data streams. The system periodically evaluates the expression using the data values of the quantized data streams.

In one implementation, the aggregation module 724 may, for example, perform aggregations on the various metric time series to provide real-time monitoring of certain higher priority endpoints in the application. For example, aggregations may be performed to determine request, error and latency metrics for certain designated services. In order to do that, the aggregation module 724 may, for example, aggregate values across all span identities that are associated with the designated service.

Further, in some implementations, alerting module 782 may monitor one or more metric time series from the aggregation module 724 and may be configured to generate alerts if certain metrics being monitored exhibit anomalous behavior. For example, if a maximum span duration associated with a given span identity crosses over a certain threshold, an alert configured using the alerting module 782 may be triggered. The alert may, for example, be responsive to a metric time series associated with span metric 632 from FIG. 6, wherein the alert is triggered if the maximum span duration exceeds a given threshold.

In one implementation, the histograms generated by the histogram generation module 722 may be stored in database 777. In an implementation, the histogram data may be stored as parquet-formatted files.

In an implementation, the instrumentation analysis system 322 compares durations of a set of similar spans (e.g., spans for the same span identity) with the tags associated with these spans and determines whether there are any patterns for a given tag. As discussed above, the analysis system 322 generates a histogram that may represent a distribution of durations for a set of spans. For a given tag, the analysis system calculates a p-value indicating the likelihood that the ranks of the spans for that tag in the distribution arose by chance. In particular, the analysis system may calculate a p-value of the Mann-Whitney U-statistic comparing the ranks of the durations of the traces having the tag to the other traces in the distribution. A larger U-statistic indicates that the spans for that tag skew rightward, i.e., that they tend to have long durations relative to other spans in the distribution. The analysis system can provide alerts regarding the tags whose spans have relatively long duration. Long duration spans may be indicative of configuration problems at the instrumented systems. The analysis system may correct the p-value for the number of hypotheses tested, for example by multiplying the p-value by the total number of tags. This procedure defines a map from tags to non-negative real numbers. The analysis system sorts the tags by the associated p-value (e.g., in ascending order) and returns those with p-value less than or equal to some threshold, e.g., 0.01.

Real-Time Monitoring Using Metric Time Series Data

Figure 8:
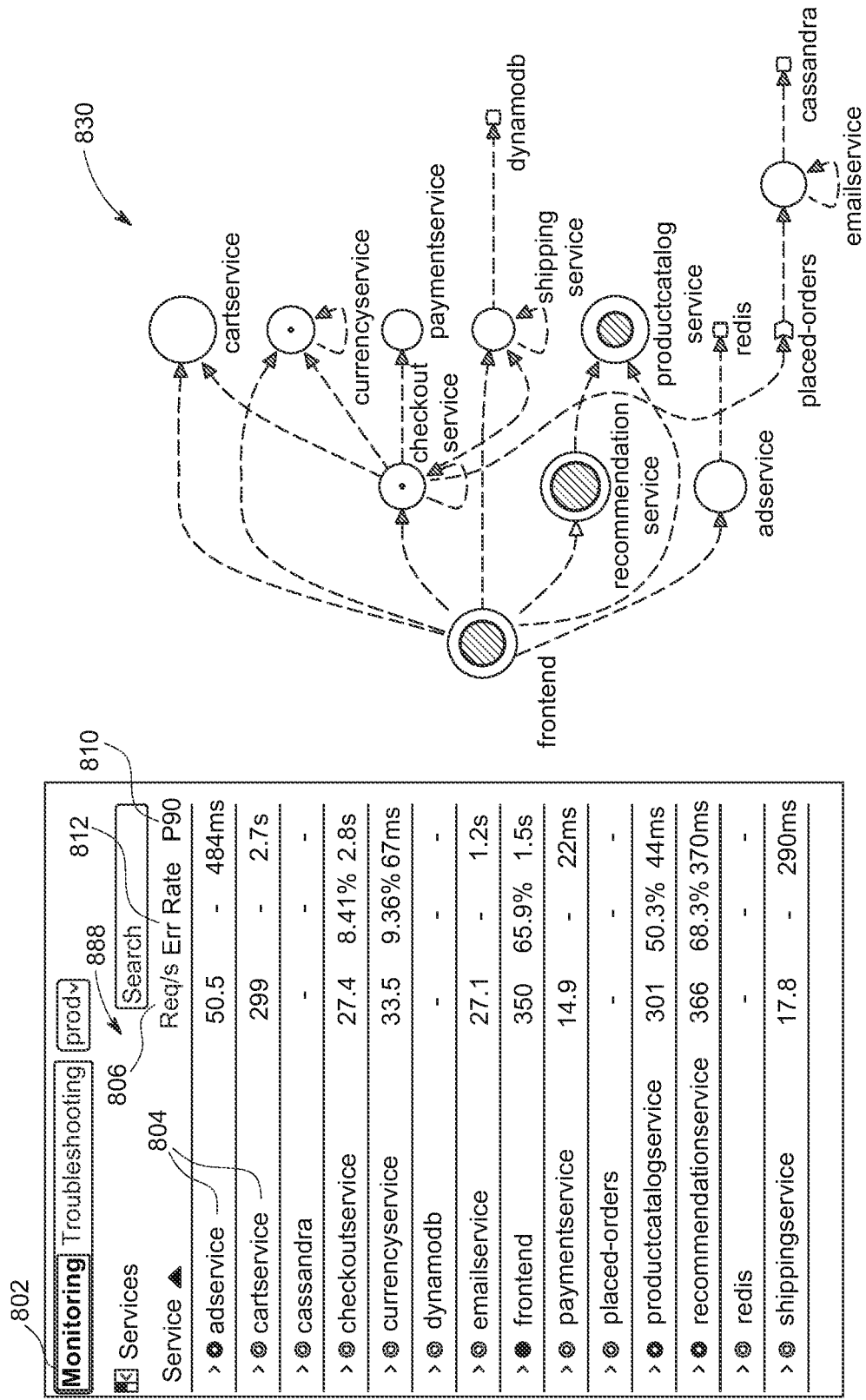
FIG. 8 illustrates an exemplary on-screen GUI illustrating a monitoring mode for an application displaying metric values aggregated from metric time series data, in accordance with implementations of the monitoring service disclosed herein.

FIG. 8 illustrates an exemplary on-screen GUI illustrating a monitoring mode for an application displaying metric values aggregated from metric time series data, in accordance with implementations of the monitoring service disclosed herein. In one implementation, the GUI of FIG. 8 displays a monitoring mode indication when a corresponding monitoring mode option 802 is selected. The monitoring mode displays a panel 888 listing services 804 comprised within the application being monitored. Each service is displayed alongside metrics pertaining to requests/second 806, error rate 812 and P90 latency values 810. The metrics data displayed in the panel 888 is computed in real-time and is aggregated using the metric time series data. In an implementation, an aggregation module similar to the aggregation module 724 discussed in connection with FIG. 7 performs the necessary aggregations from the various metric time series to display metrics associated with each of the services. The service level KPIs may be computed through the real-time aggregation pipeline discussed in connection with FIG. 7 before the histogram metadata is stored in the backend of the analytics engine.

The monitoring mode also comprises an application topology graph 830. The service graph 830 facilitates visualizing cross-service relationships between services comprised within the application and external to the application (as will be discussed further in connection with the metric events modality). In an implementation, the service graph may be created using information gleaned from the metric time series data aggregated by the aggregation module 724 discussed in connection with FIG. 7.

By ingesting up to 100% of the incoming spans from the client software and implementing monitoring service 306 as a Software as a Service (SaaS) based service offering, implementations of the monitoring service disclosed herein advantageously retain valuable information pertaining to the spans that is further analyzed in the SaaS backend. Span identities and histogram information (e.g., various counts and metrics data) associated with the incoming spans that are stored may be used to conduct further analysis. For example, metadata may be analyzed to identify certain offending services or operations, and data regarding those services or operations may be surfaced for further analysis.

Conventional monitoring systems typically expunged the span data after extracting the relevant metrics from them. By comparison, implementations of the monitoring service disclosed herein retain high-fidelity information related to all the incoming spans for deeper analysis. The metadata retained provides a client the ability to filter based on certain dimensions and services that would not have been possible using conventional monitoring systems. Further, the metadata retained may be used in conjunction with data sets for other modalities such as metric events and full-fidelity to allow a client to provide a thorough investigation of an alert.

In one implementation, using, for example, the "service," "operation," and "kind" fields in the tuple, the aggregation module 724 (from FIG. 7) may be able to determine span identities associated with cross-service calls. Spans associated with inter-service calls are of interest to a client because they provide client information regarding the manner in which two services within an application are interacting. Implementations of the monitoring service disclosed herein are able to advantageously use the metadata saved for the metric time series to perform post-processing and determine services associated with inter-services calls. For example, the value of the "kind" field related to a span identity may be either "client" or "server" where the analytics engine may be able to use that information in post-processing to determine if the span is related to a cross-service call.

If it is determined that a particular span is related to a cross-service call, those spans could be processed through the analytics engine to discover further information regarding the dependencies. For example, in one implementation, if a client identifies a span identity associated with a cross-service call or a span identity associated with a high value operation, the client may create an extended identity for the corresponding span identities and supplement those identities with additional custom dimensions to be monitored. For example, the client may want to monitor a customer name association with such spans. The client may simply reconfigure the analytics engine to extract the additional customer name dimension as part of the spans' extended identity.

Retaining span information associated with incoming spans provides a client additional metadata to perform intelligent processing. In an implementation, the client may only collect data pertaining to select operations. In other words, the client may filter out data pertaining to select operations that are of less interest to a client.

The number of unique span identities may typically roughly correlate with the number of unique operation names present on the span. In an implementation, the client is able to turn off or filter out span identities associated with certain operations if they are not particularly useful. In other words, the monitoring platform can be configured to turn off metric generation related to selected span identities. This advantageously reduces loads on the metrics analytics engine because it does not need to track and store metric time series for spans that are of little interest to a client. For example, spans associated with calls that a service makes to operations internal to the service do not convey information and can be filtered. Accordingly, additional resources can be directed towards processing spans associated with services and operations that are of greater interest to a client. Conventional monitoring systems by comparison would not have the flexibility to selectively focus on spans associated with high value services or operations by filtering out the less valuable spans.

Metric Event Modality

The metric event modality generates and stores aggregated rows of metrics values for selected indexed tags from the incoming trace data for given time durations. The selected tags may, for example, be indexed from the incoming spans when the spans are ingested. Metrics data may, for example, comprise, but is not limited to, number of requests (e.g., between two services), number of errors and latency. The aggregated rows of metrics data are stored efficiently for fast aggregation. The metric events data may be rapidly vectorized and aggregated in response to queries from a client.

Figure 9:
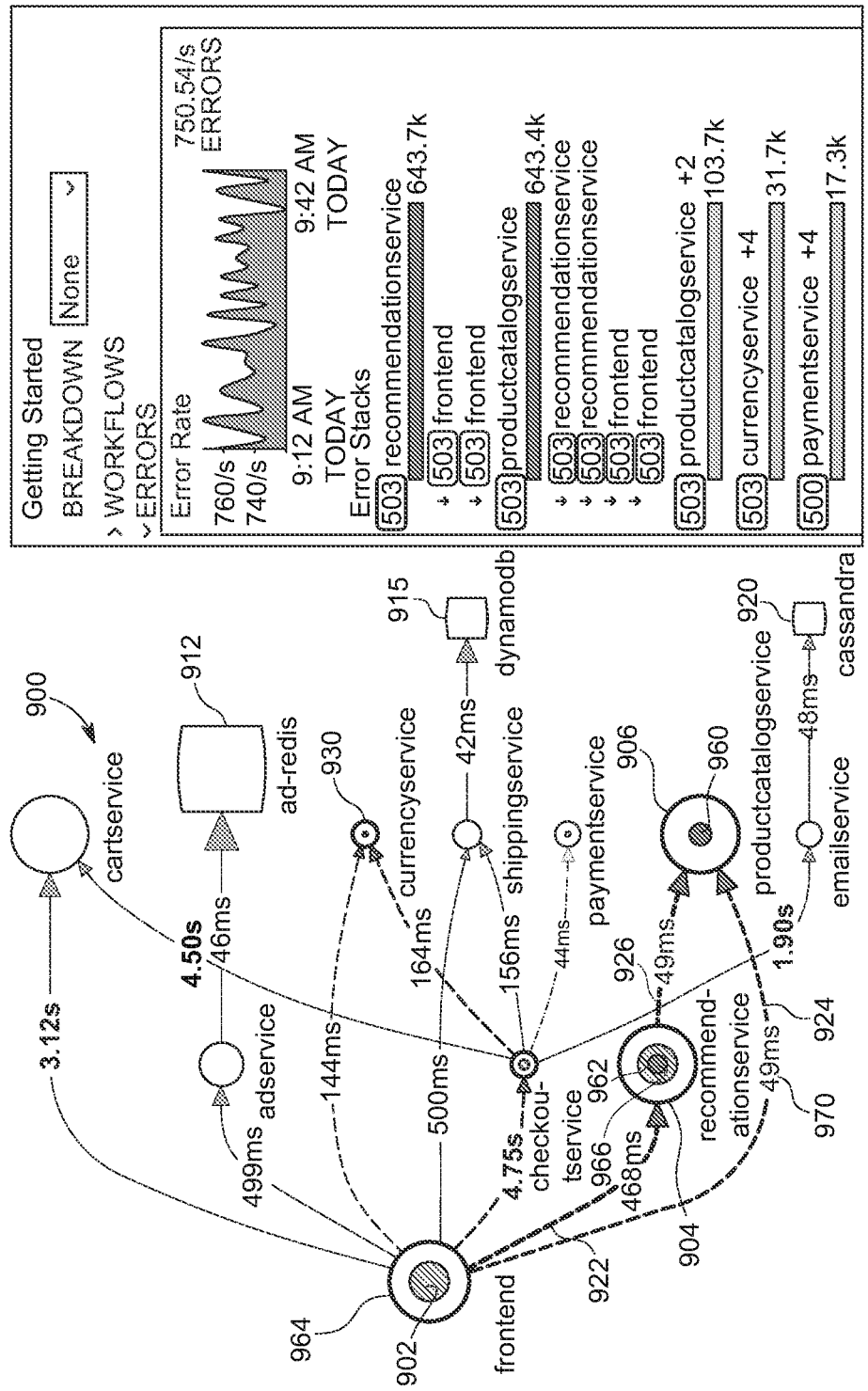
FIG. 9 illustrates an exemplary on-screen GUI comprising an interactive topology graph for an application created from the aggregated metric events data, in accordance with implementations of the monitoring service disclosed herein.

Implementations of the monitoring service disclosed herein use the aggregated rows of metrics data created in association with the metric events modality to generate a full-context application topology graph using the metric events data (e.g., by module 522 in FIG. 5). FIG. 9 illustrates an exemplary on-screen GUI comprising an interactive topology graph for an application created from the aggregated metric events data, in accordance with implementations of the monitoring service disclosed herein. The service graph facilitates visualizing cross-service relationships between services comprised within the application and external to the application. The exemplary GUI of FIG. 9 also enables customers to track the causal chain of operations resulting in an error.

It should be noted that the service graph may also be generated using the metric time series data as noted earlier, however, storage for the metric events data set may be significantly less because it does not need to store as much metadata as metric time series data. Accordingly, generating the service graph using metric events data is more efficient from a storage standpoint.

FIG. 9 illustrates an on-screen GUI comprising an interactive full-context service graph 900, which is constructed for an exemplary microservices-based application using the metrics data generated in connection with the metric events modality. Each circular node (e.g., nodes associated with services 902, 904 and 906 of FIG. 9) represents a single microservice. Alternatively, in an implementation, a circular node may also represent a group of multiple microservices, where the GUI for the monitoring platform (associated with, for example, the monitoring service 306) provides a client the ability to expand the node into its sub-components.

In an implementation, services that are part of the client's application may be represented differently from services that are external to the client's application. For example, circular nodes (e.g., nodes associated with services 902, 904 and 906) of the exemplary application represented by service graph 900 are associated with services comprised within the client's application. By contrast, squarish nodes (e.g., nodes associated with databases dynamodb 915, Cassandra 920, ad-redis 912) are associated with services or databases that are external to the client's application.

A user may submit a request at the front-end service 902; the user's request at the front-end service 902 may set off a chain of subsequent calls. For example, a request entered by the user at the front end of the platform may generate a call from the front-end service 902 to the recommendation service 904, which in turn may generate a further call to the product catalog service 906. As noted previously, a chain of calls to service a request may also comprise calls that a service makes to internal sub-functions or operations within the same service.

Each edge in the service graph 900 (e.g., the edges 922, 924 and 926) represents a cross-service dependency (or a cross-service call). The front-end service 902 depends on the recommendation service 904 because it calls the recommendation service 904. Similarly, the recommendation service 904 depends on the product catalog service 906 because it makes a call to the product catalog service 906. The directionality of the edge represents a dependency of a calling node on the node that is being called. Each of the calls passes the Trace ID for the request to the respective service being called. Further, each service called in the course of serving the request could potentially generate several spans (associated with calls to itself or other services). Each of the spans generated will then carry the Trace ID associated with the request, thereby, propagating the context for the trace. Spans with the same Trace ID are, thereafter, grouped together to compose a trace.

In some implementations, the GUI comprising service graph 900 may be configured so that the nodes themselves provide a visual indication regarding the number of errors that originated at a particular node versus errors that propagated through the particular node but originated elsewhere. In an implementation, the high-cardinality metrics data aggregated in association with the metric events modality may be used to compute the number of errors that are used to render the nodes of the service graph.

For example, as shown in the service graph of FIG. 9, the front-end service 902 makes calls to the recommendation service 904. Errors may be generated at the recommendation service 904 not only in response to calls from the front-end service 902, but also in response to calls that the recommendation service 904 makes to itself (e.g., in response to sub-functions or operations that are part of recommendation service). For such errors, the recommendation service 904 would be considered the "originator" for the error. The recommendation service 904 also makes calls to the product catalog service 906 and these calls may result in their own set of errors for which the product catalog service 906 would be considered the error originator. The errors originating at the product catalog service 906 may propagate upstream to the front-end service 902 through the recommendation service 904; these errors would be observed at the recommendation service 904 even though the recommendation service 904 is not the originator of those errors.

It is appreciated that conventional monitoring technologies would not provide adequate means for a client to distinguish between errors that originated at the recommendation service 904 versus errors that propagated through the recommendation service 904 but originated elsewhere. By performing computations using the metrics data associated with the metric events modality, implementations of the monitoring service disclosed herein are able to render a service graph that visually indicates critical information regarding the services in an architecture, e.g., number of requests between services, the number of errors generated by a service, number of errors for which the service was the root cause, etc. The service graph 900 allows clients the ability to visually distinguish between errors that originated at the recommendation service 904 as compared with errors that simply propagated through the recommendation service 904. As shown in FIG. 9, the node associated the recommendation service 904 comprises a solid-filled circular region 966 and a partially-filled region 962, where the region 966 represents errors that originated at the recommendation service 904 while the region 962 represents errors that propagated through the recommendation service 904 but originated elsewhere (e.g., at the product catalog service 906).

Similarly, solid-filled region 960 within the node associated with the product catalog service 906 represents the errors that originated at the product catalog service. Note that the errors returned by the product catalog service 906 originated at the product catalog service. In other words, the product catalog service 906 does not have errors from another downstream service propagating through it because it does not make calls to another service that is further downstream in the execution pipeline. Conversely, the front-end service 902 comprises a partially-filled region 964 because the errors observed at the front-end service 902 propagated to it from other downstream services (e.g., the recommendation service 904, the currency service 930, the product catalog service 906, etc.) The front-end service 902 was not the originator of errors in the example shown in FIG. 9. Note that in other implementations solid-filled regions (e.g., region 966) and partially-filled regions (e.g., region 964) may be represented differently. For example, different shades, patterns, or colors may be used to distinguish these regions from each other.

Implementations of the monitoring service disclosed herein use the aggregated rows of metrics data created for the metric events modality to determine full-fidelity SLIs associated with the services in an application (e.g., by the module 522 in FIG. 5). An SLI is a service level indicator—a defined quantitative measure of some aspect of the level of service that is provided. The SLIs are aggregated and extracted for the various services in a microservices architecture so that the behavior of applications may be understood. Most clients consider request latency—how long it takes to return a response to a request—as a key SLI. Other common SLIs include the error rate (often expressed as a fraction of all requests received) and system throughput, typically measured in requests per second. The measurements are often aggregated over a measurement window using the metrics data associated with the metric events modality and then turned into a rate, average, or percentile.

In one implementation, the GUI comprising service graph 900 is interactive, thereby, allowing a developer to access the SLIs associated with the various nodes and edges within the application by interacting with respective portions of the service graph. Referring to FIG. 9, in an implementation, a client may be able to hover their cursor over various regions of the on-screen displayed service graph 900, including but not limited to the nodes (e.g., the nodes associated with services 904, 906 etc.) and edges (e.g., the edges 922, 926, etc.), to receive SLI-related information for the associated microservices through a pop-up window or other interface.

Figure 10:
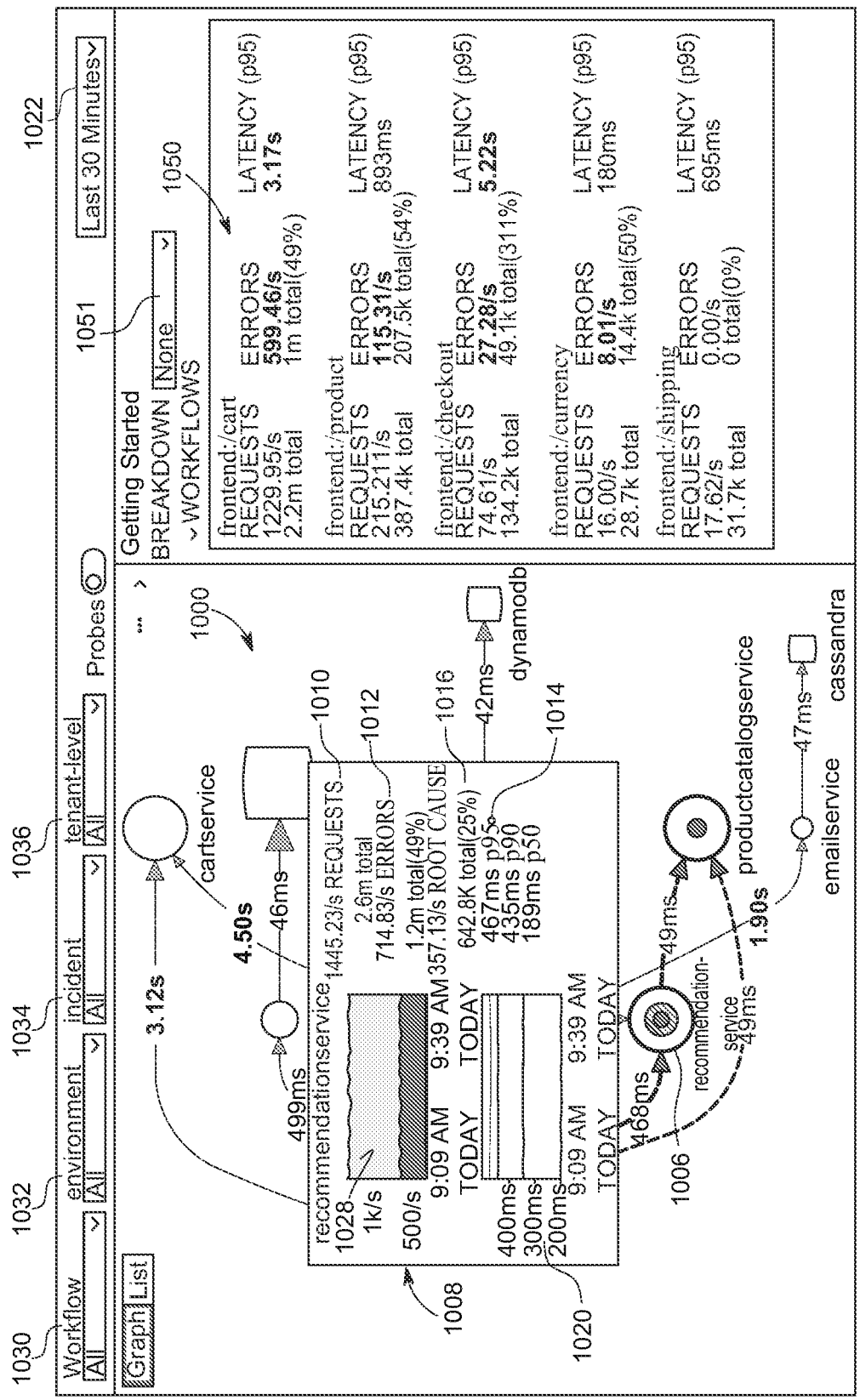
FIG. 10 illustrates an exemplary on-screen displayed GUI showing the manner in which a client may access SLIs pertaining to a service within an interactive topology graph, in accordance with implementations of the monitoring service disclosed herein.

FIG. 10 illustrates an exemplary on-screen displayed GUI showing the manner in which a client may access SLIs pertaining to a service within an interactive topology graph, in accordance with implementations of the monitoring service disclosed herein. As shown in FIG. 10, when a client hovers the cursor over the node associated with, for example, the recommendation service 1006, a pop-up window 1008 is overlaid on the service graph 1000 comprising SLIs pertaining to the recommendation service 1006. Specifically, SLIs pertaining to Requests 1010, Errors 1012 and Latency percentiles 1014 are provided. Furthermore, in an implementation, information pertaining to Root Cause 1016 is also provided to the client.

For example, the SLIs related to Requests 1010 comprise information regarding the rate of requests and number of requests serviced by the recommendation service 1006 during a specific time duration. The time duration over which the SLIs are calculated may be adjusted using drop-down menu 1022. The time duration over which SLIs are calculated may vary, for example, from 1 minute to 3 days. As indicated by the time axis on hover chart 1028, for this example, a time window of 30 minutes (from 9:09 to 9:39 a.m.) is selected.

In an implementation, the pop-up window 1008 also provides the client information pertaining to SLIs related to Errors 1012. In the example of FIG. 10, the pop-up window 1008 provides information regarding the error rate and the total number of errors that occurred during the specified time duration. The client is also provided information regarding what percentage of the total number of requests resulted in errors.

In an implementation, the pop-up window 1008 also provides the client information pertaining to Latency Percentiles 1014 and a graphical representation 1020 of the same. For example, SLI p95 indicates that for 95% of the users, the latency for servicing the requests was less than 467 ms. Latency-related SLIs also include information regarding p90 and p50 percentiles. The graphical representation 1020, in the example of FIG. 10, shows the latency information regarding the p95 percentile graphically.

In one implementation of the monitoring service disclosed herein, the pop-up window 1008 also displays information pertaining to errors for which the selected service was the root-cause. The Root Cause information 1016 includes the number of errors for which the selected service (e.g., the recommendation service 1006 in the example of FIG. 10) was the originator, the associated error rate and the percentage of the total number of requests that represents. In this way, implementations of the monitoring service disclosed herein, in addition to providing clients visual cues for identifying root cause error originators, are also able to provide meaningful and accurate quantitative information to help clients distinguish between root cause-related errors and errors associated with downstream causes.

Note that the SLIs displayed in the pop-up window 1008 are computed accurately using the metrics data gathered for the metric events modality. Because implementations of the monitoring service disclosed herein are able to ingest up to 100% the incoming span data (without sampling), the SLIs are computed factoring in all the incoming data, which results in accurate measurements. For the example of FIG. 10, there were a total of 2.6 million requests served by the recommendation service 1006 at a rate of 1445.23 requests/ second ("sec"). Of these, 1.2 million of the requests resulted in errors at a rate of 714.83/sec, which represents approximately 49% of the total number of requests. In this way, implementations of the monitoring service disclosed herein provide a modality of analysis that enables a client to gather critical SLIs pertaining to the recommendation service 1006 including an indication of how many of the errors originated at the recommendation service 1006.

Figure 11:
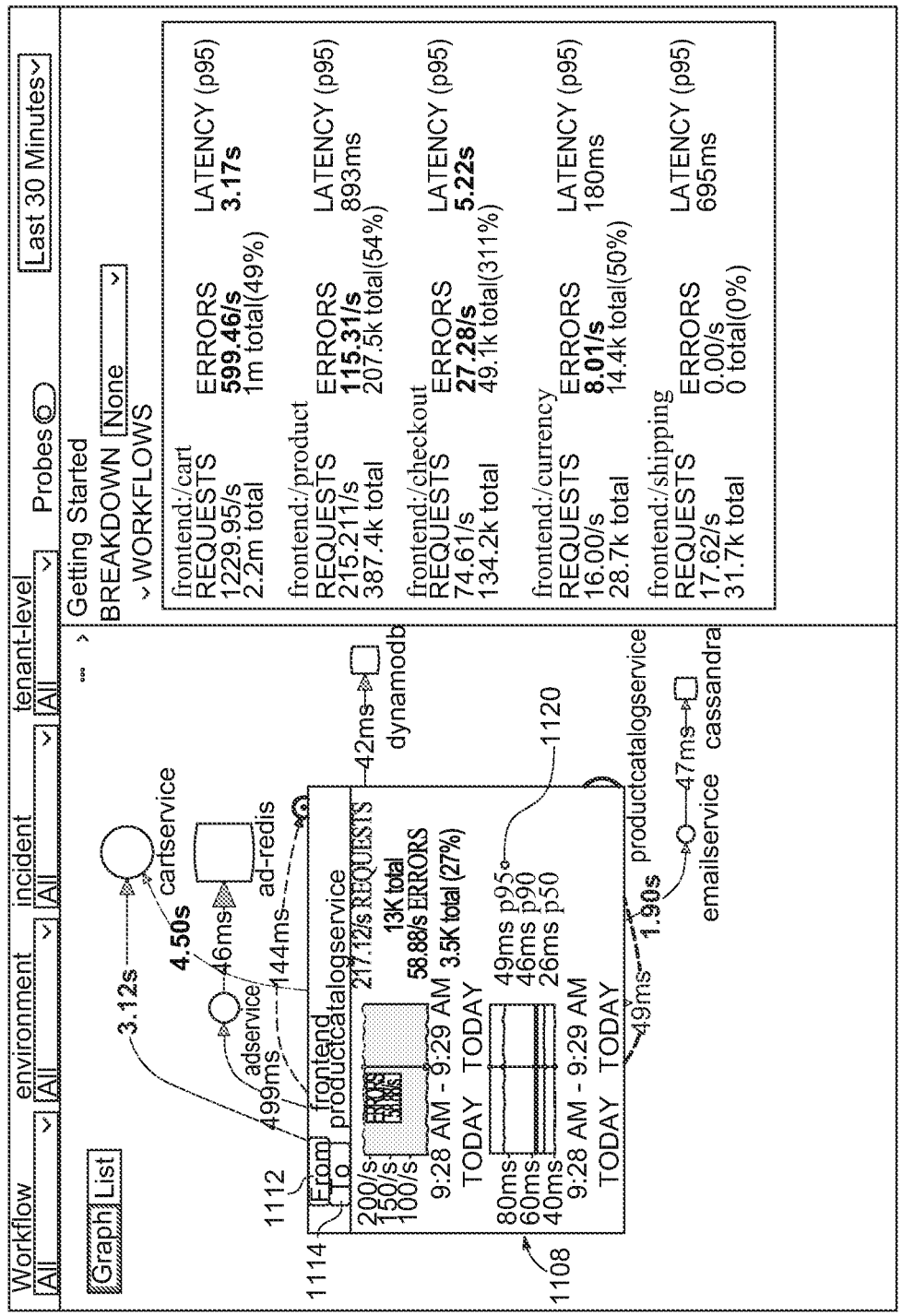
FIG. 11 illustrates an exemplary on-screen GUI showing the manner in which a client may access SLIs pertaining to an edge within an interactive topology graph, in accordance with implementations of the monitoring service disclosed herein.

FIG. 11 illustrates an exemplary on-screen GUI showing the manner in which a client may access SLIs pertaining to an edge within an interactive topology graph, in accordance with implementations of the monitoring service disclosed herein. The SLIs pertaining to edges are also computed using the metrics data associated with the metric events modality. As shown in FIG. 11, if a client hovers over or selects a particular edge, e.g., the edge 924 (as shown in FIG. 9) (which represents the cross-service dependency of the front-end service 902 on the product catalog service 906) a pop-up dialog box 1108 opens up on-screen that reports SLIs specific to the dependency. The "From" field 1112 represents the service that executes the call and the "To" field 1114 represents the service that is called (the service that the calling service depends on). As shown in the dialog box 1108, SLIs pertaining to the number of requests (or calls) that were made, the number of those that returned in errors, and the latency associated with servicing the requests are provided. It should be noted that a latency value 1120 of 49 ms shown in FIG. 11 for this particular dependency may be annotated directly on the edge of the service graph. For example, as shown in service graph 900 of FIG. 9, edge 924 of the service graph 900 in FIG. 9 indicates the latency value 970 (e.g., 49 ms) directly on the edge in the service graph allowing a client to efficiently gather information regarding latency associated with the dependency.

In an implementation, as shown in FIG. 9, the edges within the application topology graph are annotated with their corresponding latency values. In this way, implementations of the monitoring service disclosed herein efficiently compute SLI data from the metrics information aggregated for this modality and advantageously enable developers to gather meaningful and accurate information regarding cross-service dependencies directly from the service graph 900.

In one implementation, the metrics data associated with the metric events modality are used to compute accurate SLIs across multiple dimensions. Further, implementations of the monitoring service disclosed herein support high dimensionality and high cardinality tags for the metric events modality. In one implementation, the GUI of FIG. 10 may display one or more attribute (or tag) categories that comprise dimensions that may be varied across the service graph 1000. For example, attribute categories (e.g., Workflow 1030, environment 1032, incident 1034 and tenant-level 1036) may be depicted within the GUI, each of which may correspond to attributes that may be varied to compute SLIs and error-related information for different combinations of the attributes. The categories of dimensions across which the SLIs may be computed, include, but are not limited to, workflow 1030, environment 1032, incident 1034 and tenant-level 1036. Each of the categories comprises a drop-down menu with options for the different dimensions. The metrics events data allows clients to easily and rapidly compute measurements across various cross-combinations of tags or attributes.

In an implementation, the GUI may include a panel 1050 that may display SLIs across the various workflows. Further, the GUI allows clients the ability to break down the workflows across multiple different attributes using drop down menu 1051. The computations for each of the break-downs may be efficiently determined using the metrics data aggregated for the metric events mode.

Figure 12:
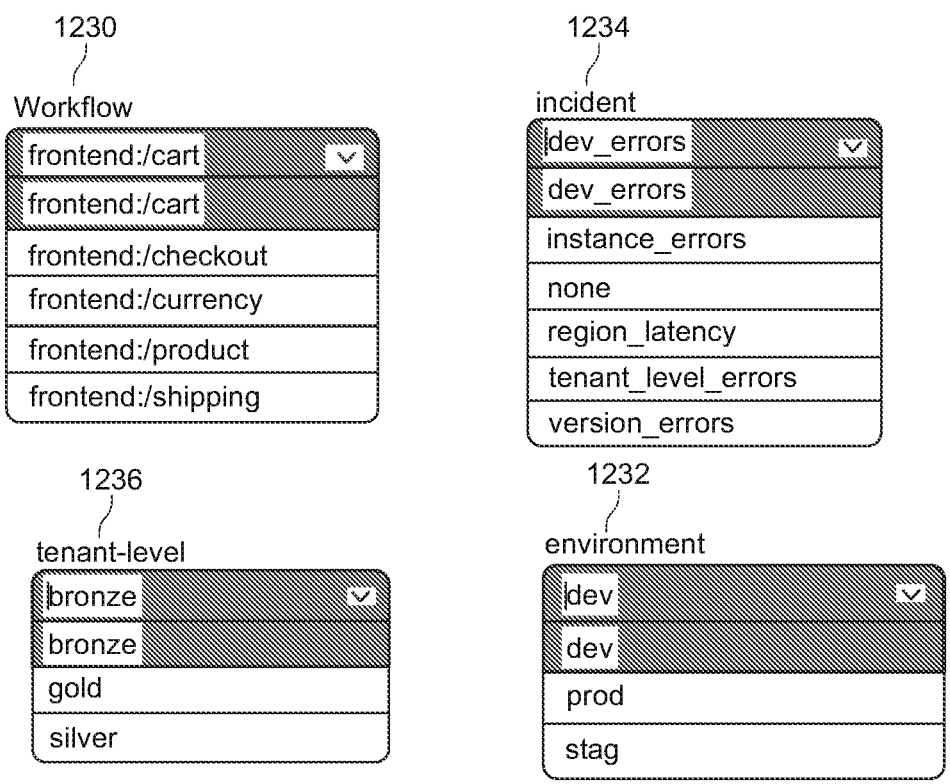
FIG. 12 illustrates on-screen displays that represent exemplary categories of dimensions across which SLIs may be computed, in accordance with implementations of the monitoring service disclosed herein.

FIG. 12 illustrates on-screen displays that represent exemplary categories of dimensions across which SLIs may be computed, in accordance with implementations of the monitoring service disclosed herein. The exemplary category of dimensions corresponds to the categories associated with drop-down menus (e.g., 1030, 1032, 1034 and 1036) discussed in connection with FIG. 10. The metrics data aggregated using the metric event modality allows clients to easily and rapidly compute measurements across various cross-combinations of attributes. Drop-down on-screen menu 1230, corresponding to workflow, illustrates different workflows specific to the application discussed in connection with FIG. 9. A "workflow" is a type of dimension of the request that was processed; a workflow may be conceptualized as a type of "global tag" that is attributed to each span in a given trace. A workflow may, for example, be associated with a type of client process or user-interaction, e.g., "check-out," that is generated on the back-end in response to a request.

Similarly, drop down on-screen menus 1234, 1236 and 1232, relating to incident, tenant-level and environment respectively, provide further categories of dimensions across which SLIs may be computed. Each of the drop down on-screen menus 1230, 1232, 1234 and 1236 comprises various dimensions (associated with the respective categories) across which aggregations may be made. For example, the client may submit a query asking for the number of requests in a trace where "Workflow=frontend:/cart" and "incident=instance_errors" and "tenant-level=gold." By aggregating metrics data associated with the indexed tags, the metric events modality is able to respond to the client's query rapidly and efficiently.

Note that SLIs may be computed for each attribute of the categories in FIG. 12 and also for each combination of attributes associated with the categories. In an implementation, for each combination of attributes selected using one or more of the drop-down menus, the client may be able determine the computed SLIs (e.g., by hovering a cursor over the various nodes and edges of the graph after the dimensions have been selected using, for example, the drop-down menus shown in FIG. 10). In this way, implementations of the monitoring service disclosed herein enable a client to use the metric events modality to slice the application topology graph across several different attributes.

It should be noted that clients might have different attributes or dimensions that may be of interest for their respective application. In an implementation, the monitoring platform may be configured to provide insight into client-specific dimensions. Consequently, the specific attributes or dimensions available in each of the drop-down menus may vary by client.

Metric Events Data Generation and Persistence

Figure 13:
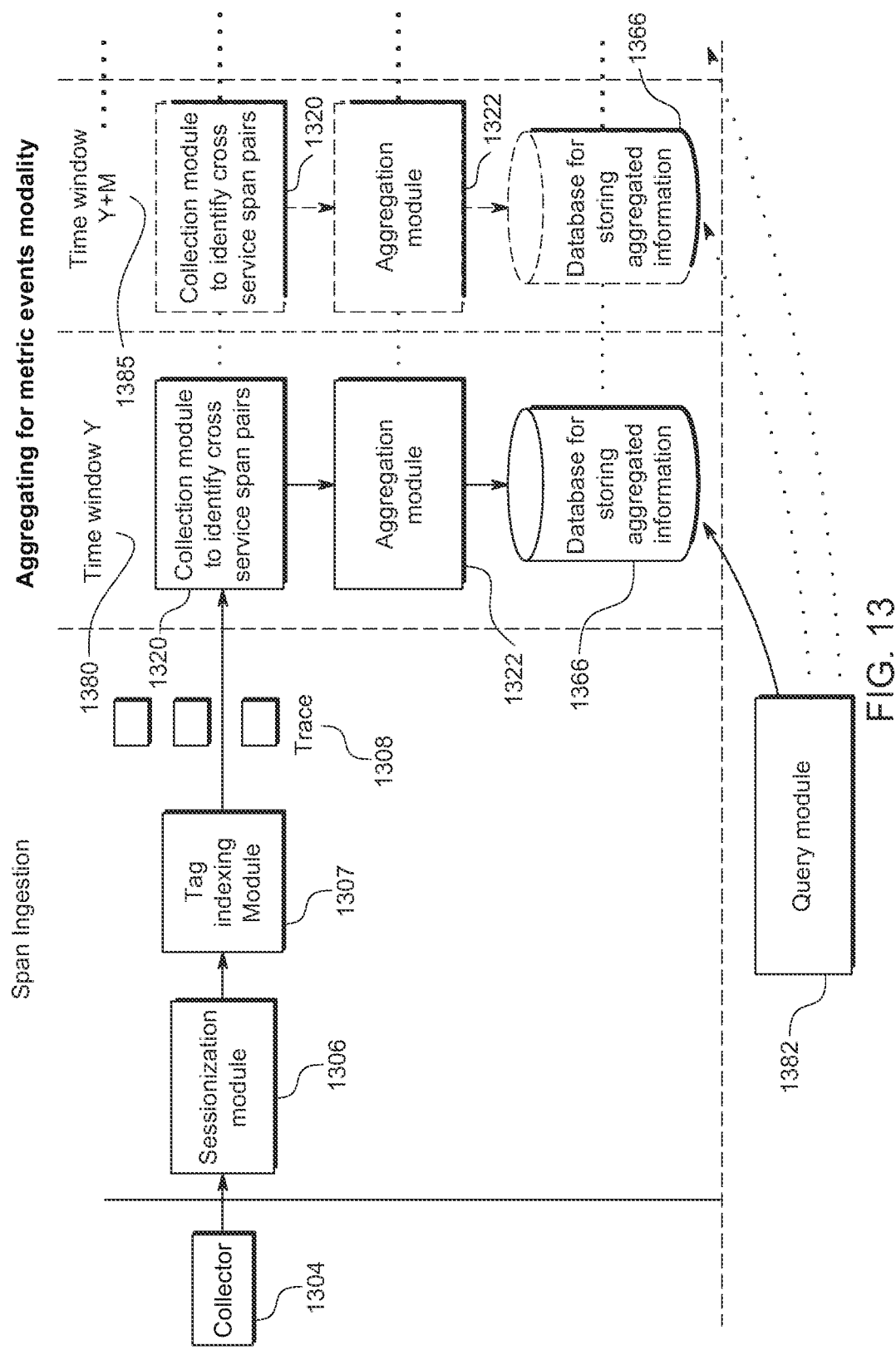
FIG. 13 is a flow diagram that illustrates an exemplary method of aggregating metrics data from ingested traces for the metric events modality, in accordance with implementations of the monitoring service disclosed herein.

FIG. 13 is a flow diagram that illustrates an exemplary method of aggregating metrics data from ingested traces for the metric events modality, in accordance with implementations of the monitoring service disclosed herein. As mentioned previously, span information is received at a monitoring service from a collector 1304. The span information is then combined into traces 1308 in real time using module 1306 in a process called sessionization as discussed in connection with FIG. 5. The sessionization process may consolidate traces (from spans) within a first time window (associated with time window Y 1380) before transmitting the traces to the collection module 1320. Thereafter, the sessionization process may consolidate traces within the subsequent window (associated with time window "Y+M" 1385).

Subsequent to consolidation, the trace data is indexed by tag indexing module 1307, which indexes one or more tags in the trace data. The tags may be client-selected tags or tags that the monitoring platform is configured to index by default. In one implementation, the metric events modality indexes a subset of tags associated with the spans of a trace, but indexes that set of tags with perfect accuracy because the metrics calculated take into account all the ingested spans.

In one or more implementations, collection module 1320 receives one or more traces 1308 generated within a predetermined time window Y 1380, and traverses the traces to identify and collect cross-service span pairs that represent cross-service calls. To collect the cross-service span pairs, the collection module 1320 identifies parent-child span pairs in a given trace where the service name for the parent and the child are different. Stated differently, the collection module 1320 will collect each pair of spans that has a parent-child relationship and where each of the two spans in the pair are associated with a different service. The service name of a span may be identified in a span-level tag included with each span. Alternatively, there may be other conventions for identifying a service name associated with a span, e.g., a special field within the span for the service name.

Identifying and collecting the cross-service span pairs from the incoming spans are advantageous because they enable the monitoring platform to track information that will be most relevant to a client, e.g., to render the service graph and display the SLIs associated with the various dependencies between services. Spans associated with calls to internal operations that a service might make may not be of interest to an application owner and may, therefore, be ignored by the collection module 1320 when determining the cross-service span pairs.

It should be noted that, in one implementation, once the cross-service span pair is identified, indexed tags may be extracted for the cross-service span pair by determining a service tier for the respective parent and child spans of the span pair. A service tier is a subset of spans in a trace that logically identifies a single request to a service. Accordingly, both a parent span and a child span in the cross-service span pair are associated with a respective subset of related spans known as a service tier. Indexed tags are extracted by the collection module 1320 from service tiers associated with a cross-service span pair. In a different implementation, however, the tags may be extracted directly from the parent span and child span in a cross-service span pair rather than the respective service tier associated with the parent span or child span.

In one or more implementations, once the cross-service span pairs are collected and the indexed tags extracted from the respective service tiers, the collection module 1320 maps one or more selected tags for each service in the cross-service span pair to tag attributes, e.g., selected tags in a parent span (associated with the originating service) are mapped to a "FROM" tag attribute and selected tags in a child span (associated with the target service) are mapped to a "TO" tag attribute. This enables directionality information for the cross-service calls to be preserved. It will be appreciated that while the discussion herein focuses on "FROM" and "TO" tag attributes to indicate the direction of the dependency between services in a cross-service call, there may be several different ways to record dependency information between the two services.

In one implementation, the aggregation module 1366 of the monitoring platform aggregates across the cross-service span pairs by maintaining a count for each unique set of "FROM" tag attributes (and their corresponding values) to "TO" tag attributes (and their corresponding values) for a cross-service pair. It should be appreciated that in this implementation, counts are maintained at the tag level for the cross-service span pair (rather than at the service level). Accordingly, a separate count is maintained for each set of parent span tags (mapped to a "FROM" tag attribute) and child span tags (mapped to a "TO" tag attribute) for a cross-service pair. The count is increased each time the aggregation module encounters the same unique set of "FROM" tag attributes (associated with tags of a parent span) and "TO" tag attributes (associated with tags of a child span) for the same cross-service span pair in one or more traces. In a different implementation, the count may be maintained at the service level. Accordingly, the count may be increased each time the same cross-service span pair is encountered within the trace information ingested from the client.

The aggregation module 1322 advantageously prevents duplication by storing a single instance of each unique set of "FROM" tag attributes and "TO" tag attributes for a given cross-service span pair with an associated count in the storage module 1366. The information in the storage module 1366 may be accessed by querying module 1382 where the querying module 1382 determines that the query is associated with the metric events modality. The querying module 1382 may, for example, be associated with the query engine and reporting system 324 discussed in FIG. 3.

The aggregated cross-service "FROM" and "TO" tag attribute sets and associated count values stored in the storage module 1366 may be used by the querying module 1382 to respond to queries in accordance with the metric events modality. Note that the collection and aggregation process is repeated for subsequent time windows (including window Y+M 1385) after time window Y 1380. In this way, the aggregation process is performed over time. This allows the metric events modality to deliver query results over varying time durations (as discussed, for example, in connection with the drop-down menu 1022 in FIG. 10).

FIG. 14 is a table illustrating an exemplary manner in which selected tags for each service in a cross-service span pair may be mapped to tag attributes and stored as part of a memory-resident data object associated with an edge in the service graph, in accordance with implementations of the monitoring service disclosed herein. As noted above, in one or more implementations, once the cross-service span pairs are collected, the monitoring platform maps selected tags associated with each service in the cross-service span pair to tag attributes, e.g., selected tags in a parent span are mapped to a "FROM" tag attribute and selected tags in a child span are mapped to a "TO" tag attribute. The mapping is performed to allow directionality information for the cross-service calls to be preserved. For example, a data object for an "edge" (corresponding to an edge or dependency in the topology graph) may be created that comprises both the FROM-type of tag attributes and the TO-type of tag attributes. In one implementation, one or more edge data objects similar to the one shown in FIG. 14 is used to persist the data for the metric events modality (in addition to node data objects which will be discussed in connection with FIG. 15B).

The table of FIG. 14 illustrates an exemplary manner of storing a data object associated with an edge in the service graph. The table comprises two services, Service A and Service B, in an application. Both Service A and Service B comprise indexed tags "span.kind" and "region." Tag "span.kind" may have two possible values, "client" and "server." Similarly, tag "region" may have two possible values, "us-west" and "us-east."

If all possible combinations exist in Service A, there may be 4 unique tag combinations associated with the "FROM" tag attribute, e.g., {(span.kind=client, region=us-west) (span.kind=client, region=us-east) (span.kind=server, region=us-west) (span.kind=client, region=us-east). Similarly, if all possible combinations exist in Service B, there may also be 4 unique tag combinations associated with the "TO" tag attribute. Assuming there is a complete interaction between Service and Service B, there may be 16 (4×4) different edges between the two services based on the unique set of "FROM" and "TO" type tag attributes.

Note that the example in FIG. 14 illustrates information for two unique sets of "FROM" and "TO" tag attributes. Edge 1490 is associated with a TO-type attribute of "region=us-east" while edge 1492 is associated with a TO-type attribute of "region=us-west." Because the two sets of "FROM" and "TO" attributes are not identical, a separate count is maintained for each. The edge 1490 has an associated count of 2, while the edge 1492 has an associated count of 1. To determine the total number of requests or total count associated with the cross-service call from Service A to Service B, the number of counts for each set of "FROM" and TO" tag attributes for an associated cross-service call may be summed up. In the example of FIG. 14 then, a total of 3 requests is computed to occur between Service A and Service B.

In one implementation, data sets for the metric events mode are stored as row of metrics extracted from the indexed tags in the service tiers, where each row is associated with either an edge or a node in the service graph. In an implementation, the edges on the service graph (e.g., the edges 922 and 926 of FIG. 9) are rendered using both the "FROM" and "TO" tag attribute sets because rendering the edges requires information regarding directionality. The counts for the "FROM" and "TO" tag attribute sets for a given cross-service span pair are summed up to yield the number of requests made between the two services associated with the span pair. In other words, edges are rendered in the service graph by grouping "FROM" and "TO" tag attribute sets associated with a cross-service call and summing up the request counts associated with the cross-service call. In an implementation, this grouping may be performed using "group by" statements in a query language, e.g., SQL. In one implementation, the value of the number of requests between two services may be used to determine the thickness of the edge between the two services in the service graph.

In one implementation, the nodes (e.g., nodes associated with services 902, 904, 906) on the service graph are also rendered using the aggregated cross-service "FROM" and "TO" tag attribute sets. However, rendering the nodes does not require directionality information and, therefore, the nodes may be rendered by collecting and extracting information from the "TO" type tag attributes. Stated differently, the nodes are rendered by grouping the "TO" tag attributes associated with a given service and summing up the request counts associated with the service. In an implementation, this grouping may be performed using "group by" statements in a query language, e.g., SQL. The "TO" tag attributes represent new services being called within the microservices architecture. Accordingly, the counts associated with "TO" tag attributes for a given service may be summed up to determine the total number of requests made to the service. In one implementation, the value of the number of requests may also be used to determine the size of the node when rendering the service graph.

In an implementation, the "TO" type tag attributes for rendering the nodes may be aggregated separately from the "FROM" and "TO" tag attribute sets aggregated for rendering the edges (as will be discussed in connection with FIG. 15B). In the exemplary table of FIG. 14, information for Service B may be determined, for example, by analyzing the "TO" type tag attributes in the table.

FIG. 15A illustrates an exemplary on-screen GUI showing a visual representation of a portion of an exemplary trace illustrating a cross-service call, in accordance with implementations of the monitoring service disclosed herein. As shown in FIG. 15A, front-end service 1539 makes a call to product catalog service 1538. Accordingly, the front-end service 1539 and the product catalog service 1538 comprise a cross-service span pair. Note that spans 1540, 1546 and 1547 may be part of the service tier for front-end service 1539. Accordingly, even though the call is made by the span 1547 ('frontend: request/GetProduct') to span 1545 ('productcatalogservice:/GetProducts), indexed tags associated with the front-end service 1539 may also be extracted from the spans that are part of the service tier for the front-end service 1539. In one implementation, the first matching tag within a service tier is extracted. For example, indexed tag "environment=prod" 1550 may be extracted from the span 1540, even though it is repeated in the spans 1546 and 1547 because the span 1540 comprises the first matching instance of the tag 1550. Assuming tags "environment" (referred to herein as "env"), "http.status_code" (referred to herein as "code") and "k8s.io/pod/name" (referred to herein as "pod") are indexed, then tags 1550, 1551 and 1552 are extracted from the front-end service 1539 while tags 1560, 1561 and 1562 are extracted from the product catalog service 1538.

In an implementation, the extracted indexed tags are mapped to tag attributes. The extracted tags 1550, 1551 and 1552 in the parent span (associated with the front-end service 1539) may be mapped to a "FROM" tag attribute while the extracted tags 1560, 1561 and 1562 in the child span may be mapped to a "TO" tag attribute. In one implementation, the mapped tags may be used to create node and edge data objects that are used to persist data for the metric events modality as shown in FIG. 15B.

FIG. 15B illustrates the manner in which data in the metric events modality is persisted using an edge data object comprising a memory-resident table of tag attributes with associated counts and using a node data object comprising a memory-resident table of tags with associated counts, in accordance with an implementation of the monitoring service disclosed herein. In one implementation of the monitoring service disclosed herein, a memory-resident table 1501 titled "Edge Health" may be maintained to keep track of the various dependencies in the application. The table 1501 may be stored in, for example, in the storage module 1366 (in FIG. 13). A memory-resident table 1500 titled "Node Health" may be maintained to keep track of the various service nodes in the application. Both tables comprise aggregated rows comprising metrics values. In one implementation, these rows are stored efficiently for fast aggregation.

For example, the table 1501 may comprise one or more exemplary rows related to the cross-service span pair discussed in connection with FIG. 15A. Row 1506 is one exemplary row that may be generated for the cross-service span pair of FIG. 15A. Note that for simplicity, only tag attributes "from pod" and "to pod" are illustrated in row 1506 in FIG. 15B, but row 1506 would typically also comprise information for tag attributes associated with indexed tags "code" and "env" that are also indexed. As discussed above, each row for the cross-service span pair of FIG. 15A will comprise a unique set of "FROM" and "TO" tag attributes. For example, if the front-end service (e.g., front-end service 1539 in FIG. 15A) makes multiple calls to the product catalog service (e.g., product catalog service 1538 of FIG. 15A), but any of the calls are associated with different values for the "pod" tag from the values shown in row 1506, the information would be recorded in a new row. In other words, each row records a single unique combination of tag attributes and service names. If the value of either the "from pod" or "to pod" tag attribute changes, a new row is created to record the information. Accordingly, there may be multiple rows in the table 1501 for the cross-service call discussed in connection with FIG. 15A, where each row would comprise a unique combination of "FROM" and "TO" tag attributes for a given cross-service span pair.

Each row in the table 1501 comprises a count value for number of requests 1504, errors 1505 and latency 1511. The requests 1504 are incremented each time the same cross-service call with the same unique set of attributes for a respective row is observed on a trace. The errors 1505 are incremented each time a request associated with a respective row is observed on a trace that has an error. The latency 1511 metric relates to a histogram of the duration that a respective request took. Further, each row comprises a timestamp 1503 to record the time of the cross-service call.

Using the metrics associated with the requests 1504, errors 1505 and latency 1511 and the timestamp 1503, aggregations on the rows may be performed quickly and efficiently to determine SLIs for varying ranges of time. In response to a client query then, the numeric rows in the tables 1500 and 1501 may be summed into either timeseries buckets or into a single number depending on the query.

In one implementation, the metric events modality may maintain a separate memory-resident table 1500 titled "Node Health" in system memory associated with the service nodes in the application. Each row in the memory-resident table 1501 comprises a unique combination of service names and associated tags. For example, row 1508 is associated with the front-end service (e.g., service 1539 in FIG. 15A) and comprises corresponding tag values for "env," "pod" and "code." Similarly, row 1507 is associated with the product catalog service (e.g., product catalog service 1538 of FIG. 15A) and comprises corresponding tag values for "env," "pod" and "code."

Each unique combination of service name and corresponding tag values is associated with metrics that are maintained in the memory-resident table 1500, e.g., request, error and latency (as discussed in connection with table 1501). These metrics may be used to perform fast and efficient aggregations. For example, if the client queried the number of times "env=prod" in the application, assuming the two exemplary services illustrated in table 1500 are the only ones where "env=prod," the request counts in each row would be aggregated to provide a result of 2.

Note that the memory-resident table 1500 may also comprise a "root cause" metric 1509 which tracks the number of times the corresponding service was the root cause of an error. For example, the "root cause" metric may be aggregated using the memory-resident table 1500 across multiple rows to determine the number of times each given service in an application was the root cause for an error.

In one implementation, a software tool may be employed to perform faster aggregations across the rows of tables 1500 and 1501. For example, Apache Druid, which is an open-source data store designed for sub-second queries on real-time and historical data, may be used to perform the aggregations rapidly and efficiently. In different implementations, other tools may also be used to perform aggregations. In one implementation, the information in the memory-resident tables 1500 and 1501 may be used in the metric events modality to perform the metrics aggregations for rendering the service graph (e.g., graph 900 of FIG. 9) and computing the associated SLIs.

In one implementation, the metrics event modality may also store Trace IDs associated for each unique combination of cross-service span pairs and corresponding indexed tags.

In one implementation, the aggregation module 1322 (of FIG. 13) of the monitoring platform aggregates across the cross-service span pairs by maintaining one or more exemplary Trace IDs for each unique set of "FROM" tag attributes (and their corresponding values) to "TO" tag attributes (and their corresponding values) for a cross-service pair. Accordingly, exemplary Trace IDs may be maintained for each unique cross-service call.

The exemplary Trace IDs stored with each unique set of "FROM" and "TO" tag attributes for a cross-service span pair may be used by the querying module 1382 to respond to queries requesting more particularized information pertaining to non-indexed tags associated with the spans. For example, if a client needs particularized information regarding span performance or span duration, the querying module 1382 may be able to use the aggregated rows of information stored in a database associated with the storage module 1366 to access one or more exemplary Trace IDs associated with the call. Using the Trace IDs then, the querying module may be able to access the sessionized traces 1308 and perform analytics on the retrieved exemplary traces to deliver the requisite span performance and span duration information. In one implementation, the full trace information may be accessed from a storage set associated the full-fidelity modality, which stores the entire traces as ingested following sessionization. In a different implementation, however, the metric events modality may save full trace information for traces associated with the exemplary Trace IDs in a separate storage from the data set associated with the full-fidelity modality. In one implementation, because the metric events modality allows clients to retrieve raw trace data, it also allows clients to run an analysis on the retrieved data for an arbitrary set of tags (instead of being limited to the tags pre-indexed by indexing module 1307).

The metric events modality is particularly advantageous in circumstances where the client has identified a problem from the information provided by the metric time series. Having identified a problem either by manual monitoring of RED metrics or through an automatically generated alert, the client may be able to traverse deeper using the metric events data set and access relevant traces to receive more specific information regarding the problem. Also, the metric events mode allows the client to run an arbitrary analysis on the traces, e.g., on a set of tags that has not previously been indexed, which provides the client with specific information that may be used to diagnose and resolve the problem.

FIG. 15C illustrates the manner in which data in the metric events modality is persisted using an edge data object comprising a memory-resident table of extracted indexed tag attributes with associated Trace IDs and using a node data object comprising a memory-resident table of extracted tags with associated Trace IDs, in accordance with an implementation of the monitoring service disclosed herein. In one implementation of the monitoring service disclosed herein, a memory-resident table 1531 created to persist data is associated with the various dependencies in the application. Also, a memory-resident table 1530 created to persist data for the metric events modality is associated with the various service nodes in the application. Note that table 1531 is created in a similar way to table 1501 in FIG. 15B and that table 1530 is created in a similar way to table 1500 of FIG. 15B. Instead of tracking RED metrics, however, the tables in FIG. 15C comprise a column for Trace IDs 1590 and Exemplar Type 1591. It should be noted that, in one implementation, memory-resident table 1531 may be maintained in combination with memory-resident table 1501 and that memory-resident table 1530 may be maintained in combination with memory-resident table 1500.

Row 1597 in table 1531 is one exemplary row that may be generated for the cross-service span pair of FIG. 15C. Note that for simplicity, only tag attributes "from pod" and "to pod" are illustrated in row 1597 in FIG. 15C, but row 1597 would typically also comprise information for tag attributes associated with indexed tags "code" and "env." As discussed previously, each row for the cross-service span pair of FIG. 15A will comprise a unique set of "FROM" and "TO" tag attributes. Accordingly, there may be multiple rows in table 1531 for the cross-service call discussed in connection with FIG. 15A, where each row would comprise a unique combination of "FROM" and "TO" tag attributes for a given cross-service span pair. Each row in table 1531 comprises a column for Trace IDs 1590, which keeps track of one or more Trace IDs associated with the unique combination of service names (and operation names) and tag attributes for the given row. In other words, the combination of service names (and operation names) and tag attributes in each row may comprise an index to access the associated Trace IDs.

In one implementation, the Exemplar Type column 1591 tracks the type of exemplary trace associated with the Trace ID. Types of exemplars may be request, error, root cause errors or some latency bucket identifier. The Trace IDs in each row may be accessed to identify and retrieve the full trace associated with the ID for further analysis, e.g., an analysis on an arbitrary set of tags associated with the trace.

In one implementation, the monitoring system may maintain a separate table 1530 associated with the service nodes in the application. Rows 1595 and 1596 in table 1530 are two exemplary rows that may be generated for the cross-service span pair of FIG. 15A. Each row in table 1530 comprises a unique combination of service and associated tags. For example, row 1595 is associated with the front-end service (e.g., service 1539 in FIG. 15A) and comprises corresponding tag values for "env," "pod" and "code." Similarly, row 1596 is associated with the product catalog service (e.g., product catalog service 1538 of FIG. 15A) and comprises corresponding tag values for "env," "pod" and "code."

Each unique combination of service name and corresponding tag values is associated with a Trace ID and Exemplar type that is maintained in table 1530.

As noted above, in one implementation, metrics event data may be persisted in tables that consolidate the data shown in FIG. 15B and FIG. 15C. For example, table 1501 may comprise an additional column to track Trace IDs and similarly table 1500 may comprise an additional column to track Trace IDs.

The Trace IDs may be used in metrics events modality to retrieve full traces for more detailed analysis. In one implementation, full traces associated with the exemplary Trace IDs may be maintained in a dedicated storage associated with the metric events. In a different implementation, the full traces may be accessed from a data set associated with the full-fidelity mode.

It should be noted that the metric events modality can comprise higher-cardinality metrics information because a higher number of tags may be indexed for the metric events data set as compared to the dimensions associated with the metric time series. However, the metric time series modality may provide higher-fidelity information because it retains metadata associated with incoming spans (e.g., service name, operation name, count values, etc.) that are not collected in the metric events modality. Further, the metric time series modality also allows clients to configure alerts against one of more time series to monitor incoming data in real-time. Because metric events are generated from post-sessionized traces, the metrics data associated with metric events may not be computed as rapidly as compared with the metric time series modality.

Full-Fidelity Modality

In one implementation, the full-fidelity module 524 of FIG. 5 stores all the incoming trace data from the sessionization process in real time. Unlike the prior two modes, the full-fidelity modality stores the trace data in its raw form. In one implementation, the data is stored in parquet-formatted batches of full traces in an unstructured format (e.g., blob storage) along with some metadata. The metadata may comprise the tags associated with the trace (both indexed and unindexed) and other properties such as service name and operation for more efficient querying. In one implementation, the format of the metadata may comprise a map of a service name to a map of tag names, wherein each tag name may be mapped to a list of tag values. The batches of full traces in unstructured format and the metadata are queried in the full-fidelity modality using a robust data engine to search for any tag across the traces. For example, PRESTO is an open source distributed SQL query engine that may execute queries against data sources of varying sizes.

Figure 16:
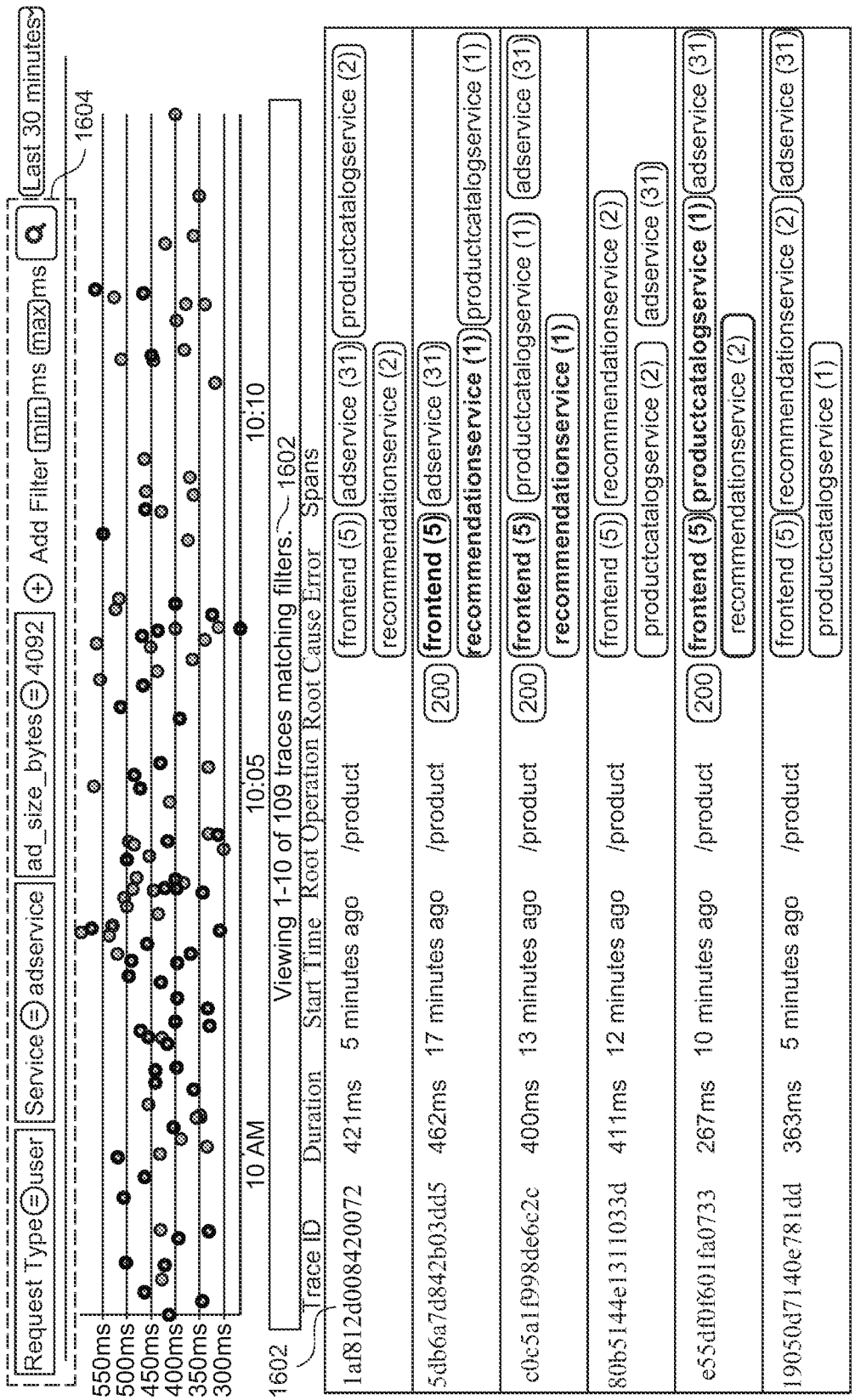
FIG. 16 is an on-screen GUI showing the manner in which a client may submit a query to be executed against the full set of traces stored in connection with the full-fidelity modality, in accordance with implementations of the monitoring service disclosed herein.

FIG. 16 is an exemplary on-screen GUI showing the manner in which a client may submit a query to be executed against the full set of traces stored in connection with the full-fidelity modality, in accordance with implementations of the monitoring service disclosed herein. The full-fidelity modality, in one implementation, allows a client to execute a query against arbitrary tags to receive a set of traces that matches the query. For example, in the GUI of FIG. 16, the client enters a query 1604 for traces where "Request Type=user," "Service=adservice" and the tag "ad_size_bytes=4092." In response, the platform returns a list 1602 of the traces matching the client-entered filters and, further, provides information about the traces, e.g., the Trace ID, duration, start time, root operation, root cause error status code and associated spans. As mentioned previously, the traces retrieved in response to a query may be analyzed to determine performance summaries for the spans comprised therein. Alternatively, the span performance analysis can be computed on all the traces stored as part of the full-fidelity data set.

In one implementation, the monitoring platform has the ability to run a full trace search (as shown in FIG. 16), and feed the traces collected into other modalities of analysis to get more detailed information about an arbitrary set of traces and an arbitrary set of attributes associated with the set of traces.

Using Workflows to Monitor Client Processes or User-Interactions

There are several challenges associated with implementing an observability platform (e.g., monitoring service 306 of FIG. 3) that can perform application performance monitoring (APM) within a heterogeneous distributed system. One of the challenges is associated with providing clients meaningful information regarding where work is occurring related to a particular user-interaction, a given activity or transaction, or a client process and, also, regarding application-specific use cases that cannot be easily captured with basic instrumentation techniques.

Workflows may be used in APM in order to monitor the interactions between services in a microservices architecture that are related to a particular user-interaction, activity, transaction or to a particular client process. Workflows group together any activity within a trace that relate to the particular user-interaction, activity, transaction or client process. A workflow may provide information regarding the start-to-finish path of one or more traces associated with the given user-interaction, activity, transaction or client process. The path for a workflow comprises the various services and cross-service dependencies in a trace that are invoked by the given user-interaction or client process.

Workflows may be used by a client (e.g., a software engineer or a site reliability engineer) to monitor and troubleshoot end-to-end transactions in the client's system. In the retail context, an end-to-end transaction might encompass initial contact through order fulfillment, as captured by a trace. Another example of a client process may be a checkout process on a website of an online retailer. Conventional tracing and monitoring tools do not provide clients the ability to effectively isolate and monitor a group of services in a microservices architecture that is associated with a particular client transaction without needing to manually instrument one or more microservices in the architecture with workflow names specific to the client's architecture.

Implementations of the monitoring platform disclosed herein (e.g., monitoring service 306) allow clients to monitor a path or sequence of events that occurs in a distributed application in response a particular user-interaction or a client process by assigning a "workflow" dimension and corresponding value to a trace. For example, a client may need to monitor a chain of calls and associated services that are invoked in response to a user electing to conduct a checkout transaction on a website for an online retailer. In one implementation, the value of the workflow dimension assigned to the trace may depend on the type of work (e.g., a user-interaction, activity, transaction or client process) associated with or performed by the trace. For example, the workflow name assigned to a checkout transaction may be "cartservice:checkout."

Further, implementations of the monitoring platform allow clients to configure rules and procedures that are executed to automatically attribute a workflow dimension and associated value to one or more traces generated by the microservices architecture. Automatically attributing a workflow dimension (and associated value) to traces generated by the architecture is significantly more efficient compared to conventional tracing and monitoring tools which require the client to manually instrument the software to include a workflow dimension and associated value in the tags of emitted spans.

Implementations of the monitoring platform disclosed herein (e.g., monitoring service 306) also allow clients to track the root cause of a failure within a workflow (that is associated with a trace). The failure may, for example, have resulted in an error or possibly a degraded response being returned to a client in response to a request. Because the error may be observed at the front end of the distributed application (or at a location different from where the error actually originated), the client may not have any insight into which service within the workflow caused the error. Based on certain predetermined heuristics, implementations of the monitoring platform disclosed herein attribute the root cause of a failure within a workflow to a particular service, which provides clients with a starting point to investigate where errors within a workflow originate.

Figure 17:
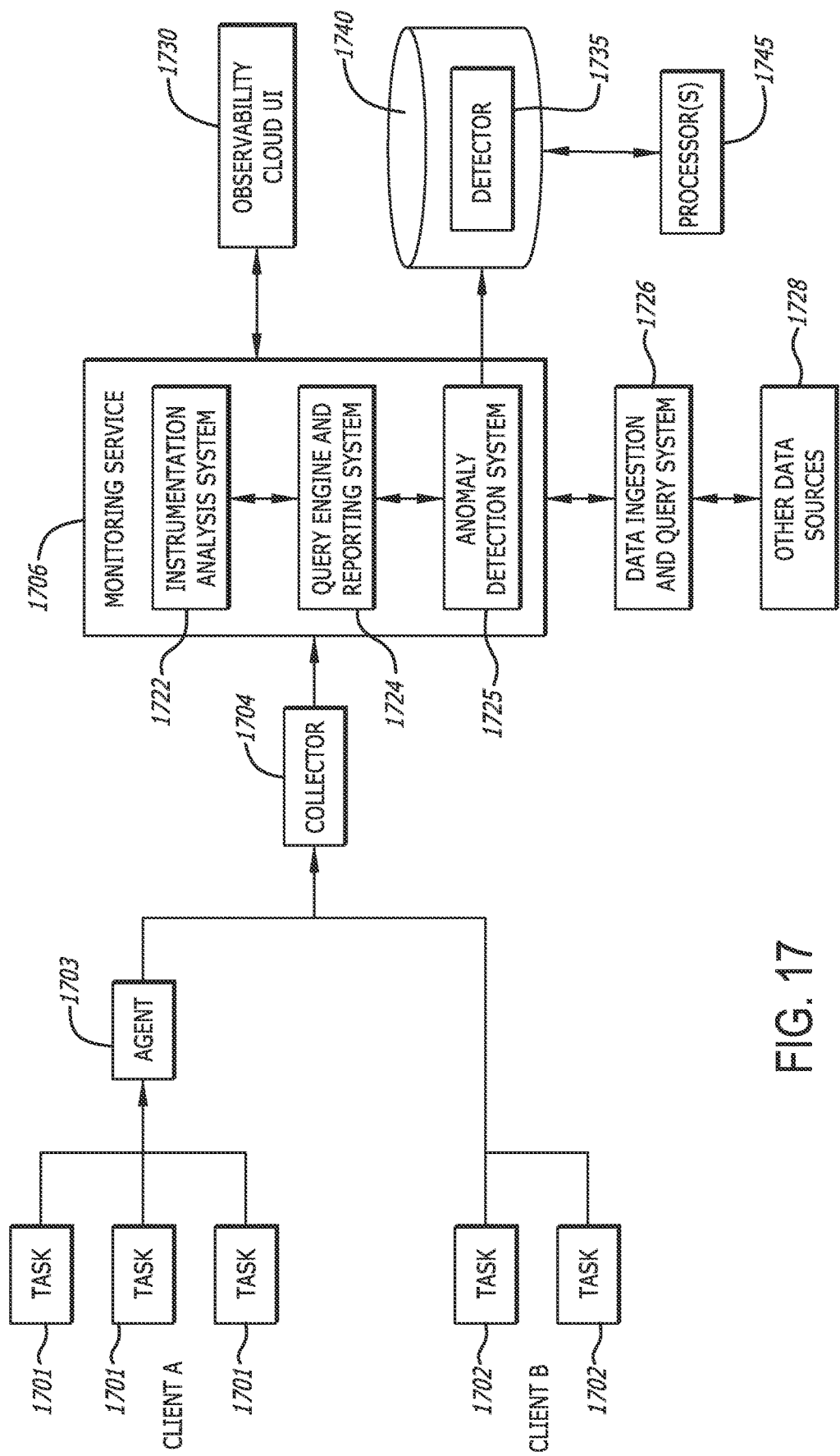
FIG. 17 is a flow diagram that illustrates the manner in which trace data may be collected and ingested for further analysis within a computer system that includes an anomaly detection system, in accordance with implementations of the monitoring service disclosed herein.

Referring to FIG. 17, a flow diagram that illustrates the manner in which trace data may be collected and ingested for further analysis within a computer system that includes an anomaly detection system is shown in accordance with implementations of the monitoring service disclosed herein. Many components of FIG. 17 along with the operability thereof are discussed above, e.g., with respect to FIG. 3. Thus, the discussion of FIG. 17 will focus on an additional component that may be included in some implementations: an anomaly detection system 1725. For instance, the tasks 1701, 1702 correspond to the tasks 301, 302, the agent 1703 corresponds to the agent 303, and the collector 1704 corresponds to the collector 304. Similarly, the monitoring service 1706 corresponds to the monitoring service 306, the instrumentation analysis system 1722 corresponds to the instrumentation analysis system 322, the query engine and reporting system 1724 corresponds to the query engine and reporting system 324, the data ingestion and query system 1726 corresponds to the data ingestion and query system 326, and the data sources 1728 corresponds to the data sources 328.

As discussed previously, the monitoring service 1706 receives data comprising, for example, trace information, span information and/or values of metrics (metrics data) sent by different clients, such as Clients A and B, wherein implementations of the monitoring service 1706 allow a client to store and analyze the trace data using multiple modalities of analysis. For example, a first modality may comprise converting incoming spans from one or more clients into a plurality of metric data streams (also referred to as metric time series). Each metric time series is associated with a single span identity, where a base span identity comprises a tuple of information corresponding to an associated type of span. Each metric time series in this modality (referred to herein as "metric time series modality") represents a plurality of tuples, each tuple representing a data point. Key performance metrics (KPIs) can be extracted directly from the metric time series in real-time and reported to a client. For example, a metric time series may be processed against a predefined condition, and an alert may be generated when the condition is violated.

A detector 1735 may be a set of executable instructions that, when executed by one or more processors 1745, are configured to monitor a signal, such as a metric time series, for predefined conditions or issues. Those conditions or issues are expressed as one or more rules that trigger an alert when the conditions in the rules are met. Individual rules in a detector may be labeled according to criticality, e.g., info, warning, minor, major, and critical. For example, a detector that monitors the latency of an API call may go into a critical state when the latency is significantly higher than normal, as defined in the detector rules. The detector 1735 may be stored in a data store 1740 for processing by one or more hardware processors 1745.

In some implementations, a detector may trigger alerts when a signal value crosses specified thresholds defined in alert rules. Detectors also evaluate streams against a specific condition over a period of time. In more detail, detectors contain rules that specify: (i) when the detector is triggered based on conditions related to a specific metric time series; (ii) a severity of the alert to be generated by the detector; and (iii) how and where notifications are to be sent. When a detector is triggered, the detector performs the following: (i) generates an event, which can be viewed on charts and GUI dashboards; (ii) triggers an alert, which can be viewed in a number of places throughout the observability cloud user interface (UI) 1730; and (iii) transmits one or more notifications, so users are informed about the alert even when not currently monitoring dashboards. In some implementations, when the condition clears, the detector generates a second event and sends a second set of notifications. As used herein, an event may be a periodic occurrence that can be represented as a structured log line to for one monitoring modality, Splunk Infrastructure Monitoring. Events typically provide context for the metric data.

In one implementation, the metric time series modality can also be configured to deliver real-time alerts to a client in connection with detected anomalies of a metric time series. For example, detectors may be configured to detect sudden changes in metric time series or detect anomalies of a metric time series compared to historical data. For example, a client may configure a detector through the observability cloud UI 1730 to alert the client if the number of requests becomes excessive or is trending upward.

Many detectors are configured as forecasting detectors that utilize the historical data of a metric time series to predict what a current value should be and when the difference between the prediction and the current value meets or exceeds a threshold amount, an alert may be triggered. More specifically, a forecasting detector may take a metric time series as input, calculate a mean value for a current window (time period) and a mean value for a historical window, where the mean value for the historical window is used as a predicted value for the mean of the current window). The difference between the means of the current window and the historical window is calculated and based on the difference, an alert may be triggered. In this detector forecasting algorithm, there are three parameters that need to be defined: (1) the length of the current window; (2) the length of the historical window, and (3) the difference between a statistic computed or determined from the current window and the predicted value that is great enough to trigger an alert. In some implementations, the statistic may be the mean, maximum, or minimum of the current window. For example, one operation may include flagging the minimum of the current window as being anomalous with respect to the historical data of the metric time series. As these parameters directly impact when an alert is triggered, which may indicate anomalous behavior of the metric, accurately defining the parameters is crucial in establishing a detector that accurately detects anomalies without burdening a system administrator with excessive alerts.

However, establishing these three parameters for a forecasting detector that dictate when an alert is triggered is a complicated, time-consuming, and dynamic problem. For instance, manually setting parameters for the rules of a detector could be performed through trial-and-error. However, such a process could take days, weeks, or months to determine parameters that trigger alerts at a rate that is digestible by a system administrator (who may be monitoring alerts for tens or hundreds of rules simultaneously). Specifically, parameters could be selected that result in the triggering of too many alerts to the point that the system administrator ignores them as they are too time-consuming to review. Oppositely, parameters could be selected that result in the triggering of too few alerts such that system administrators are not notified of actual anomalies.

Further, the parameters may need adjustment over time as the values gradually but consistently change over time. For instance, a detector that monitors a number of user requests over a given time period may initially utilize a first set of parameters (e.g., 0.01 requests/second as a threshold for triggering an alert). However, the accepted number of user requests may increase over time as an enterprise grows and thus a second set of parameters may more accurately reflect the intent of the rule (e.g., 0.0175 requests/second). Thus, the trial-and-error approach to determining parameters may not only be time-consuming and result in numerous false positives/false negatives, but the process may also need to be repeated on a regular basis depending on the metric time series.

The anomaly detection system 1725 provides a solution for automatically determining parameters for detector rules and further provides a detector incorporating the tuned parameters. In some examples, the output of the anomaly detection system 1725 is a SignalFlow program (e.g., as a string) that defines the detector. The tuned parameters and resulting detector may be optimized for a particular metric time series. An illustrative flow is provided in FIG. 23.

The term "SignalFlow" may be understood to refer to a programming language used with Splunk Observability Cloud to describe analytics computations. SignalFlow programs filter, transform, and perform statistical computations on incoming data. SignalFlow programs may be used to generate charts and detectors from incoming metrics.

Briefly, the anomaly detection system 1725 is configured to receive a request to tune or optimize the parameters of a detector, with the request including at least a module path, a module name, and a function name, which collectively point to a particular detector. In some instances, a metric time series may be provided or a location of a directory or file storing a name of a metric time series may be provided. In some instances, the file may be formatted as a YAML file, where YAML is known in the art as a human-readable data-serialization language that is commonly used for configuration files.

Upon receiving a request for tuned parameters that indicates a particular detector and determining a metric time series, the anomaly detection system 1725 performs a series of operations in stages to determine tuning of the parameters of a forecasting detector as discussed above. Once the parameters have been tuned, the detector may then run continuously, e.g., at regular intervals, and provide alerts accordingly. In some implementations, the process may include three stages that are performed sequentially where the output of one stage is provided as input to subsequent stages. Thus, the first stage may tune a first parameter, and the tuned first parameter may be utilized as input to the second stage, which tunes a second parameter. The tuned first and second parameters may be then provided as input to the third stage, which tunes a third parameter.

In the example that will be discussed below, the anomaly detection system 1725 is configured to perform three stages: a first stage tunes a historical window parameter; a second stage tunes a current window parameter; and a third stage tunes the number of standard deviation different from historical mean required to fire ("trigger an alert").

Figure 18:
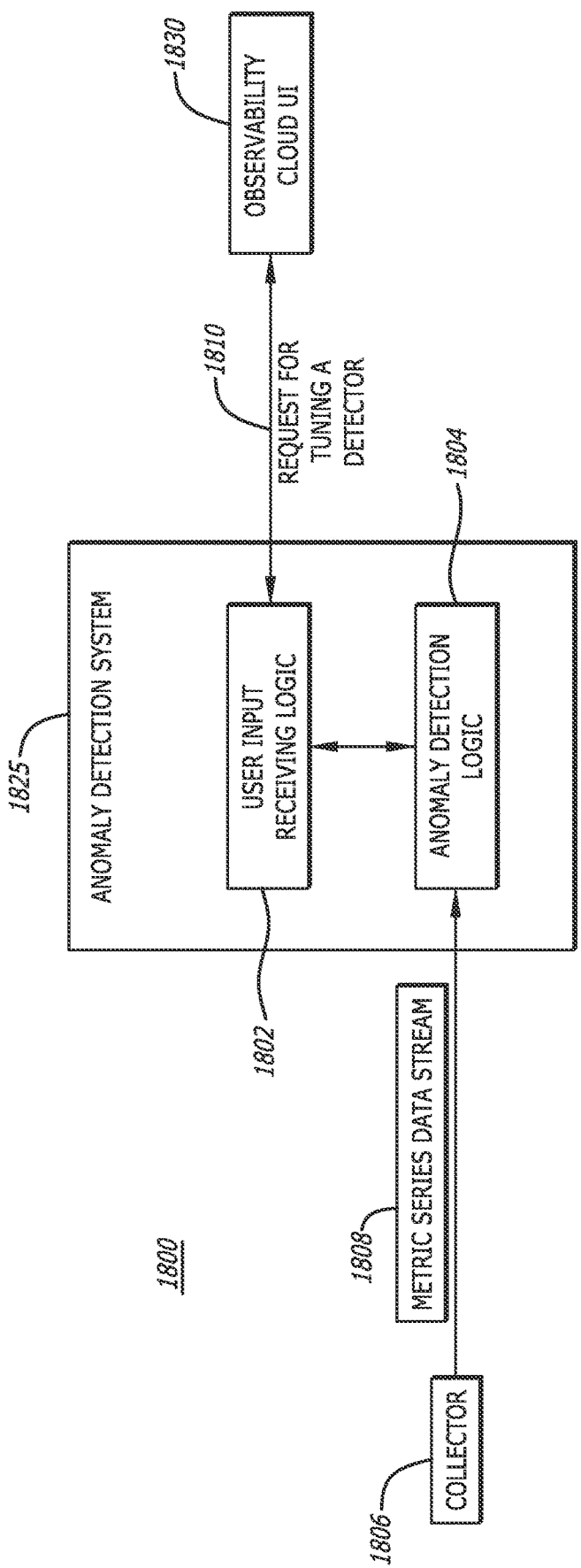
FIG. 18 is a block diagram illustrating logic of an anomaly detection system, in accordance with implementations of the monitoring service disclosed herein.

FIG. 18 is a block diagram illustrating logic of an anomaly detection system is shown in accordance with implementations of the monitoring service disclosed herein.

FIG. 18 illustrates a computing environment 1800 that includes a plurality of components that may be communicatively coupled and transmit data over a network, e.g., the internet. Additionally, one of more of the components may operate within a virtual environment, such as an AWS® virtual private cloud (VPC), which is understood to refer to an on-demand configurable pool of shared resources allocated within a public cloud environment.

The computing environment 1800 includes an anomaly detection system 1825, which may be a sub-component of a monitoring service, such as the monitoring service 1706 of FIG. 17. Additionally, the computing environment 1800 may also include a collector 1806 that provides a metric time series data stream 1808, that is accessible by the anomaly detection system 1825. Further, the computing environment 1800 may include an observability cloud UI 1830 that enables a user (e.g., a system administrator) to provide data to the anomaly detection system 125, where such data may refer to a request 1810 for a tuned detector as discussed above.

Some implementations of the anomaly detection system 1825 may include a user input receiving logic 1802 configure to receive requests 1810 from the observability cloud UI 1830 and an anomaly detection logic 1804 configured to perform operations to tune parameters of the detector indicated in the request 1810. For instance, the anomaly detection logic 1804 may be configured to perform the three stage process referenced above resulting in the tuning of a historical window parameter (first stage), a current window parameter (second stage), and the number of standard deviation different from historical mean required to trigger an alert (third stage).

Figure 19A:
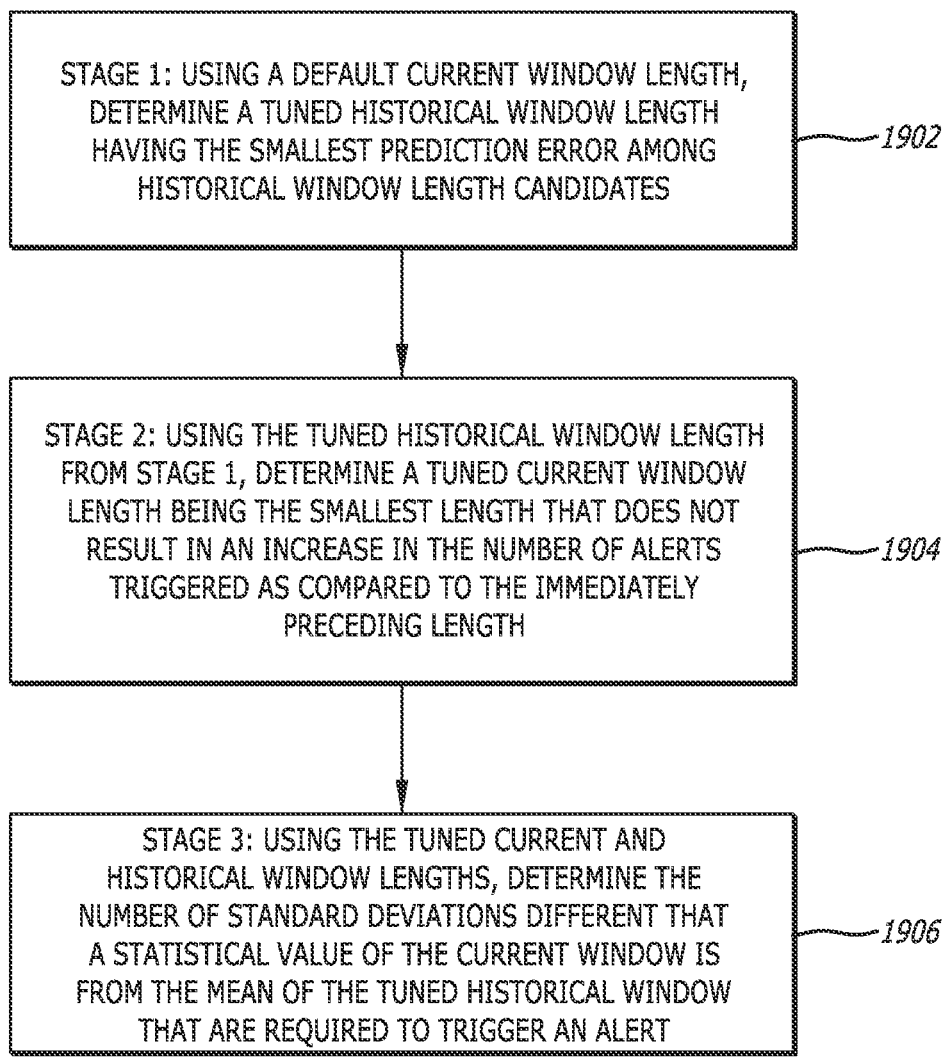
FIG. 19A is a flowchart illustrating an example multi-stage procedure for tuning parameters of a forecasting detection algorithm utilized by a detector operating on a metric time series, in accordance with implementations of the monitoring service disclosed herein.

FIG. 19A is a flowchart illustrating an example multi-stage procedure for tuning parameters of a forecasting detection algorithm utilized by a detector operating on a metric time series, in accordance with implementations of the monitoring service disclosed herein. Each block illustrated in FIG. 19A represents an operation performed in the method 1900 performed by an anomaly detection system, such as the anomaly detection system 1725 of FIG. 17. It should be understood that not every operation illustrated in FIG. 19A is required. In fact, certain operations may be optional to complete aspects of the method 1900. The discussion of the operations of method 1900 may be done so with reference to any of the previously described figures. It should be noted that the method 1900 provides numerous technological advantages over the current art, which may include selection of a plurality of sets of candidate parameters from a parameter search grid and performance of an anomaly detection process using each of the sets of candidate parameters to determine the most optimal set of candidate parameters. However, performing iterations of the anomaly detection process using different sets of candidate parameters is both resource intensive, e.g., uses vast computing and storage resources, and is time intense, e.g., takes a long period of time to complete all iterations of the anomaly detection process. The method 1900 and the implementations disclosed herein greatly improve the technological field of parameter tuning by reducing the resources used and the time to complete the tuning procedure. Specifically, such is accomplished by avoiding the multiple iterations of the anomaly detection procedure.

As discussed above, the procedure for tuning the parameters of a forecasting detector may comprise three stages, where the output of one stage is provided as input to subsequent stages. The method 1900 illustrates an implementation having three stages with each stage including operations that result in the tuning of one of the three parameters discussed above: a historical window length; a current window length; and a number of standard deviation different from historical mean required to fire ("trigger an alert").

The first stage (stage 1) of the method 1900 is directed to determining a tuned historical window length that has the smallest average prediction error among candidate historical window lengths (block 1902). As discussed above, a forecasting detector computes the difference between the mean value of a current window and the mean value of a historical window, where the mean value of the historical window serves as the prediction of the mean of the current window, and the difference between the means serves as the prediction error.

Specifically, in stage 1, the method 1900 first determines a default current window length, e.g., 1 minute, and a plurality of candidate historical window lengths, e.g., 15 minutes, 30 minutes, 45 minutes, etc. For each of the plurality of candidate historical window lengths, the average prediction error is determined using the default current window length. Detail as to the determination of the average prediction error is illustrated in FIG. 19B and discussed therewith. The candidate historical window length having the smallest average prediction error is selected as the tuned historical window length.

The second stage (stage 2) of the method 1900 is directed to determining a tuned current window length that does not result in an increase in the number of alerts triggered as compared to an immediately greater current window length (block 1904). Stated differently, stage 2 is directed at determining a smallest current window length that does not increase the number of alerts triggered compared to larger current window lengths. This is done as the smaller the current window length, the closer to real-time the alerts will be.

Specifically, in stage 2, the method 1900 utilizes tuned historical window length as determined in stage 1 (e.g., stage 2 receives the output of stage 1 as input). Additionally, an initial current window length is selected, e.g., 10 minutes. For a given time period of the metric time series, a procedure is performed in which the current window and historical window are sliding windows that are slid along the metric time series where the minimum value of the current window and the maximum value of the historical window are determined. For each {current window:historical window} pairing, if the minimum of the current window is greater than the maximum of the historical window, it is noted that an alert would be triggered. Upon concluding the sliding of the current window and the historical window along the metric time series, the number of alerts that would be triggered for the tuned historical window length and the initial current window length is determined (num_alerts_init_curr_length). The initial current window length is then reduced by a defined amount resulting in a reduced current window length. The process described above in determining the num_alerts_init_curr_length is repeated to determine a num_alerts_reduced1_curr_length. If the num_alerts_reduced1_curr_length is less than or equal to the num_alerts_init_curr_length, the reduced current window length is reduced again by the defined amount and the process repeats such that the num_alerts_reduced1_curr_length is compared to the num_alerts_reduced2_curr_length. The process continues to repeat until the number of alerts increase after reducing the current window length.

Figure 19C:
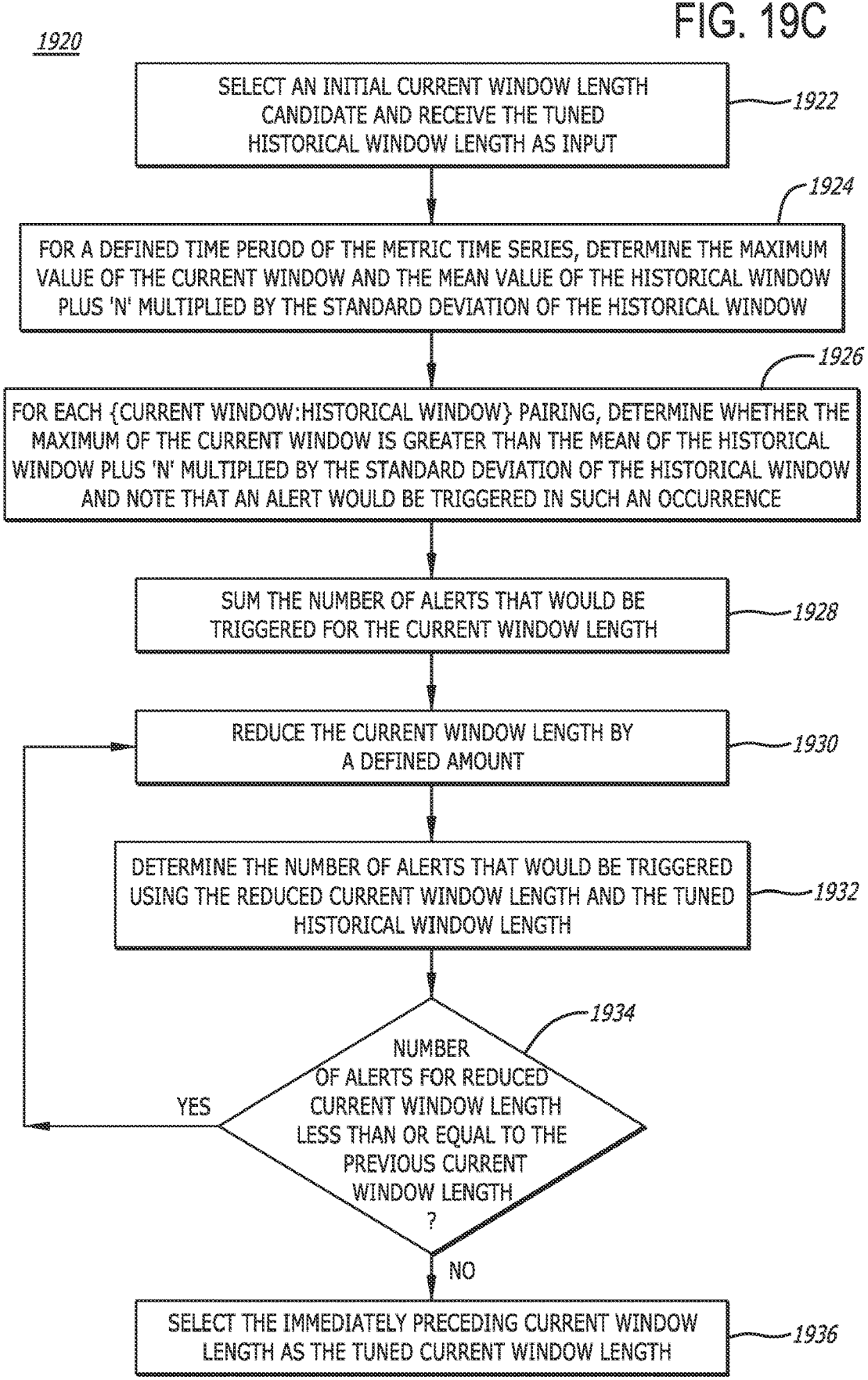
FIG. 19C is a flowchart illustrating an example operations included in performance of stage 2 set forth in FIG. 19A, in accordance with implementations of the monitoring service disclosed herein.

However, if the num_alerts_reduced1_curr_length is greater than the num_alerts_init_curr_length, the initial current window length is selected as the tuned current window length. Similarly, when num_alerts_reducedY_curr_length is greater than the num_alerts_reducedX_curr_length (where X immediately precedes Y in length reduction), the reducedX length is selected as the tuned current window length. Additional detail of in determining the tuned current window length is illustrated in FIG. 19C and discussed therewith.

In some implementations, the determination of the tuned current window length may include an analysis between timeliness (window length) and accuracy. For example, reducing a candidate current window size from 10 minute to 2 minute while increasing the number of anomalies from 50 to 51, then the additional anomaly detected is likely worth increase in timeliness by reducing the current window size by 80%.

The third stage (stage 3) of the method 1900 is directed to determining a tuned standard deviation multiplier representing the number of standard deviations different that a statistical value of the current window (e.g., minimum) is from the mean of the tuned historical window that are required to trigger an alert (block 1906). As should be understood, the lower this number is, the larger the number of alerts that are triggered, and vice versa. Thus, some implementations seek to determine a standard deviation multiplier such that an alert is triggered for only a certain percentage of the metric time series data points, e.g., 1%, 2%, etc.

Specifically, in stage 3, the tuned historical and current window lengths are utilized to compute a series of residual z-scores. The z-score refers to the minimum of a rolling current window minus the mean of the preceding historical window being divided by the standard deviation of that historical window. Advantageously, the computation of the z-scores may be completed in a single pass of the metric time series. Subsequently, a quantile of this derived series is computed (e.g., the $99^{th}$ percentile). The quantile provides a standard deviation multiplier that, given the tuned historical and current window lengths, results in triggering of alerts for 1% of the data points comprising the metric time series.

FIG. 19B is a flowchart illustrating an example operations included in performance of stage 1 set forth in FIG. 19A, in accordance with implementations of the monitoring service disclosed herein. Each block illustrated in FIG. 19B represents an operation performed in the method 1908; however, not every operation illustrated in FIG. 19B may be required. As discussed above, the first stage of the method 1900 of FIG. 19A is directed to determining a tuned historical window length that has the smallest average prediction error among candidate historical window lengths.

Determining the tuned historical window length begins by first selecting a default current window length, e.g., 1 minute (block 1910) and determining a plurality of candidate historical window lengths, e.g., 15 minutes, 30 minutes, 45 minutes, etc. (block 1912). For each of the plurality of candidate historical window lengths, the prediction error is computed over a defined time period of the metric time series using the default current window length (block 1914). The defined time period may be a defined historical time period, e.g., 1 week, 1 month, 3 months, etc. Computing the prediction error for each historical window and each current window may include a procedure in which the current window and historical window are sliding windows that are slid along the metric time series where the mean of the current window and the mean of the historical window are determined. For each {current window:historical window} pairing, the prediction error is the difference between the means. The sliding window process is repeated for each candidate historical window length and the default current window length.

Subsequently, the average prediction error for a candidate historical window length is determined, which is the average of the prediction errors determined for each {current window:historical window} pairing for a given a candidate historical window length (block 1916). The candidate historical window length having the smallest average prediction error is selected as the tuned historical window length (block 1918).

FIG. 19C is a flowchart illustrating an example operations included in performance of stage 2 set forth in FIG. 19A, in accordance with implementations of the monitoring service disclosed herein. Each block illustrated in FIG. 19C represents an operation performed in the method 1920; however, not every operation illustrated in FIG. 19C may be required. As discussed above, the second stage of the method 1900 of FIG. 19A is directed to determining a tuned current window length that that does not result in an increase in the number of alerts triggered as compared to an immediately greater current window length.

Determining the tuned current window length begins by first selecting an initial current window length candidate and receiving the tuned historical window length as input (block 1922). For example, the initial current window length candidate may be 10 minutes. The intent is that the initial current window length candidate will be a conservative candidate and reduced until further reduction results in an increase in the number of alerts that would be triggered.

For a defined time period of the metric time series, a procedure is performed in which the current window and historical window are sliding windows that are slid along the metric time series where the maximum value of the current window and the mean value of the historical window plus 'N' multiplied by the standard deviation of the historical window, are determined (block 1924). For each {current window:historical window} pairing, if the minimum of the current window is greater than the mean of the historical window plus 'N' multiplied by the standard deviation of the historical window, it is noted that an alert would be triggered (block 1926). Here, 'N' represents a default standard deviation multiplier. Stated mathematically, for each {current window:historical window} pairing, if the maximum of the current window is greater than (the mean of the historical window plus ('N' multiplied by the standard deviation of the historical window)), it is noted that an alert would be triggered. Upon concluding the sliding of the current window and the historical window along the metric time series, the number of alerts that would be triggered for the tuned historical window length and the initial current window length is summed ("num_alerts_init_curr_length") (block 1928). The initial current window length is then reduced by a defined amount resulting in a reduced current window length (block 1930).

The process of described above in determining the num_alerts_init_curr_length is repeated to determine a number of alerts that would be triggered for the tuned historical window length and the reduced current window length ("num_alerts_reduced1_curr_length") (block 1932). A determination is then made as to whether the num_alerts_reduced1_curr_length is less than or equal to the num_alerts_init_curr_length (block 1934). When the num_alerts_reduced1_curr_length is less than or equal to the num_alerts_init_curr_length, the reduced current window length is reduced again by the defined amount and the process repeats (return to block 1930). The process continues to repeat until the number of alerts increase after reducing the current window length.

However, if the num_alerts_reduced1_curr_length is greater than the num_alerts_init_curr_length, the initial current window length is selected as the tuned current window length (block 1936). Similarly, when num_alerts_reducedY_curr_length is greater than the num_alerts_reducedX_curr_length (where X immediately precedes Y in length reduction), the reducedX length is selected as the tuned current window length (block 1936).

Figure 19D:
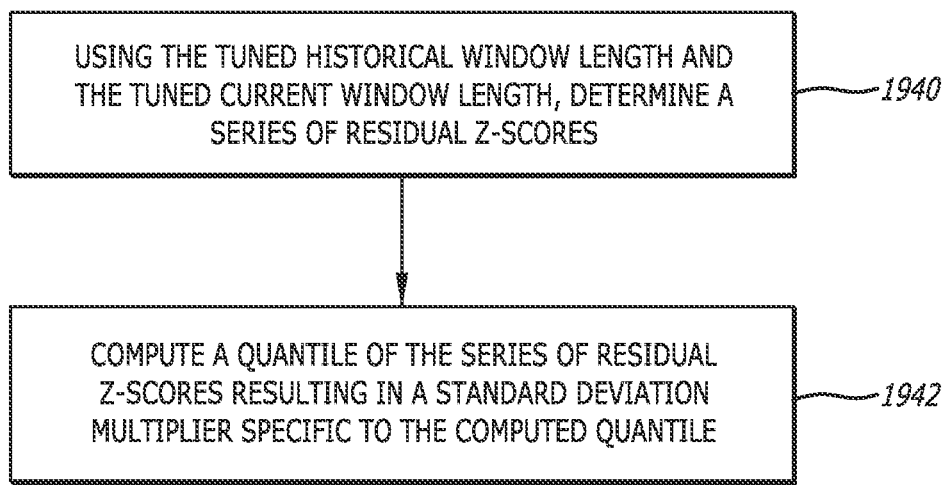
FIG. 19D is a flowchart illustrating an example operations included in performance of stage 3 set forth in FIG. 19A, in accordance with implementations of the monitoring service disclosed herein.

FIG. 19D is a flowchart illustrating an example operations included in performance of stage 3 set forth in FIG. 19A, in accordance with implementations of the monitoring service disclosed herein. Each block illustrated in FIG. 19D represents an operation performed in the method 1938; however, not every operation illustrated in FIG. 19D may be required. As discussed above, the third stage of the method 1900 of FIG. 19A is directed to determining a tuned standard deviation multiplier that results in the triggering of alerts for a defined percentage of the data points comprising the metric time series (e.g., only 1%).

Determining the standard deviation multiplier begins by first determining a series of residual z-scores using the tuned historical window length and the tuned current window length (block 1940). As noted above, the z-score refers to the minimum of a rolling current window minus the mean of the preceding historical window being divided by the standard deviation of that historical window. Subsequently, a quantile of this derived series is computed (e.g., the $99^{th}$ percentile) (block 1942). The quantile provides a standard deviation multiplier that, given the tuned historical and current window lengths, results in triggering of alerts for 1% of the data points comprising the metric time series.

FIG. 19E is a flowchart illustrating a second example multi-stage procedure for tuning parameters of a forecasting detection algorithm utilized by a detector operating on a metric time series, in accordance with implementations of the monitoring service disclosed herein. Each block illustrated in FIG. 19E represents an operation performed in the method 1944 performed by an anomaly detection system, such as the anomaly detection system 1725 of FIG. 17. It should be understood that not every operation illustrated in FIG. 19E is required. In fact, certain operations may be optional to complete aspects of the method 1944. The discussion of the operations of method 1944 may be done so with reference to any of the previously described figures and specifically with respect to FIG. 19A.

As discussed above, the procedure for tuning the parameters of a forecasting detector may comprise three stages, where the output of one stage is provided as input to subsequent stages. The method 1944 illustrates an implementation having four stages, where the fourth stage collapses proximate alerts to avoid over alerting a system administrator.

The first stage discussed with in FIG. 19E ("modified stage 1") is an alternative implementation to that of "stage 1" discussed with respect to FIG. 19A. Additionally, the fourth stage of FIG. 19E provides tuning of an additional parameter, a fourth parameter, that is an alert clearing threshold. The alert clearing threshold represents a time period (clearing window) where, when one or more proximate alerts would be triggered within the clearing window, the one or more proximate alerts would be "collapsed" into a single alert.

The modified first stage (modified stage 1) of the method 1944 is directed to determining a tuned historical window length that has the smallest average prediction error among candidate historical window lengths and incorporates a "non-smoothness" function, which protects against having a historical window that is too short (block 1946). Specifically, in modified stage 1, the method 1944 first determines a default current window length, e.g., 1 minute, and a plurality of candidate historical window lengths, e.g., 15 minutes, 30 minutes, 45 minutes, etc. For each of the plurality of candidate historical window lengths, the following is determined: (the average prediction error using the default current window length as discussed in FIG. 19A) plus (lambda multiplied by a non-smoothness function of the candidate historical window length). Detail as to the determination of the average prediction error is illustrated in FIG. 19B and discussed above. The non-smoothness function represents the non-smoothness of the series of rolling means of the candidate historical window length and has the same units as the prediction error. In FIG. 19E, the set of candidate historical windows lengths are represented by $ch_1, \ldots, ch_j$. In some implementations, lambda may be a predefined constant. The candidate historical window length that minimizes the following is selected as the tuned historical window length: (the average prediction error using the default current window length as discussed in FIG. 19A) plus (lambda multiplied by a non-smoothness function of the candidate historical window length).

In some optional implementations, once the tuned historical window length is selected based on the above using a predefined lambda value, the lambda value may also be tuned by selecting a lambda value from a set of candidate lambda values that minimizes the following utilizing the default current window length and the tuned historical window length: (the average prediction error using the default current window length as discussed in FIG. 19A) plus (candidate lambda value multiplied by a non-smoothness function of the tuned historical window length).

The second and third stages of FIG. 19E (blocks 1948 and 1950) are discussed above with respect to FIG. 19A (blocks 1904 and 1906). The fourth stage (stage 4) of the method 1944 is directed to determining an alert clearing threshold. Specifically, in stage 4, the method 1944 obtains the tuned parameters of stages 1-3 (stage 1 of FIG. 19A or modified stage 1 of FIG. 19E).

Next, the method 1944 performs an anomaly detection process using a forecasting detector implementing the tuned parameters of stages 1-3 to determine which points within the metric time series utilized in determining the tuned parameters would trigger alerts. Subsequently, for a pair of alerts within a distance of ('X' multiplied by the tuned current window length) of each other, where 'X' is a multiplier such as 1.5, 2, 3, etc., compute the minimum "m_i" of a "clearing" signal over the window between the alerts, where there are 'n' alerts noted and $n \geq i \geq 2$. The "clearing" signal may be defined as the maximum z-score of the current window having the tuned current window length relative to the historical window having the tuned historical window length.

Finally, the alert clearing threshold is set to be slightly smaller than the smallest of the minimum values, e.g., 'y' subtracted from $\min(m\_1, \ldots, m\_n)$, wherein 'y' represents a numerical value greater than zero, such as 0.01. The alert clearing threshold represents a threshold on the maximal z-score over the current window such that when two (or more) points trigger alerts within the alert clearing threshold distance, the alerts are collapsed into a single alert. As a result, proximate alerts would be collapsed into a single alert, and in fact, many alerts could be collapsed into one alert provided the distances between successive alerts is small enough relative to the alert clearing threshold.) It should be understood that either or both of modified stage 1 and stage 4 presented in the method 1944 may be utilized in the tuning parameter process. For instance, the modified stage 1 may be used in place of stage 1 in the method 1900 without the use of stage 4. Similarly, stage 4 may be utilized in additional to the method 1900 without the use of modified stage 1.

Referring to FIG. 20, a series of sample of historical windows and current windows in view of a metric time series data stream that may be utilized in determining a size of a historical window for use in an anomaly detection procedure is shown in accordance with implementations of the monitoring service disclosed herein. FIG. 20 illustrates three sample graphics of a metric time series data 2002, a sample current window (e.g., 1 min) 2004, and sample historical windows having varying window lengths. The sample graphics 2000, 2008, and 2012 may be examples of a default (sample) current window length and candidate historical window lengths (labeled option 1, 2, and 3 in FIG. 20) that are utilized in stage 1 of the procedure for determining tuned parameters discussed above.

The graphic 2000 illustrates the metric time series 2002, the sample current window 2004, and a historical window 2006 having a length of 30 minutes. The graphic 2008 illustrates the metric time series 2002, the sample current window 2004, and a historical window 2010 having a length of 45 minutes. The graphic 2012 illustrates the metric time series 2002, the sample current window 2004, and a historical window 2014 having a length of 60 minutes. It should be understood that additional and/or alternative window sizes may be used.

Referring to FIG. 21, a series of sample of historical windows and current windows in view of a metric time series data stream that may be utilized in determining a size of a current window for use in an anomaly detection procedure is shown in accordance with implementations of the monitoring service disclosed herein. FIG. 21 illustrates three sample graphics of a metric time series data 2102, a tuned (selected) historical window (e.g., 30 minutes) 2004, and a set of current windows 2106, 2110, and 2114 having varying window lengths. The sample graphics 2100, 2108, and 2112 may be examples of an initial current window length (10 minutes for window 2106), a first reduced current window length (5 minutes for window 2110), and a second reduced current window length (2 minutes for window 2114) that are utilized in stage 2 of the procedure for determining tuned parameters discussed above, where the selected historical window refers to the tuned historical window length determined in stage 1.

The graphic 2100 illustrates the metric time series 2102, the selected historical window 2104, and a current window 2106 having an initial current window length of 10 minutes. The graphic 2108 illustrates the metric time series 2102, the selected historical window 2104, and a current window 2106 having a first reduced current window length of 5 minutes. The graphic 2112 illustrates the metric time series 2102, the selected historical window 2104, and a current window 2106 having a second reduced current window length of 2 minutes. It should be understood that additional and/or alternative window sizes may be used.

Figure 22:
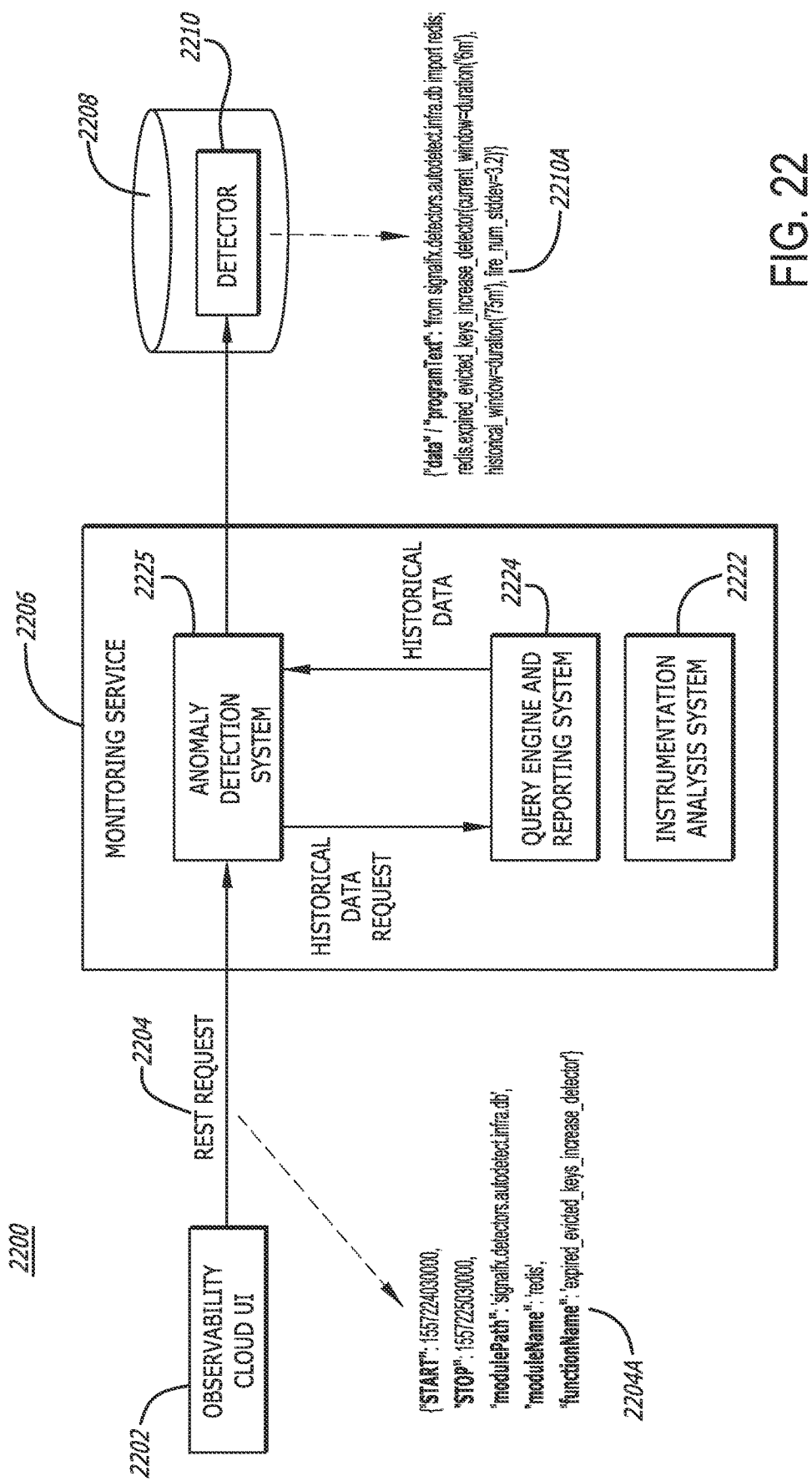
FIG. 22 is a flow diagram that illustrates the manner in which a request for a tuned detector is processed by an anomaly detection system within a computer system, in accordance with implementations of the monitoring service disclosed herein.

Referring to FIG. 22, a flow diagram that illustrates the manner in which a request for a detector is processed by an anomaly detection system within a computer system is shown in accordance with implementations of the monitoring service disclosed herein. The computing environment 2200 is shown to include an observability cloud UI 2202, a monitoring service 2206, and a data store 2208 configured to store a detector 2210 (or instructions that define a detector). The monitoring service 2206 may include an instrumentation analysis system 2222, a query engine and reporting system 2224, and an anomaly detection system 2225.

The flow diagram illustrates that a REST request 2204 may transmitted from the observability cloud UI 2202 to the anomaly detection system 2225. The observability cloud UI 2202 may be accessed by a system administrator or other user using a network device, such as a desktop computer having one or more processors, non-transitory computer-readable medium storage having stored thereon instructions, that when executed run various applications or programs, such as a web browser. The observability cloud UI 2202 may include graphical displays configured to receive user input used to generate the REST request 2204. An example REST request is shown as 2204A, which indicates a start/stop time indicating a time period over which to perform parameter tuning, a module path, a module name, and a function name, which together indicate a particular detector that is to have its parameters tuned. In some instances, the metric time series is defined in a configuration file accessible by the anomaly detection system 2225. In other implementations, the metric time series may be provided in or along with the REST request 2204.

Upon receipt of the REST request 2204, the anomaly detection system 2225 determines the metric time series for which to tune the parameters of the indicated detector and queries the query engine and reporting system 2224 for historical data of the time series metric. The anomaly detection system 2225 then performs the parameter tuning procedure discussed above at least with respect to FIGS. 19A-19D. The result of the parameter tuning procedure is a detector 2210 having the tuned parameters incorporated therein (or executable instructions, such as a SignalFlow program, that define the detector 2210). An example set of instructions defining the detector 2210 is shown as 2210A, which illustrates the sample tuned parameters of current_window=duration ('6 m'), historical_window=duration ('75 m'), and fire_num_std-dev=3.2.

Figure 23:
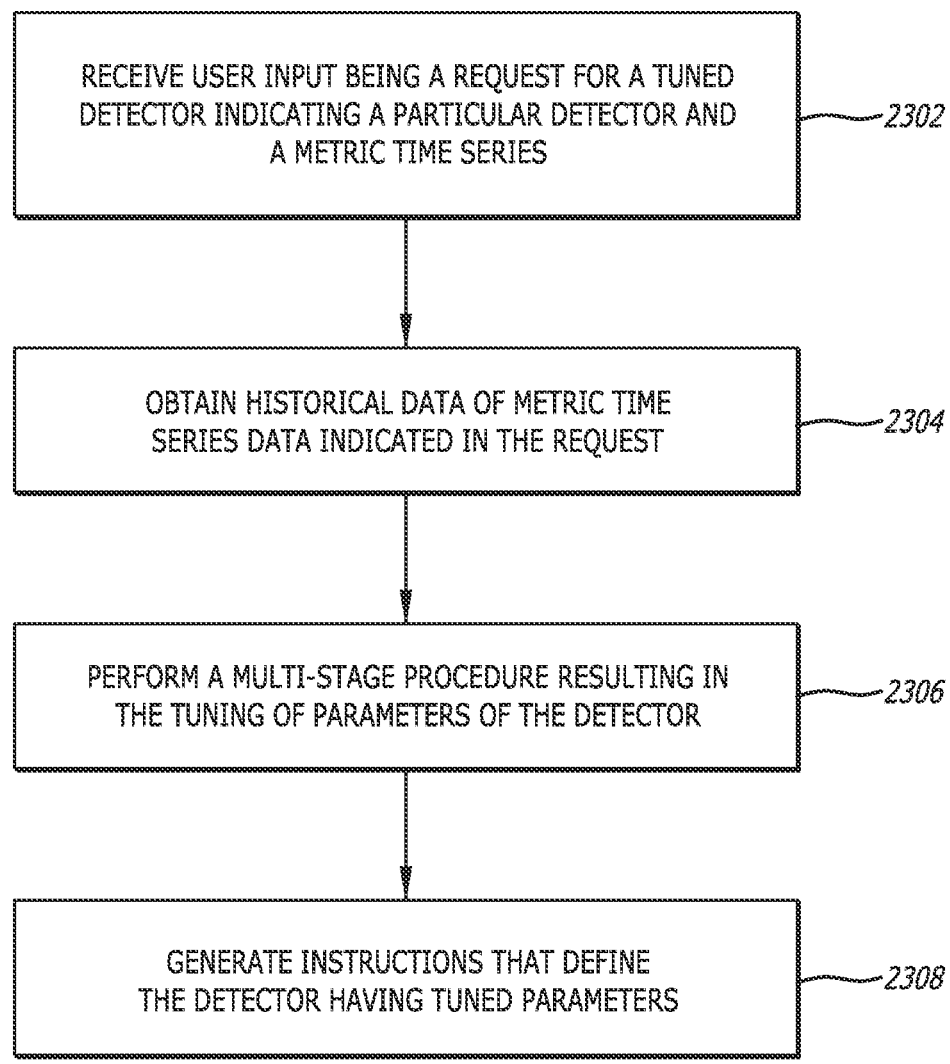
FIG. 23 is a flowchart illustrating an example process of operations for performing a detector parameter tuning procedure by an anomaly detection system, in accordance with implementations of the monitoring service disclosed herein.

FIG. 23 is a flowchart illustrating an example process of operations for performing a detector parameter tuning procedure by an anomaly detection system is shown in accordance with implementations of the monitoring service disclosed herein. The example process 2300 can be implemented, for example, by a computing device that comprises a processor and a non-transitory computer-readable medium. The non-transitory computer readable medium can be storing instructions that, when executed by the processor, can cause the processor to perform the operations of the illustrated process 2300. Alternatively or additionally, the process 2300 can be implemented using a non-transitory computer-readable medium storing instructions that, when executed by one or more processors, cause the one or more processors to perform the operations of the process 2300 of FIG. 23.

Each block illustrated in FIG. 23 represents an operation performed in the method 2300 performed by an anomaly detection system, such as the anomaly detection system 1725 of FIG. 17. It should be understood that not every operation illustrated in FIG. 23 is required. In fact, certain operations may be optional to complete aspects of the method 2300. The discussion of the operations of method 2300 may be done so with reference to any of the previously described figures. The method 2300 begins with an operation of receiving user input being a request for a tuned detector indicating a detector and a metric time series (block 2302). In some implementations, the metric time series may be indicated elsewhere, such as in a configuration file.

The method 2300 subsequently obtains the metric time series (block 2304). Obtaining the metric time series may include querying the query engine and reporting system of the monitoring service for historical data of the specified metric time series.

Upon obtaining the metric time series, the method 2300 continues with performing a multi-stage procedure, where each stage tunes a particular parameter of the detector specified in the request (block 2306). In some implementations, the multi-stage procedure may include three stages in which a first stage tunes a first parameter of a rule of the detector, a second stage takes the tuned first parameter as input and tunes a second parameter, and a third stage takes the tuned first and second parameters as input and tunes a third parameter. The method 2300 may result in the generation of instructions (e.g., a SignalFlow program that is formatted as a string) that define the detector having the tuned parameters (block 2308).

In some implementations of the method, the multi-stage tuning procedure comprises three stages, wherein execution of each stage results in tuning of a single parameter of the set of parameters. In further implementations of the method, the detector is configured to (i) determine a statistical value of data points within a current window of the metric time series, and (ii) trigger the alert when a difference between the statistical value of the data points within the current window and a mean value of the data points within a historical window is greater than a standard deviation multiplier.

In some examples, the multi-stage tuning procedure includes a first stage that is configured to determine a tuned historical window length utilized by the detector in determining a mean value of data points within a historical window, wherein the tuned historical window length is selected as having a smallest prediction error among a set of candidate historical window lengths.

In other examples, wherein the multi-stage tuning procedure includes a second stage that is configured to determine a tuned current window length utilized by the detector in determining a set of data points from which a minimum value is selected for comparison with the mean value of the data points of the historical window. Additionally, the tuned current window length is determined by performing an anomaly detection process for a series of candidate current window lengths, wherein a shortest candidate current window length is selected that does not result in triggering of additional alerts as compared to a number of alerts triggered by an immediately longer candidate current window length.

In yet other implementations of the method, the multi-stage tuning procedure includes a second stage that is configured to determine a tuned standard deviation multiplier using the tuned current window length and the tuned historical window length to generate a series of residual z-scores for the metric time series and compute a quantile of the residual z-scores.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 24:
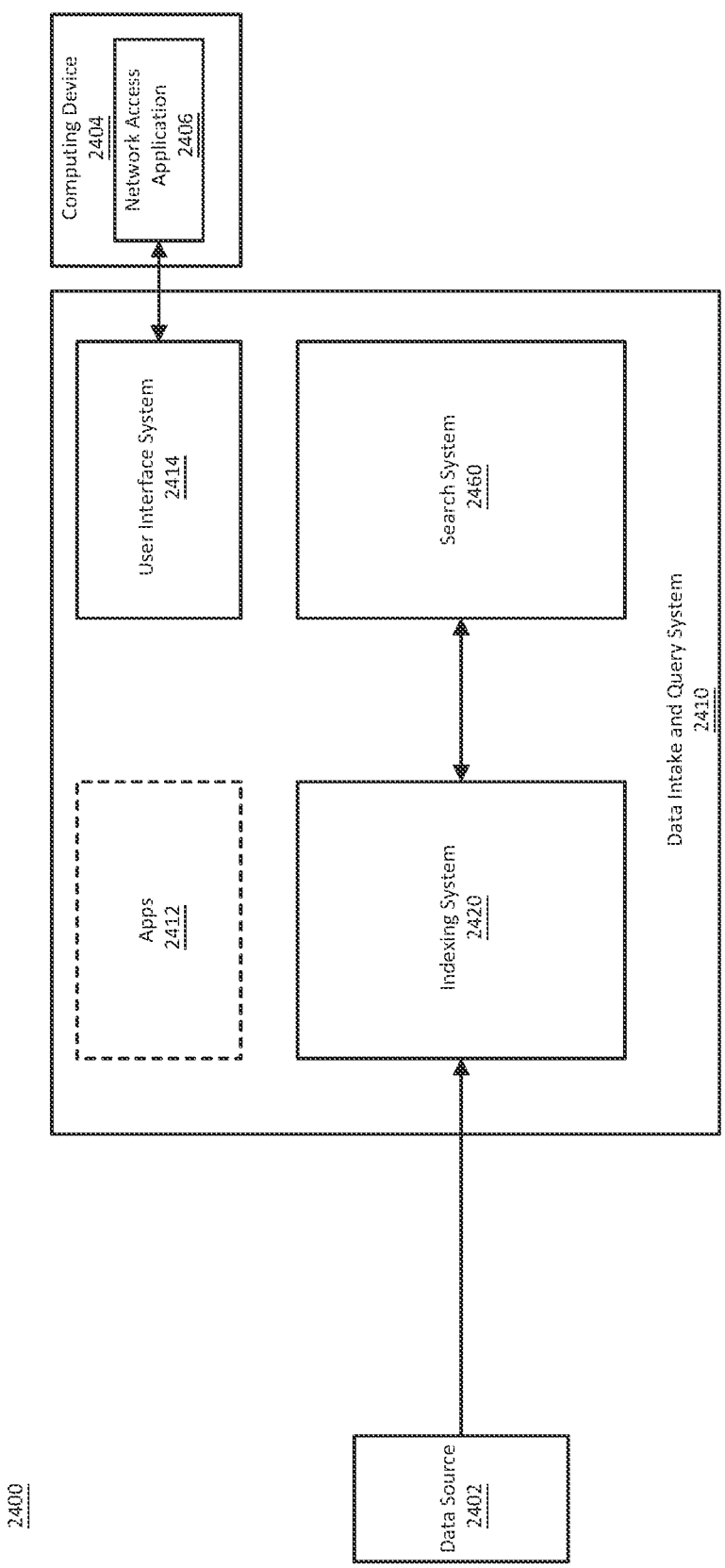
FIG. 24 is a block diagram illustrating an example computing environment that includes a data intake and query system.

FIG. 24 is a block diagram illustrating an example computing environment 2400 that includes a data intake and query system 2410. The data intake and query system 2410 obtains data from a data source 2402 in the computing environment 2400, and ingests the data using an indexing system 2420. A search system 2460 of the data intake and query system 2410 enables users to navigate the indexed data. Though drawn with separate boxes in FIG. 24, in some implementations the indexing system 2420 and the search system 2460 can have overlapping components. A computing device 2404, running a network access application 2406, can communicate with the data intake and query system 2410 through a user interface system 2414 of the data intake and query system 2410. Using the computing device 2404, a user can perform various operations with respect to the data intake and query system 2410, such as administration of the data intake and query system 2410, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 2410 can further optionally include apps 2412 that extend the search, analytics, and/or visualization capabilities of the data intake and query system 2410.

The data intake and query system 2410 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 2410 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 2410 can be executed on a single computing device, or execution of the program code can be distributed over multiple computing devices. For example, the program code can include instructions for both indexing and search components (which may be part of the indexing system 2420 and/or the search system 2460, respectively), which can be executed on a computing device that also provides the data source 2402. As another example, the program code can be executed on one computing device, where execution of the program code provides both indexing and search components, while another copy of the program code executes on a second computing device that provides the data source 2402. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 2402 of the computing environment 2400 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 2402 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 2420 obtains machine date from the data source 2402 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 2420 does not require prior knowledge of the structure of incoming data (e.g., the indexing system 2420 does not need to be provided with a schema describing the data). Additionally, the indexing system 2420 retains a copy of the data as it was received by the indexing system 2420 such that the original data is always available for searching (e.g., no data is discarded, though, in some examples, the indexing system 2420 can be configured to do so).

The search system 2460 searches the data stored by the indexing 2420 system. As discussed in greater detail below, the search system 2460 enables users associated with the computing environment 2400 (and possibly also other users) to navigate the data, generate reports, and visualize search results in "dashboards" output using a graphical interface. Using the facilities of the search system 2460, users can obtain insights about the data, such as retrieving events from an index, calculating metrics, searching for specific conditions within a rolling time window, identifying patterns in the data, and predicting future trends, among other examples. To achieve greater efficiency, the search system 2460 can apply map-reduce methods to parallelize searching of large volumes of data. Additionally, because the original data is available, the search system 2460 can apply a schema to the data at search time. This allows different structures to be applied to the same data, or for the structure to be modified if or when the content of the data changes. Application of a schema at search time may be referred to herein as a late-binding schema technique.

The user interface system 2414 provides mechanisms through which users associated with the computing environment 2400 (and possibly others) can interact with the data intake and query system 2410. These interactions can include configuration, administration, and management of the indexing system 2420, initiation and/or scheduling of queries that are to be processed by the search system 2460, receipt or reporting of search results, and/or visualization of search results. The user interface system 2414 can include, for example, facilities to provide a command line interface or a web-based interface.

Users can access the user interface system 2414 using a computing device 2404 that communicates with data intake and query system 2410, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 2400. For example, a person can log in as a particular user and, using the user's digital information, can access the data intake and query system 2410. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 2404 can provide a human-machine interface through which a person can have a digital presence in the computing environment 2400 in the form of a user. The computing device 2404 is an electronic device having one or more processors and a memory capable of storing instructions for execution by the one or more processors. The computing device 2404 can further include input/output (I/O) hardware and a network interface. Applications executed by the computing device 2404 can include a network access application 2406, such as a web browser, which can use a network interface of the client computing device 2404 to communicate, over a network, with the user interface system 2414 of the data intake and query system 2410. The user interface system 2414 can use the network access application 2406 to generate user interfaces that enable a user to interact with the data intake and query system 2410. A web browser is one example of a network access application. A shell tool can also be used as a network access application. In some examples, the data intake and query system 2410 is an application executing on the computing device 2406. In such examples, the network access application 2406 can access the user interface system 2414 without going over a network.

The data intake and query system 2410 can optionally include apps 2412. An app of the data intake and query system 2410 is a collection of configurations, knowledge objects (a user-defined entity that enriches the data in the data intake and query system 2410), views, and dashboards that may provide additional functionality, different techniques for searching the data, and/or additional insights into the data. The data intake and query system 2410 can execute multiple applications simultaneously. Example applications include an information technology service intelligence application, which can monitor and analyze the performance and behavior of the computing environment 2400, and an enterprise security application, which can include content and searches to assist security analysts in diagnosing and acting on anomalous or malicious behavior in the computing environment 2400.

Though FIG. 24 illustrates only one data source, in practical implementations, the computing environment 2400 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 2400, the data intake and query system 2410 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 2400 can include on-prem and cloud-based computing resources, or only cloud-based resources. For example, an entity may have on-prem computing devices and a private cloud. In this example, the entity operates the data intake and query system 2410 and can choose to execute the data intake and query system 2410 on an on-prem computing device or in the cloud. In another example, a provider entity operates the data intake and query system 2410 in a public cloud and provides the functionality of the data intake and query system 2410 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 2410. In some implementations, the entity providing the data intake and query system 2410 is itself subscribing to the cloud services of a cloud service provider. As an example, a first entity provides computing resources under a public cloud service model, a second entity subscribes to the cloud services of the first provider entity and uses the cloud computing resources to operate the data intake and query system 2410, and a third entity can subscribe to the services of the second provider entity in order to use the functionality of the data intake and query system 2410. In this example, the data sources are associated with the third entity, users accessing the data intake and query system 2410 are associated with the third entity, and the analytics and insights provided by the data intake and query system 2410 are for purposes of the third entity's operations.

Figure 25:
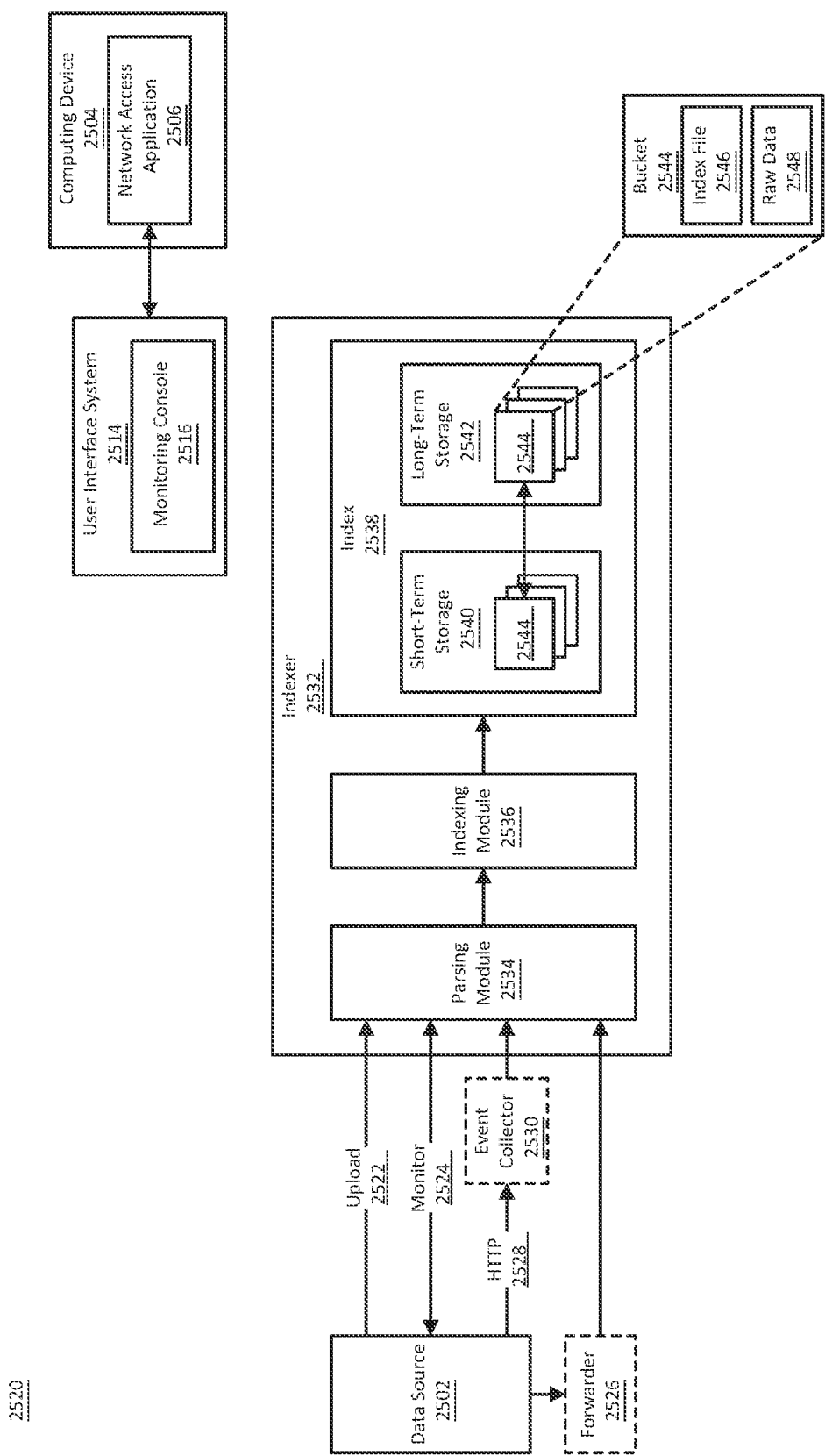
FIG. 25 is a block diagram illustrating in greater detail an example of an indexing system of a data intake and query system, such as the data intake and query system of FIG. 24.

FIG. 25 is a block diagram illustrating in greater detail an example of an indexing system 2520 of a data intake and query system, such as the data intake and query system 2410 of FIG. 24. The indexing system 2520 of FIG. 25 uses various methods to obtain machine data from a data source 2502 and stores the data in an index 2538 of an indexer 2532. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 2520 enables the data intake and query system to obtain the machine data produced by the data source 2502 and to store the data for searching and retrieval.

Users can administer the operations of the indexing system 2520 using a computing device 2504 that can access the indexing system 2520 through a user interface system 2514 of the data intake and query system. For example, the computing device 2504 can be executing a network access application 2506, such as a web browser or a terminal, through which a user can access a monitoring console 2516 provided by the user interface system 2514. The monitoring console 2516 can enable operations such as: identifying the data source 2502 for data ingestion; configuring the indexer 2532 to index the data from the data source 2532; configuring a data ingestion method; configuring, deploying, and managing clusters of indexers; and viewing the topology and performance of a deployment of the data intake and query system, among other operations. The operations performed by the indexing system 2520 may be referred to as "index time" operations, which are distinct from "search time" operations that are discussed further below.

The indexer 2532, which may be referred to herein as a data indexing component, coordinates and performs most of the index time operations. The indexer 2532 can be implemented using program code that can be executed on a computing device. The program code for the indexer 2532 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 2532. In some implementations, the indexer 2532 executes on the computing device 2504 through which a user can access the indexing system 2520. In some implementations, the indexer 2532 executes on a different computing device than the illustrated computing device 2504.

The indexer 2532 may be executing on the computing device that also provides the data source 2502 or may be executing on a different computing device. In implementations wherein the indexer 2532 is on the same computing device as the data source 2502, the data produced by the data source 2502 may be referred to as "local data." In other implementations the data source 2502 is a component of a first computing device and the indexer 2532 executes on a second computing device that is different from the first computing device. In these implementations, the data produced by the data source 2502 may be referred to as "remote data." In some implementations, the first computing device is "on-prem" and in some implementations the first computing device is "in the cloud." In some implementations, the indexer 2532 executes on a computing device in the cloud and the operations of the indexer 2532 are provided as a service to entities that subscribe to the services provided by the data intake and query system.

For a given data produced by the data source 2502, the indexing system 2520 can be configured to use one of several methods to ingest the data into the indexer 2532. These methods include upload 2522, monitor 2524, using a forwarder 2526, or using HyperText Transfer Protocol (HTTP 2528) and an event collector 2530. These and other methods for data ingestion may be referred to as "getting data in" (GDI) methods.

Using the upload 2522 method, a user can specify a file for uploading into the indexer 2532. For example, the monitoring console 2516 can include commands or an interface through which the user can specify where the file is located (e.g., on which computing device and/or in which directory of a file system) and the name of the file. The file may be located at the data source 2502 or maybe on the computing device where the indexer 2532 is executing. Once uploading is initiated, the indexer 2532 processes the file, as discussed further below. Uploading is a manual process and occurs when instigated by a user. For automated data ingestion, the other ingestion methods are used.

The monitor 2524 method enables the indexing system 2502 to monitor the data source 2502 and continuously or periodically obtain data produced by the data source 2502 for ingestion by the indexer 2532. For example, using the monitoring console 2516, a user can specify a file or directory for monitoring. In this example, the indexing system 2502 can execute a monitoring process that detects whenever the file or directory is modified and causes the file or directory contents to be sent to the indexer 2532. As another example, a user can specify a network port for monitoring. In this example, a monitoring process can capture data received at or transmitting from the network port and cause the data to be sent to the indexer 2532. In various examples, monitoring can also be configured for data sources such as operating system event logs, performance data generated by an operating system, operating system registries, operating system directory services, and other data sources.

Monitoring is available when the data source 2502 is local to the indexer 2532 (e.g., the data source 2502 is on the computing device where the indexer 2532 is executing). Other data ingestion methods, including forwarding and the event collector 2530, can be used for either local or remote data sources.

A forwarder 2526, which may be referred to herein as a data forwarding component, is a software process that sends data from the data source 2502 to the indexer 2532. The forwarder 2526 can be implemented using program code that can be executed on the computer device that provides the data source 2502. A user launches the program code for the forwarder 2526 on the computing device that provides the data source 2502. The user can further configure the forwarder 2526, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 2526 can provide various capabilities. For example, the forwarder 2526 can send the data unprocessed or can perform minimal processing on the data before sending the data to the indexer 2532. Minimal processing can include, for example, adding metadata tags to the data to identify a source, source type, and/or host, among other information, dividing the data into blocks, and/or applying a timestamp to the data. In some implementations, the forwarder 2526 can break the data into individual events (event generation is discussed further below) and send the events to a receiver. Other operations that the forwarder 2526 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 2530 provides an alternate method for obtaining data from the data source 2502. The event collector 2530 enables data and application events to be sent to the indexer 2532 using HTTP 2528. The event collector 2530 can be implemented using program code that can be executing on a computing device. The program code may be a component of the data intake and query system or can be a standalone component that can be executed independently of the data intake and query system and operates in cooperation with the data intake and query system.

To use the event collector 2530, a user can, for example using the monitoring console 2516 or a similar interface provided by the user interface system 2514, enable the event collector 2530 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 2502 as an alternative method to using a username and password for authentication.

To send data to the event collector 2530, the data source 2502 is supplied with a token and can then send HTTP 2528 requests to the event collector 2530. To send HTTP 2528 requests, the data source 2502 can be configured to use an HTTP client and/or to use logging libraries such as those supplied by Java, JavaScript, and NET libraries. An HTTP client enables the data source 2502 to send data to the event collector 2530 by supplying the data, and a Uniform Resource Identifier (URI) for the event collector 2530 to the HTTP client. The HTTP client then handles establishing a connection with the event collector 2530, transmitting a request containing the data, closing the connection, and receiving an acknowledgment if the event collector 2530 sends one. Logging libraries enable HTTP 2528 requests to the event collector 2530 to be generated directly by the data source. For example, an application can include or link a logging library, and through functionality provided by the logging library manage establishing a connection with the event collector 2530, transmitting a request, and receiving an acknowledgement.

An HTTP 2528 request to the event collector 2530 can contain a token, a channel identifier, event metadata, and/or event data. The token authenticates the request with the event collector 2530. The channel identifier, if available in the indexing system 2520, enables the event collector 2530 to segregate and keep separate data from different data sources. The event metadata can include one or more key-value pairs that describe the data source 2502 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 2530 extracts events from HTTP 2528 requests and sends the events to the indexer 2532. The event collector 2530 can further be configured to send events to one or more indexers. Extracting the events can include associating any metadata in a request with the event or events included in the request. In these implementations, event generation by the indexer 2532 (discussed further below) is bypassed, and the indexer 2532 moves the events directly to indexing. In some implementations, the event collector 2530 extracts event data from a request and outputs the event data to the indexer 2532, and the indexer generates events from the event data. In some implementations, the event collector 2530 sends an acknowledgement message to the data source 2502 to indicate that the event collector 2530 has received a particular request form the data source 2502, and/or to indicate to the data source 2502 that events in the request have been added to an index.

The indexer 2532 ingests incoming data and transforms the data into searchable knowledge in the form of events. In the data intake and query system, an event is a single piece of data that represents activity of the component represented in FIG. 25 by the data source 2502. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 2532 can include a parsing module 2534 and an indexing module 2536 for generating and storing the events. The parsing module 2534 and indexing module 2536 can be modular and pipelined, such that one component can be operating on a first set of data while the second component is simultaneously operating on a second sent of data. Additionally, the indexer 2532 may at any time have multiple instances of the parsing module 2534 and indexing module 2536, with each set of instances configured to simultaneously operate on data from the same data source or from different data sources. The parsing module 2534 and indexing module 2536 are illustrated in FIG. 25 to facilitate discussion, with the understanding that implementations with other components are possible to achieve the same functionality.

The parsing module 2534 determines information about incoming event data, where the information can be used to identify events within the event data. For example, the parsing module 2534 can associate a source type with the event data. A source type identifies the data source 2502 and describes a possible data structure of event data produced by the data source 2502. For example, the source type can indicate which fields to expect in events generated at the data source 2502 and the keys for the values in the fields, and possibly other information such as sizes of fields, an order of the fields, a field separator, and so on. The source type of the data source 2502 can be specified when the data source 2502 is configured as a source of event data. Alternatively, the parsing module 2534 can determine the source type from the event data, for example from an event field in the event data or using machine learning techniques applied to the event data.

Other information that the parsing module 2534 can determine includes timestamps. In some cases, an event includes a timestamp as a field, and the timestamp indicates a point in time when the action represented by the event occurred or was recorded by the data source 2502 as event data. In these cases, the parsing module 2534 may be able to determine from the source type associated with the event data that the timestamps can be extracted from the events themselves. In some cases, an event does not include a timestamp and the parsing module 2534 determines a timestamp for the event, for example from a name associated with the event data from the data source 2502 (e.g., a file name when the event data is in the form of a file) or a time associated with the event data (e.g., a file modification time). As another example, when the parsing module 2534 is not able to determine a timestamp from the event data, the parsing module 2534 may use the time at which it is indexing the event data. As another example, the parsing module 2534 can use a user-configured rule to determine the timestamps to associate with events.

The parsing module 2534 can further determine event boundaries. In some cases, a single line (e.g., a sequence of characters ending with a line termination) in event data represents one event while in other cases, a single line represents multiple events. In yet other cases, one event may span multiple lines within the event data. The parsing module 2534 may be able to determine event boundaries from the source type associated with the event data, for example from a data structure indicated by the source type. In some implementations, a user can configure rules the parsing module 2534 can use to identify event boundaries.

The parsing module 2534 can further extract data from events and possibly also perform transformations on the events. For example, the parsing module 2534 can exteract a set of fields (key-value pairs) for each event, such as a host or hostname, source or source name, and/or source type. The parsing module 2534 may extract certain fields by default or based on a user configuration. Alternatively or additionally, the parsing module 2534 may add fields to events, such as a source type or a user-configured field. As another example of a transformation, the parsing module 2534 can anonymize fields in events to mask sensitive information, such as social security numbers or account numbers. Anonymizing fields can include changing or replacing values of specific fields. The parsing component 2534 can further perform user-configured transformations.

The parsing module 2534 outputs the results of processing incoming event data to the indexing module 2536, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 2532 can be configured to identify searchable segments that are parts of fields, searchable segments that are entire fields, or both. The parsing module 2534 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 2546, to find event data that matches a search query. In some implementations, segmentation can alternatively be performed by the forwarder 2526. Segmentation can also be disabled, in which case the indexer 2532 will not build a lexicon for the event data. When segmentation is disabled, the search system searches the event data directly.

Building index data structures generates the index 2538. The index 2538 is a storage data structure on a storage device (e.g., a disk drive or other physical device for storing digital data). The storage device may be a component of the computing device on which the indexer 2532 is operating (referred to herein as local storage) or may be a component of a different computing device (referred to herein as remote storage) that the indexer 2538 has access to over a network. The indexer 2532 can manage more than one index and can manage indexes of different types. For example, the indexer 2532 can manage event indexes, which impose minimal structure on stored data and can accommodate any type of data. As another example, the indexer 2532 can manage metrics indexes, which use a highly structured format to handle the higher volume and lower latency demands associated with metrics data.

The indexing module 2536 organizes files in the index 2538 in directories referred to as buckets. The files in a bucket 2544 can include raw data files, index files, and possibly also other metadata files. As used herein, "raw data" means data as when the data was produced by the data source 2502, without alteration to the format or content. As noted previously, the parsing component 2534 may add fields to event data and/or perform transformations on fields in the event data. Event data that has been altered in this way is referred to herein as enriched data. A raw data file 2548 can include enriched data, in addition to or instead of raw data. The raw data file 2548 may be compressed to reduce disk usage. An index file 2546, which may also be referred to herein as a "time-series index" or tsidx file, contains metadata that the indexer 2532 can use to search a corresponding raw data file 2548. As noted above, the metadata in the index file 2546 includes a lexicon of the event data, which associates each unique keyword in the event data with a reference to the location of event data within the raw data file 2548. The keyword data in the index file 2546 may also be referred to as an inverted index. In various implementations, the data intake and query system can use index files for other purposes, such as to store data summarizations that can be used to accelerate searches.

A bucket 2544 includes event data for a particular range of time. The indexing module 2536 arranges buckets in the index 2538 according to the age of the buckets, such that buckets for more recent ranges of time are stored in short-term storage 2540 and buckets for less recent ranges of time are stored in long-term storage 2542. Short-term storage 2540 may be faster to access while long-term storage 2542 may be slower to access. Buckets may be moves from short-term storage 2540 to long-term storage 2542 according to a configurable data retention policy, which can indicate at what point in time a bucket is old enough to be moved.

A bucket's location in short-term storage 2540 or long-term storage 2542 can also be indicated by the bucket's status. As an example, a bucket's status can be "hot," "warm," "cold," "frozen," or "thawed." In this example, hot bucket is one to which the indexer 2532 is writing data and the bucket becomes a warm bucket when the index 2532 stops writing data to it. In this example, both hot and warm buckets reside in short-term storage 2540. Continuing this example, when a warm bucket is moved to long-term storage 2542, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 2520 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 2520 through the monitoring console 2516 provided by the user interface system 2514. Using the monitoring console 2516, the user can configure and monitor an index cluster, and see information such as disk usage by an index, volume usage by an indexer, index and volume size over time, data age, statistics for bucket types, and bucket settings, among other information.

Figure 26:
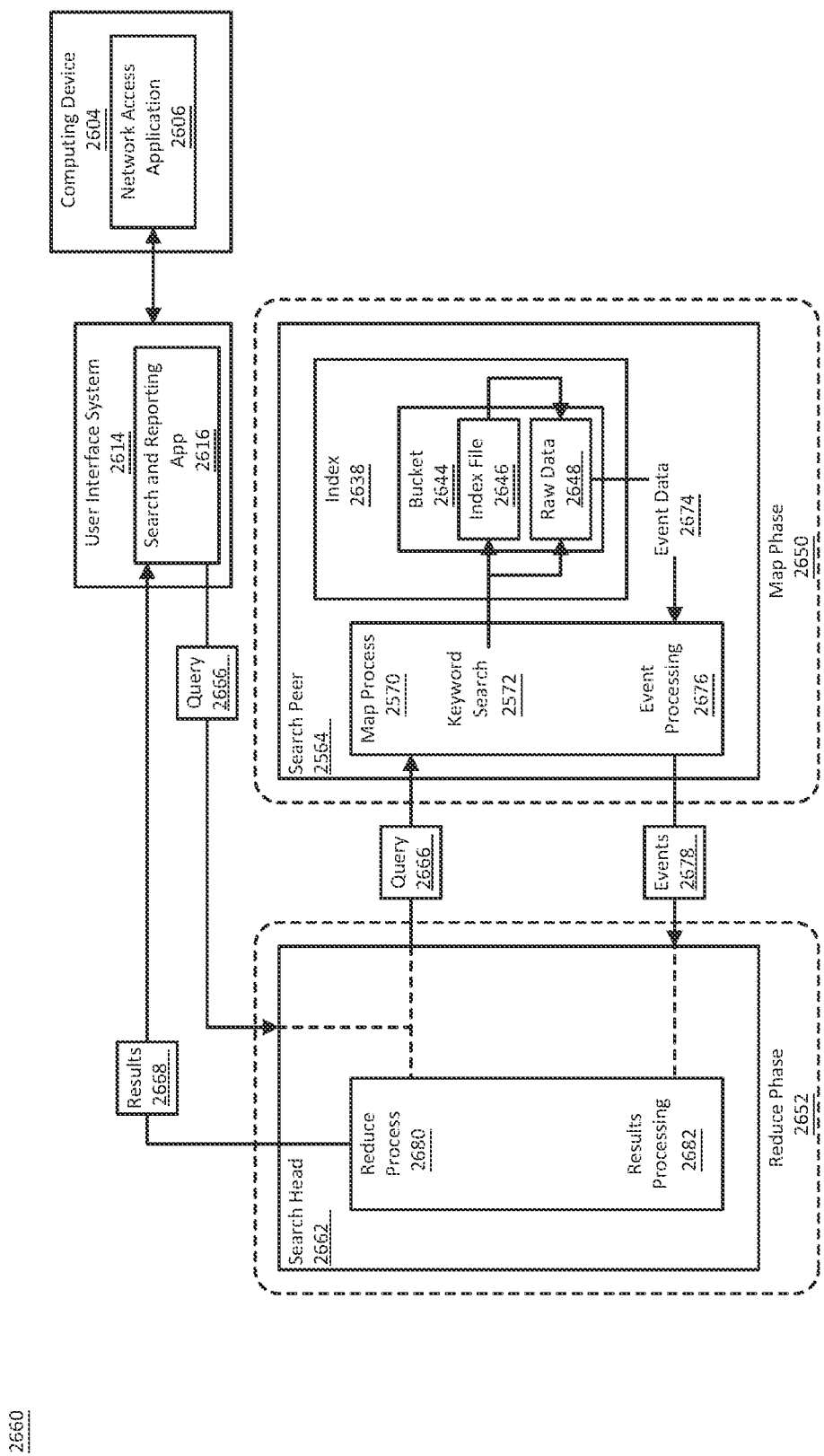
FIG. 26 is a block diagram illustrating in greater detail an example of the search system of a data intake and query system, such as the data intake and query system of FIG. 24.

FIG. 26 is a block diagram illustrating in greater detail an example of the search system 2660 of a data intake and query system, such as the data intake and query system 2410 of FIG. 24. The search system 2660 of FIG. 26 issues a query 2666 to a search head 2662, which sends the query 2666 to a search peer 2664. Using a map process 2670, the search peer 2664 searches the appropriate index 2638 for events identified by the query 2666 and sends events 2678 so identified back to the search head 2662. Using a reduce process 2682, the search head 2662 processes the events 2678 and produces results 2668 to respond to the query 2666. The results 2668 can provide useful insights about the data stored in the index 2638. These insights can aid in the administration of information technology systems, in security analysis of information technology systems, and/or in analysis of the development environment provided by information technology systems.

The query 2666 that initiates a search is produced by a search and reporting app 2616 that is available through the user interface system 2614 of the data intake and query system. Using a network access application 2606 executing on a computing device 2604, a user can input the query 2666 into a search field provided by the search and reporting app 2616. Alternatively or additionally, the search and reporting app 2616 can include pre-configured queries or stored queries that can be activated by the user. In some cases, the search and reporting app 2616 initiates the query 2666 when the user enters the query 2666. In these cases, the query 2666 maybe referred to as an "ad-hoc" query. In some cases, the search and reporting app 2616 initiates the query 2666 based on a schedule. For example, the search and reporting app 2616 can be configured to execute the query 2666 once per hour, once per day, at a specific time, on a specific date, or at some other time that can be specified by a date, time, and/or frequency. These types of queries maybe referred to as scheduled queries.

The query 2666 is specified using a search processing language. The search processing language includes commands or search terms that the search peer 2664 will use to identify events to return in the search results 2668. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 2666 to include sequential commands, where a subsequent command may operate on the results of a prior command. As an example, sequential commands may be separated in the query 2666 by a vertical line ("|" or "pipe") symbol.

In addition to one or more search commands, the query 2666 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 2666 occurs in two broad phases: a map phase 2650 and a reduce phase 2652. The map phase 2650 takes place across one or more search peers. In the map phase 2650, the search peers locate event data that matches the search terms in the search query 2666 and sorts the event data into field-value pairs. When the map phase 2650 is complete, the search peers send events that they have found to one or more search heads for the reduce phase 2652. During the reduce phase 2652, the search heads process the events through commands in the search query 2666 and aggregate the events to produce the final search results 2668.

A search head, such as the search head 2662 illustrated in FIG. 26, is a component of the search system 2660 that manages searches. The search head 2662, which may also be referred to herein as a search management component, can be implemented using program code that can be executed on a computing device. The program code for the search head 2662 can be stored on a non-transitory computer-readable medium and from this medium can be loaded or copied to the memory of a computing device. One or more hardware processors of the computing device can read the program code from the memory and execute the program code in order to implement the operations of the search head 2662.

Upon receiving the search query 2666, the search head 2662 directs the query 2666 to one or more search peers, such as the search peer 2664 illustrated in FIG. 26. "Search peer" is an alternate name for "indexer" and a search peer may be largely similar to the indexer described previously. The search peer 2664 may be referred to as a "peer node" when the search peer 2664 is part of an indexer cluster. The search peer 2664, which may also be referred to as a search execution component, can be implemented using program code that can be executed on a computing device. In some implementations, one set of program code implements both the search head 2662 and the search peer 2664 such that the search head 2662 and the search peer 2664 form one component. In some implementations, the search head 2662 is an independent piece of code that performs searching and no indexing functionality. In these implementations, the search head 2662 may be referred to as a dedicated search head.

The search head 2662 may consider multiple criteria when determining whether to send the query 2666 to the particular search peer 2664. For example, the search system 2660 may be configured to include multiple search peers that each have duplicative copies of at least some of the event data and are implanted using different hardware resources q. In this example, the sending the search query 2666 to more than one search peer allows the search system 2660 to distribute the search workload across different hardware resources. As another example, search system 2660 may include different search peers for different purposes (e.g., one has an index storing a first type of data or from a first data source while a second has an index storing a second type of data or from a second data source). In this example, the search query 2666 may specify which indexes to search, and the search head 2662 will send the query 2666 to the search peers that have those indexes.

To identify events 2678 to send back to the search head 2662, the search peer 2664 performs a map process 2670 to obtain event data 2674 from the index 2638 that is maintained by the search peer 2664. During a first phase of the map process 2670, the search peer 2664 identifies buckets that have events that are described by the time indicator in the search query 2666. As noted above, a bucket contains events whose timestamps fall within a particular range of time. For each bucket 2644 whose events can be described by the time indicator, during a second phase of the map process 2670, the search peer 2664 performs a keyword search 2674 using search terms specified in the search query 2666. The search terms can be one or more of keywords, phrases, fields, Boolean expressions, and/or comparison expressions that in combination describe events being searched for. When segmentation is enabled at index time, the search peer 2664 performs the keyword search 2672 on the bucket's index file 2646. As noted previously, the index file 2646 includes a lexicon of the searchable terms in the events stored in the bucket's raw data 2648 file. The keyword search 2672 searches the lexicon for searchable terms that correspond to one or more of the search terms in the query 2666. As also noted above, the lexicon incudes, for each searchable term, a reference to each location in the raw data 2648 file where the searchable term can be found. Thus, when the keyword search identifies a searchable term in the index file 2646 that matches a search term in the query 2666, the search peer 2664 can use the location references to extract from the raw data 2648 file the event data 2674 for each event that include the searchable term.

In cases where segmentation was disabled at index time, the search peer 2664 performs the keyword search 2672 directly on the raw data 2648 file. To search the raw data 2648, the search peer 2664 may identify searchable segments in events in a similar manner as when the data was indexed. Thus, depending on how the search peer 2664 is configured, the search peer 2664 may look at event fields and/or parts of event fields to determine whether an event matches the query 2666. Any matching events can be added to the event data 2674 read from the raw data 2648 file. The search peer 2664 can further be configured to enable segmentation at search time, so that searching of the index 2638 causes the search peer 2664 to build a lexicon in the index file 2646.

The event data 2674 obtained from the raw data 2648 file includes the full text of each event found by the keyword search 2672. During a third phase of the map process 2670, the search peer 2664 performs event processing 2676 on the event data 2674, with the steps performed being determined by the configuration of the search peer 2664 and/or commands in the search query 2666. For example, the search peer 2664 can be configured to perform field discovery and field extraction. Field discovery is a process by which the search peer 2664 identifies and extracts key-value pairs from the events in the event data 2674. The search peer 2664 can, for example, be configured to automatically extract the first 100 fields (or another number of fields) in the event data 2674 that can be identified as key-value pairs. As another example, the search peer 2664 can extract any fields explicitly mentioned in the search query 2666. The search peer 2664 can, alternatively or additionally, be configured with particular field extractions to perform.

Other examples of steps that can be performed during event processing 2676 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 2664 sends processed events 2678 to the search head 2662, which performs a reduce process 2680. The reduce process 2680 potentially receives events from multiple search peers and performs various results processing 2682 steps on the received events. The results processing 2682 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 2682 can further include applying commands from the search query 2666 to the events. The query 2666 can include, for example, commands for evaluating and/or manipulating fields (e.g., to generate new fields from existing fields or parse fields that have more than one value). As another example, the query 2666 can include commands for calculating statistics over the events, such as counts of the occurrences of fields, or sums, averages, ranges, and so on, of field values. As another example, the query 2666 can include commands for generating statistical values for purposes of generating charts of graphs of the events.

The reduce process 2680 outputs the events found by the search query 2666, as well as information about the events. The search head 2662 transmits the events and the information about the events as search results 2668, which are received by the search and reporting app 2616. The search and reporting app 2616 can generate visual interfaces for viewing the search results 2668. The search and reporting app 2616 can, for example, output visual interfaces for the network access application 2606 running on a computing device 2604 to generate.

The visual interfaces can include various visualizations of the search results 2668, such as tables, line or area charts, Chloropleth maps, or single values. The search and reporting app 2616 can organize the visualizations into a dashboard, where the dashboard includes a panel for each visualization. A dashboard can thus include, for example, a panel listing the raw event data for the events in the search results 2668, a panel listing fields extracted at index time and/or found through field discovery along with statistics for those fields, and/or a timeline chart indicating how many events occurred at specific points in time (as indicated by the timestamps associated with each event). In various implementations, the search and reporting app 2616 can provide one or more default dashboards. Alternatively or additionally, the search and reporting app 2616 can include functionality that enables a user to configure custom dashboards.

The search and reporting app 2616 can also enable further investigation into the events in the search results 2616. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 2666. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 27:
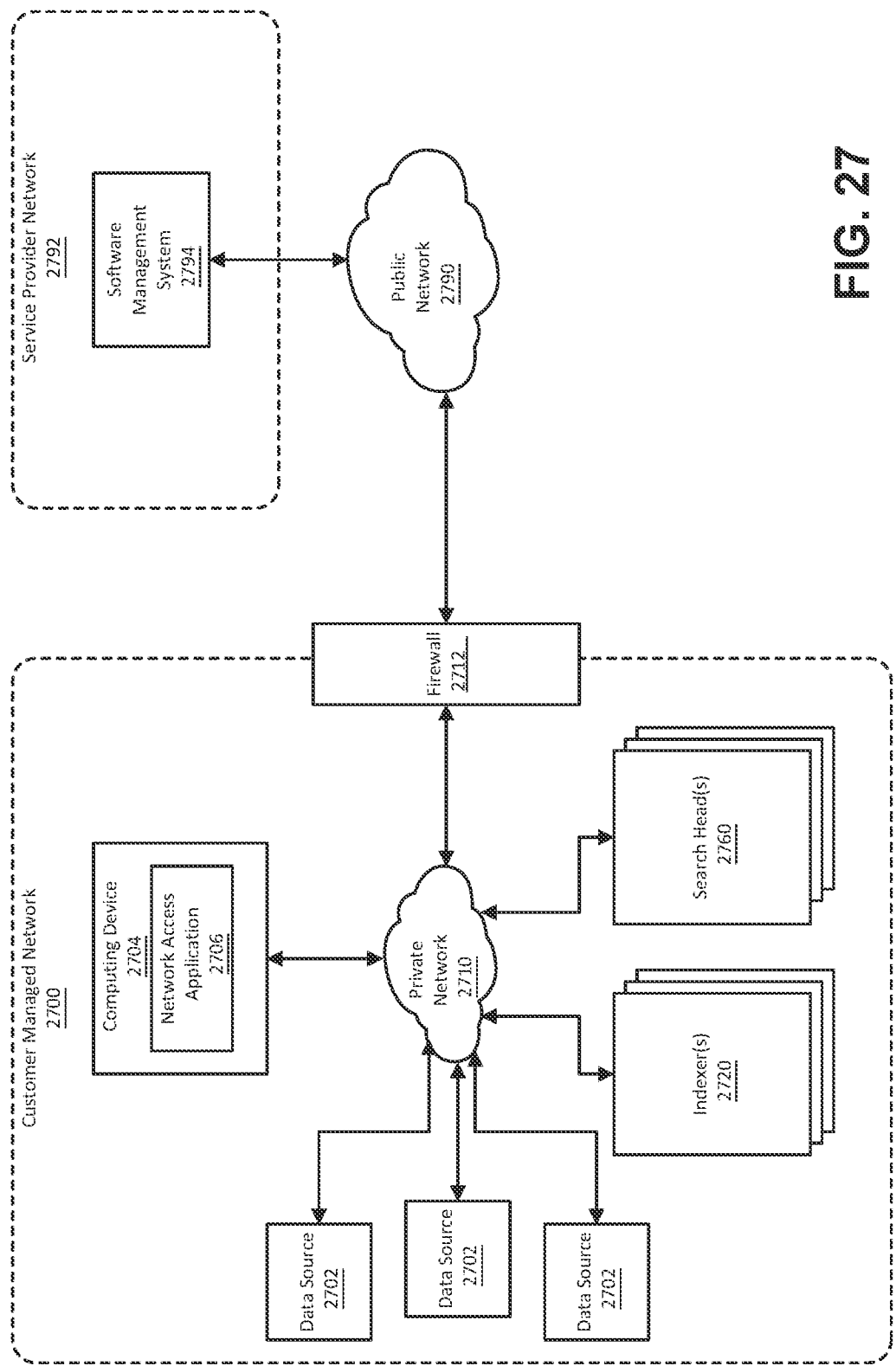
FIG. 27 illustrates an example of a self-managed network 2700 that includes a data intake and query system.

FIG. 27 illustrates an example of a self-managed network 2700 that includes a data intake and query system. "Self-managed" in this instance means that the entity that is operating the self-managed network 2700 configures, administers, maintains, and/or operates the data intake and query system using its own compute resources and people. Further, the self-managed network 2700 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 2700 is located within the customer's on-prem environment, such as in the entity's data center, the operation and management of the self-managed network 2700, including of the resources in the self-managed network 2700, is under the control of the entity. For example, administrative personnel of the entity have complete access to and control over the configuration, management, and security of the self-managed network 2700 and its resources.

The self-managed network 2700 can execute one or more instances of the data intake and query system. An instance of the data intake and query system may be executed by one or more computing devices that are part of the self-managed network 2700. A data intake and query system instance can comprise an indexing system and a search system, where the indexing system includes one or more indexers 2720 and the search system includes one or more search heads 2760.

As depicted in FIG. 27, the self-managed network 2700 can include one or more data sources 2702. Data received from these data sources may be processed by an instance of the data intake and query system within self-managed network 2700. The data sources 2702 and the data intake and query system instance can be communicatively coupled to each other via a private network 2710.

Users associated with the entity can interact with and avail themselves of the functions performed by a data intake and query system instance using computing devices. As depicted in FIG. 27, a computing device 2704 can execute a network access application 2706 (e.g., a web browser), that can communicate with the data intake and query system instance and with data sources 2702 via the private network 2710. Using the computing device 2704, a user can perform various operations with respect to the data intake and query system, such as management and administration of the data intake and query system, generation of knowledge objects, and other functions. Results generated from processing performed by the data intake and query system instance may be communicated to the computing device 2704 and output to the user via an output system (e.g., a screen) of the computing device 2704.

The self-managed network 2700 can also be connected to other networks that are outside the entity's on-premise environment/network, such as networks outside the entity's data center. Connectivity to these other external networks is controlled and regulated through one or more layers of security provided by the self-managed network 2700. One or more of these security layers can be implemented using firewalls 2712. The firewalls 2712 form a layer of security around the self-managed network 2700 and regulate the transmission of traffic from the self-managed network 2700 to the other networks and from these other networks to the self-managed network 2700.

Networks external to the self-managed network can include various types of networks including public networks 2790, other private networks, and/or cloud networks provided by one or more cloud service providers. An example of a public network 2790 is the Internet. In the example depicted in FIG. 27, the self-managed network 2700 is connected to a service provider network 2792 provided by a cloud service provider via the public network 2790.

In some implementations, resources provided by a cloud service provider may be used to facilitate the configuration and management of resources within the self-managed network 2700. For example, configuration and management of a data intake and query system instance in the self-managed network 2700 may be facilitated by a software management system 2794 operating in the service provider network 2792. There are various ways in which the software management system 2794 can facilitate the configuration and management of a data intake and query system instance within the self-managed network 2700. As one example, the software management system 2794 may facilitate the download of software including software updates for the data intake and query system. In this example, the software management system 2794 may store information indicative of the versions of the various data intake and query system instances present in the self-managed network 2700. When a software patch or upgrade is available for an instance, the software management system 2794 may inform the self-managed network 2700 of the patch or upgrade. This can be done via messages communicated from the software management system 2794 to the self-managed network 2700.

The software management system 2794 may also provide simplified ways for the patches and/or upgrades to be downloaded and applied to the self-managed network 2700. For example, a message communicated from the software management system 2794 to the self-managed network 2700 regarding a software upgrade may include a Uniform Resource Identifier (URI) that can be used by a system administrator of the self-managed network 2700 to download the upgrade to the self-managed network 2700. In this manner, management resources provided by a cloud service provider using the service provider network 2792 and which are located outside the self-managed network 2700 can be used to facilitate the configuration and management of one or more resources within the entity's on-prem environment. In some implementations, the download of the upgrades and patches may be automated, whereby the software management system 2794 is authorized to, upon determining that a patch is applicable to a data intake and query system instance inside the self-managed network 2700, automatically communicate the upgrade or patch to self-managed network 2700 and cause it to be installed within self-managed network 2700.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
receiving user input indicating a request for a set of executable instructions configured to monitor a metric time series according to one or more conditions expressed as one or more rules, wherein the set of executable instructions, upon execution by one or more processors, is configured to trigger an alert when the one or more conditions are met, and wherein the set of executable instructions includes a set of parameters that affect when the one or more conditions are met;
obtaining the historical data of the metric time series;
performing a multi-stage tuning procedure on the set of parameters and the historical data of the metric time series resulting in a tuned set of parameters, wherein execution of each stage results in tuning of a parameter of the set of parameters including a first stage of tuning a historical window parameter, a second stage of tuning a current window parameter based on the historical window parameter, and a third stage of tuning a standard deviation multiplier;
generating the set of executable instructions that incorporate the tuned set of parameters, wherein the set of executable instructions are stored in a database for subsequent execution as part of an anomaly detection analysis; and generating an alert following execution of the set of executable instructions by the one or more processors resulting in the anomaly detection analysis of the metric time series using the tuned set of parameters, wherein the alert is triggered by detection of an anomaly in the metric time series.

2. The method of claim 1, wherein the set of executable instructions are operable within a virtual private cloud (VPC).

3. The method of claim 1, wherein the set of executable instructions is configured to (i) determine a statistical value of data points within a current window of the metric time series, and (ii) trigger the alert when a difference between the statistical value of the data points within the current window and a mean value of the data points within a historical window is greater than the standard deviation multiplier.

4. The method of claim 1, wherein the first stage is configured to determine the tuned historical window length utilized by the set of executable instructions in determining a mean value of data points within a first historical window, wherein the tuned historical window length is selected as having a smallest prediction error among a set of candidate historical window lengths.

5. The method of claim 4, wherein the second stage is configured to determine the tuned current window length utilized by the set of executable instructions in determining a set of data points from which a minimum value is selected for comparison with the mean value of the data points of the first historical window.

6. The method of claim 5, wherein the tuned current window length is determined by performing an anomaly detection process for a series of candidate current window lengths, wherein a shortest candidate current window length is selected that does not result in triggering of additional alerts as compared to a number of alerts triggered by an immediately longer candidate current window length.

7. The method of claim 5, wherein the third stage is configured to determine the tuned standard deviation multiplier using the tuned current window length and the tuned historical window length to generate a series of residual z-scores for the metric time series and compute a quantile of the residual z-scores.

8. A computing device, comprising:
a processor; and
a non-transitory computer-readable medium having stored thereon instructions that, when executed by the processor, cause the processor to perform operations including:
receiving user input indicating a request for a set of executable instructions configured to monitor a metric time series according to one or more conditions expressed as one or more rules, wherein the set of executable instructions, upon execution by one or more processors, is configured to trigger an alert when the one or more conditions are met, and wherein the set of executable instructions includes a set of parameters that affect when the one or more conditions are met;
obtaining the historical data of the metric time series;
performing a multi-stage tuning procedure on the set of parameters and the historical data of the metric time series resulting in a tuned set of parameters, wherein execution of each stage results in tuning of a parameter of the set of parameters including a first stage of tuning a historical window parameter, a second stage of tuning a current window parameter based on the historical window parameter, and a third stage of tuning a standard deviation multiplier;
generating the set of executable instructions that incorporate the tuned set of parameters, wherein the set of executable instructions are stored in a database for subsequent execution as part of an anomaly detection analysis; and
generating an alert following execution of the set of executable instructions by the one or more processors resulting in the anomaly detection analysis of the metric time series using the tuned set of parameters, wherein the alert is triggered by detection of an anomaly in the metric time series.

9. The computing device of claim 8, wherein the set of executable instructions are operable within a virtual private cloud (VPC).

10. The computing device of claim 8, wherein the set of executable instructions is configured to (i) determine a statistical value of data points within a current window of the metric time series, and (ii) trigger the alert when a difference between the statistical value of the data points within the current window and a mean value of the data points within a historical window is greater than the standard deviation multiplier.

11. The computing device of claim 8, wherein the first stage is configured to determine the tuned historical window length utilized by the set of executable instructions in determining a mean value of data points within a first historical window, wherein the tuned historical window length is selected as having a smallest prediction error among a set of candidate historical window lengths.

12. The computing device of claim 11, wherein the second stage is configured to determine the tuned current window length utilized by the set of executable instructions in determining a set of data points from which a minimum value is selected for comparison with the mean value of the data points of the first historical window.

13. The computing device of claim 12, wherein the tuned current window length is determined by performing an anomaly detection process for a series of candidate current window lengths, wherein a shortest candidate current window length is selected that does not result in triggering of additional alerts as compared to a number of alerts triggered by an immediately longer candidate current window length.

14. The computing device of claim 12, wherein the third stage is configured to determine the tuned standard deviation multiplier using the tuned current window length and the tuned historical window length to generate a series of residual z-scores for the metric time series and compute a quantile of the residual z-scores.

15. A non-transitory computer-readable medium comprising instructions that, when executed by one or more processors, cause the one or more processor to perform operations including:
receiving user input indicating a request for a set of executable instructions configured to monitor a metric time series according to one or more conditions expressed as one or more rules, wherein the set of executable instructions, upon execution by one or more processors, is configured to trigger an alert when the one or more conditions are met, and wherein the set of executable instructions includes a set of parameters that affect when the one or more conditions are met;
obtaining the historical data of the metric time series;

performing a multi-stage tuning procedure on the set of parameters and the historical data of the metric time series resulting in a tuned set of parameters, wherein execution of each stage results in tuning of a parameter of the set of parameters including a first stage of tuning a historical window parameter, a second stage of tuning a current window parameter based on the historical window parameter, and a third stage of tuning a standard deviation multiplier;

generating the set of executable instructions that incorporate the tuned set of parameters, wherein the set of executable instructions are stored in a database for subsequent execution as part of an anomaly detection analysis; and generating an alert following execution of the set of executable instructions by the one or more processors resulting in the anomaly detection analysis of the metric time series using the tuned set of parameters, wherein the alert is triggered by detection of an anomaly in the metric time series.

16. The non-transitory computer-readable medium of claim 15, wherein the set of executable instructions are operable within a virtual private cloud (VPC).

17. The non-transitory computer-readable medium of claim 16, wherein the first stage is configured to determine the tuned historical window length utilized by the set of executable instructions in determining a mean value of data points within a first historical window, wherein the tuned historical window length is selected as having a smallest prediction error among a set of candidate historical window lengths.

18. The non-transitory computer-readable medium of claim 17, wherein the second stage is configured to determine the tuned current window length utilized by the set of executable instructions in determining a set of data points from which a minimum value is selected for comparison with the mean value of the data points of the first historical window, and wherein the tuned current window length is determined by performing an anomaly detection process for a series of candidate current window lengths, wherein a shortest candidate current window length is selected that does not result in triggering of additional alerts as compared to a number of alerts triggered by an immediately longer candidate current window length.

19. The non-transitory computer-readable medium of claim 18, wherein the third stage is configured to determine the tuned standard deviation multiplier using the tuned current window length and the tuned historical window length to generate a series of residual z-scores for the metric time series and compute a quantile of the residual z-scores.

20. The non-transitory computer-readable medium of claim 15, wherein the set of executable instructions is configured to (i) determine a statistical value of data points within a current window of the metric time series, and (ii) trigger the alert when a difference between the statistical value of the data points within the current window and a mean value of the data points within a historical window is greater than the standard deviation multiplier.

* * * * *